(12) United States Patent
Frader-Thompson et al.

(10) Patent No.: US 11,391,600 B2
(45) Date of Patent: Jul. 19, 2022

(54) INTERFACING TO RESOURCE CONSUMPTION MANAGEMENT DEVICES

(71) Applicant: EnergyHub, Inc., Brooklyn, NY (US)

(72) Inventors: Seth Frader-Thompson, Brooklyn, NY (US); Thomas Kennedy, New York, NY (US); Andrew Martin, Brooklyn, NY (US); Daniel Riegel, Brooklyn, NY (US); Stephan von Muehlen, Brooklyn, NY (US)

(73) Assignee: Energy Hub, Inc., Brooklyn, NY (US)

( * ) Notice: Subject to any disclaimer, the term of this patent is extended or adjusted under 35 U.S.C. 154(b) by 0 days.

(21) Appl. No.: 16/562,071

(22) Filed: Sep. 5, 2019

(65) Prior Publication Data
US 2019/0390977 A1 Dec. 26, 2019

Related U.S. Application Data

(63) Continuation of application No. 12/946,011, filed on Nov. 15, 2010, now abandoned, and a
(Continued)

(51) Int. Cl.
*G01D 4/00* (2006.01)
*G06Q 30/02* (2012.01)

(52) U.S. Cl.
CPC ......... *G01D 4/002* (2013.01); *G06Q 30/0277* (2013.01); *Y02A 20/00* (2018.01);
(Continued)

(58) Field of Classification Search
CPC .... G01D 4/002; Y02B 90/241; Y02B 90/245; Y04S 20/32; Y04S 20/218; Y04S 20/46; Y04S 20/40
(Continued)

(56) References Cited

U.S. PATENT DOCUMENTS

| 4,080,568 | A |   | 3/1978 | Funk | |
|---|---|---|---|---|---|
| 4,551,812 | A | * | 11/1985 | Gurr | H02J 3/144 700/295 |

(Continued)

FOREIGN PATENT DOCUMENTS

| CA | 2729211 C | * | 7/2011 | ............. G06Q 50/06 |
| CA | 2758287 A1 | * | 7/2011 | ............. G05D 29/00 |
| WO | WO 2008/109684 A1 | * | 9/2008 | ............... H04Q 7/20 |

OTHER PUBLICATIONS

Office Action dated Nov. 4, 2013 for U.S. Appl. No. 13/557,144, 33 Pages.
(Continued)

*Primary Examiner* — Igor N Borissov
(74) *Attorney, Agent, or Firm* — Fish & Richardson P.C.

(57) ABSTRACT

The subject disclosure provides a communications architecture for managing/relaying utility information, such as energy, water or gas information. In one aspect, the system includes a hub having a first communications interface for receiving consumption data of a predetermined energy load and a second communications interface for communicating with a metering device. The second communications interface is configured to transmit the consumption data to the metering device and to receive control signals from the metering device where the consumption data is communicated using a first protocol and wherein the control signals are communicated using a second protocol.

19 Claims, 33 Drawing Sheets

Related U.S. Application Data continuation-in-part of application No. 12/024,957, filed on Feb. 1, 2008, now Pat. No. 8,255,090.

(60) Provisional application No. 61/377,347, filed on Aug. 26, 2010.

(52) U.S. Cl.
CPC .............. *Y02B 70/30* (2013.01); *Y02B 70/34* (2013.01); *Y02B 90/20* (2013.01); *Y04S 20/30* (2013.01)

(58) Field of Classification Search
USPC .......... 700/295; 702/188, 62; 705/412, 413, 705/63; 709/224; 340/870.02, 870.03; 715/775
See application file for complete search history.

(56) References Cited

U.S. PATENT DOCUMENTS

| | | | |
|---|---|---|---|
| 4,916,328 A * | 4/1990 | Culp, III | H02J 3/14 307/39 |
| 5,101,191 A | 3/1992 | MacFadyen et al. | |
| 5,689,242 A | 11/1997 | Sims et al. | |
| 5,859,847 A | 1/1999 | Dew et al. | |
| 6,095,867 A | 8/2000 | Brandt et al. | |
| 6,151,640 A | 11/2000 | Buda et al. | |
| 6,480,699 B1 | 11/2002 | Lovoi | |
| 6,492,897 B1 | 12/2002 | Mowery, Jr. | |
| 6,652,330 B1 | 11/2003 | Wasilewski | |
| 6,759,946 B2 | 7/2004 | Sahinoglu et al. | |
| 6,968,295 B1 | 11/2005 | Carr | |
| 7,035,898 B1 | 4/2006 | Baker | |
| 7,049,976 B2 | 5/2006 | Hunt et al. | |
| 7,106,261 B2 | 9/2006 | Nagel et al. | |
| 7,167,078 B2 | 1/2007 | Pourchot | |
| 7,231,280 B2 | 6/2007 | Costa | |
| 7,231,281 B2 | 6/2007 | Costa | |
| 7,256,684 B1 | 8/2007 | Cafiero et al. | |
| 7,281,146 B2 | 10/2007 | Nalawadi et al. | |
| 7,327,221 B1 | 2/2008 | Callaghan | |
| 7,383,451 B2 | 6/2008 | Matusushima et al. | |
| 7,392,661 B2 | 7/2008 | Alles | |
| 7,463,986 B2 | 12/2008 | Hayes | |
| 7,469,190 B2 | 12/2008 | Bickel | |
| 7,486,782 B1 * | 2/2009 | Roos | G01D 4/008 379/106.03 |
| 7,561,977 B2 | 7/2009 | Horst et al. | |
| 7,571,063 B2 | 8/2009 | Howell et al. | |
| 7,598,844 B2 | 10/2009 | Corcoran et al. | |
| 7,626,493 B2 | 12/2009 | Hicks, III | |
| 7,676,571 B2 | 3/2010 | LeMay et al. | |
| 7,692,532 B2 | 4/2010 | Fischer et al. | |
| 7,693,670 B2 * | 4/2010 | Durling | G07F 15/003 702/62 |
| 7,724,778 B2 | 5/2010 | Ying | |
| 7,729,993 B2 | 6/2010 | Baraty | |
| 7,761,910 B2 | 7/2010 | Ransom et al. | |
| 7,778,940 B2 | 8/2010 | Mazzarella | |
| 7,818,270 B2 * | 10/2010 | Carey | G06Q 50/06 705/412 |
| 7,831,844 B2 | 11/2010 | Kestelli | |
| 7,911,326 B2 | 3/2011 | Sutardja | |
| 8,027,809 B2 | 9/2011 | Brown | |
| 8,170,886 B2 | 5/2012 | Luff | |
| 8,314,129 B2 | 11/2012 | Grimler et al. | |
| 8,374,729 B2 | 2/2013 | Chapel et al. | |
| 8,396,606 B2 | 3/2013 | Forbes et al. | |
| 8,421,588 B1 | 4/2013 | Ross et al. | |
| 8,456,293 B1 | 6/2013 | Trundle et al. | |
| 8,494,661 B2 | 7/2013 | Ewing et al. | |
| 8,494,686 B2 | 7/2013 | Masters et al. | |
| 8,600,562 B2 | 12/2013 | Oswald | |
| 9,035,772 B2 | 5/2015 | Soomro et al. | |
| 9,142,971 B2 | 9/2015 | Ewing et al. | |
| 9,252,595 B2 | 2/2016 | Recker et al. | |
| 9,418,543 B1 | 8/2016 | Ross et al. | |
| 9,801,011 B2 | 10/2017 | Soomro et al. | |
| 2002/0022991 A1 | 2/2002 | Sharood et al. | |
| 2002/0178387 A1 | 11/2002 | Theron et al. | |
| 2003/0050737 A1 | 3/2003 | Osann, Jr. | |
| 2003/0187520 A1 | 10/2003 | Pearlman et al. | |
| 2003/0193405 A1 * | 10/2003 | Hunt | G01D 4/004 340/870.02 |
| 2003/0225483 A1 | 12/2003 | Santinato et al. | |
| 2004/0054789 A1 | 3/2004 | Breh et al. | |
| 2004/0078153 A1 | 4/2004 | Bartone et al. | |
| 2004/0186670 A1 | 9/2004 | Hart | |
| 2004/0199272 A1 | 10/2004 | Yamamoto et al. | |
| 2005/0194456 A1 * | 9/2005 | Tessier | G05B 13/02 236/51 |
| 2006/0022800 A1 | 2/2006 | Krishna et al. | |
| 2006/0163349 A1 | 7/2006 | Neugebauer | |
| 2006/0174102 A1 | 8/2006 | Smith et al. | |
| 2006/0259201 A1 | 11/2006 | Brown et al. | |
| 2007/0083668 A1 | 4/2007 | Kelsey et al. | |
| 2007/0123108 A1 | 5/2007 | Ivanova et al. | |
| 2007/0139220 A1 | 6/2007 | Mirza et al. | |
| 2007/0149013 A1 | 6/2007 | Eastham et al. | |
| 2007/0198748 A1 | 8/2007 | Ametsitsi et al. | |
| 2007/0205873 A1 | 9/2007 | Mickle et al. | |
| 2007/0245165 A1 | 10/2007 | Fung | |
| 2007/0255612 A1 * | 11/2007 | Baraty | G06Q 50/06 702/61 |
| 2007/0271006 A1 | 11/2007 | Golden et al. | |
| 2007/0283005 A1 | 12/2007 | Beiles et al. | |
| 2008/0081676 A1 | 4/2008 | Chakraborty et al. | |
| 2008/0133956 A1 | 6/2008 | Fadell et al. | |
| 2008/0147465 A1 | 6/2008 | Raines et al. | |
| 2008/0167756 A1 | 7/2008 | Golden et al. | |
| 2008/0281663 A1 | 11/2008 | Hakim et al. | |
| 2008/0306985 A1 | 12/2008 | Murray et al. | |
| 2009/0009287 A1 * | 1/2009 | Falcioni | H04L 12/2825 340/10.1 |
| 2009/0024545 A1 | 1/2009 | Golden et al. | |
| 2009/0083167 A1 | 3/2009 | Subbloie et al. | |
| 2009/0213830 A1 | 8/2009 | Duesberg et al. | |
| 2009/0234512 A1 | 9/2009 | Ewing et al. | |
| 2009/0315699 A1 | 12/2009 | Salish et al. | |
| 2009/0315717 A1 | 12/2009 | Soomro et al. | |
| 2010/0094476 A1 * | 4/2010 | Hamilton, II | H02J 3/14 700/295 |
| 2011/0063126 A1 | 3/2011 | Kennedy et al. | |
| 2012/0296799 A1 | 11/2012 | Playfair et al. | |
| 2013/0046895 A1 | 2/2013 | Metcalfe et al. | |
| 2014/0129160 A1 | 5/2014 | Tran | |

OTHER PUBLICATIONS

Office Action dated Feb. 14, 2014 for U.S. Appl. No. 12/946,028, 15 pages.
Office Action dated May 23, 2013 for U.S. Appl. No. 12/946,028, 20 pages.
Final Office Action dated Sep. 10, 2013 for U.S. Appl. No. 12/946,028, 14 pages.
Office Action dated Nov. 16, 2011 for U.S. Appl. No. 12/024,957, 24 pages.
Office Action dated Jun. 9, 2011 for U.S. Appl. No. 12/024,957, 39 pages.
Office Action dated Dec. 3, 2010 for U.S. Appl. No. 12/024,957, 63 pages.
Office Action dated Oct. 16, 2014 in U.S. Appl. No. 12/946,028, 25 pages.
Office Action dated Sep. 4, 2014 for U.S. Appl. No. 13/557,144, 24 pages.
Notice of Allowance dated Nov. 20, 2014 for U.S. Appl. No. 13/557,144, 33 pages.
Office Action dated Sep. 14, 2017 for U.S. Appl. No. 14/663,381, 94 pages.
Office Action dated Apr. 10, 2018 for U.S. Appl. No. 14/663,381, 39 pages.

(56) References Cited

OTHER PUBLICATIONS

Office Action dated Nov. 2, 2018 for U.S. Appl. No. 14/663,381, 41 pages.
Canadian Office Action for Application No. 2,749,628, dated Sep. 25, 2013, 4 pages.
Canadian Office Action dated Aug. 23, 2013 for Canadian Patent Application No. 2,749,659, 3 pages.
Tendril—Smart Energy for Life; Products;Tendril zAccess IP. published online at http://tendrilinc.com/products_ip.php, Apr. 18, 2008, 2 pages.
Tendril—Smart Energy for Life; Products;Tendril eDisplay, published online at http://tendrilinc.com/products_edisplay.php, Apr. 18, 2008, 2 pages.
Tendril—Smart Energy for Life; Products;Tendril eStat, published online at http://tendrilinc.com/products_estat.php, Apr. 18, 2008, 3 pages.
Tendril—Smart Energy for Life; Products;Tendril eoutlet, published online at http://tendrilinc.com/products_eoutlet.php, Apr. 18, 2008, 3 pages.
Tendril—Smart Energy for Life; Products;Tendril ePortal, published online at http://tendrilinc.com/products_eportal.php, Apr. 18, 2008, 3 pages.
Tendril—Smart Energy for Life; Product; Smart Energy Consumer Products; published online at http://tendrilinc.com/ products_secp.php, Apr. 18, 2008, 2 pages.
Tendril—Smart Energy for Life; Products; published online at http://tendrilinc.com/products.php, Apr. 18, 2008, 2 pages.
International Preliminary Report on Patentability and Written Opinion for International Application No. PCT/ US2009/032389, dated Mar. 13, 2009, 8 pages.
Notification of Transmittal of the International Search Report and the Written Opinion of the International Searching Authority, or the Declaration, including the International Search Report dated Mar. 13, 2009 by the International Searching Authority for PCT/US2009/032389.
Michael Graham Richard,EUM-200-Whole House energy, sceince & technology(electronics), http://www.treehugger.com/files/2005/07/eum2000_a_whole.php, Jul. 23, 2005, p. 1 of 1.
Canadian Office Action dated Jul. 31, 2014 for Canadian Patent Application No. 2,749,659, 3 pages.
Canadian Office Action dated Feb. 6, 2015 for Canadian Patent Application No. 2,713,702, 4 pages.
Canadian Office Action dated Jun. 26, 2015 for Canadian Patent Application No. 2,749,659, 3 pages.
Canadian Office Action dated Apr. 1, 2016 for Canadian Patent Application No. 2,749,659, 3 pages.
Steve Lohr, Digital Tools Help Users Save Energy, study finds. The New York Times, http://www.nytimes. com/2008/01/1 0/technology/1 0energy.html?ei=5087 &em=&en=daa6b . . . ,pp. 1-3, Jan. 11, 2008.
Ellyssa Kroski. The Hive mind: Folksonomies and user-based tagging,http:i/infotangle.blogsome.com/2005/12/07/the-hive-minf-folksonomies-and-user-based-tag . . . pages 1-17, Feb. 1, 2008.
Information Aesthetics,(free) energy monitoring device, http://infosthetics.com/archieves/2007/04/morepower_energy_monitor_device.html, Feb. 7, 2008, pp. 1-9.
Ewgeco Elecricity Water and Gas Monitor Ewgeco The utility monitoring Device, http://ewgeco.com/, pp. 1-2, Feb. 7, 2008.
Energy literacy : How can design massively reduce the demand for energy in buildings?, http://www.moreassociates/ research/energy literacy, Feb. 7, 2008, pp. 1-5.
Monitoring Device Manages Energy, Transmission and Distribution World, Aug. 30, 2006, http://tdworld.com/test_monitor_control/highlights/Rockwell-Powermonitor-1000/, pp. 1-3.

* cited by examiner

FIG. 19A
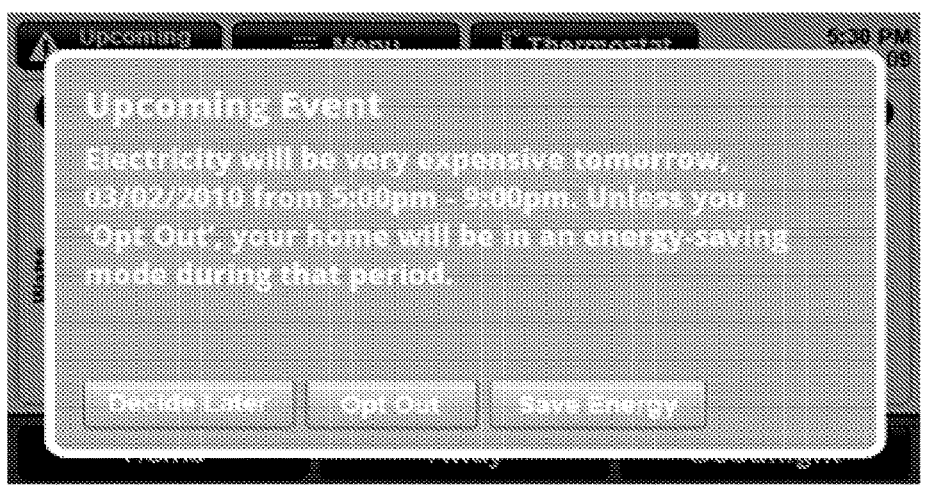
FIG. 19B
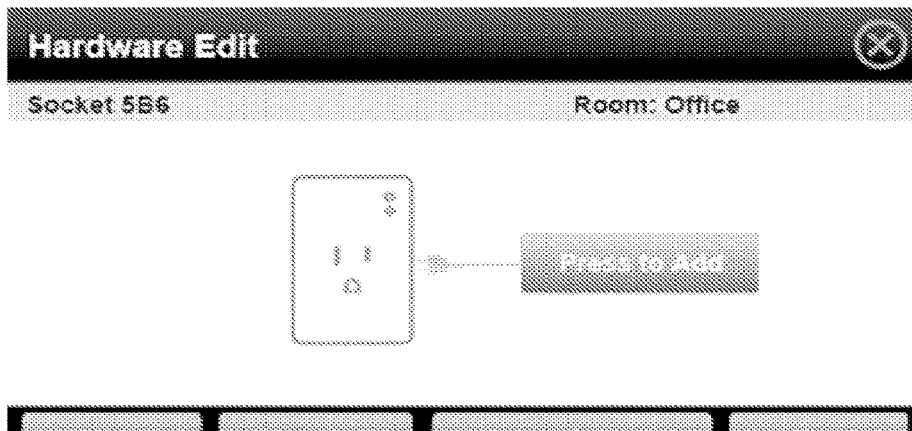
FIG. 19C

INTERFACING TO RESOURCE CONSUMPTION MANAGEMENT DEVICES

CROSS-REFERENCE TO RELATED APPLICATIONS

This application is a continuation of U.S. application Ser. No. 12/946,011, filed Nov. 15, 2010, which claims the benefit of U.S. Provisional Application Ser. No. 61/377,347, entitled "COMMUNICATIONS ARCHITECTURE FOR MANAGING/RELAYING ENERGY OR UTILITY SERVICE CONSUMPTION OR CONTROL INFORMATION IN PREMISES CONSUMING UTILITY SERVICES", filed on Aug. 26, 2010. This application is a continuation-in-part of U.S. patent application Ser. No. 12/024,957, filed on Feb. 1, 2008, now U.S. Pat. No. 8,255,090, issued Aug. 28, 2012. The entireties of these applications are incorporated herein by reference.

TECHNICAL FIELD

The subject disclosure relates generally to management of resource or utility service consumption and more specifically to a communications architecture for managing consumption endpoints.

BACKGROUND

Irrzation of utility resources such as, e.g., electrical power, is a major sector of modern society and an important part of the daily lives of virtually everyone. Given the current proliferation of devices and appliances, daily energy usage is composed of such components as usage of computers, light bulbs, televisions, appliances, iPods, and all sorts of other everyday devices which rely on electricity in order to operate. Studies show that consumer electronics devices now consume over half the power in a typical home in the United States. Further, the wiring systems of modern households are growing more complicated and more powerful every day, which places additional demands on a utility company's ability to keep up with the demand. Businesses and factories have even more complex electrical systems. Unfortunately, as the individual need for power consumption increases, environmental and political forces are starting to create a substantial burden on the energy industry.

Issues such as global warming and various widely publicized energy crises have many individuals constantly worried about the effects of their individual actions in relation to national or global energy concerns. Some individuals are even endeavoring to live "off-the-grid" by only consuming renewable energy sources, such as solar or wind power. Carbon credits and carbon footprints have entered the common vernacular and can often be heard on major news networks as well as major motion pictures. But even with all of this concern relating to the conservation of resources and energy, it remains nearly impossible for a concerned individual to be able to actively measure the effects of his/her day-to-day consumption of energy, water, gas, or other consumable resources provided to his/her premises, and harder still to manage consumption in a convenient and efficient manner.

For instance, due to the cost of energy, energy consumers are motivated to learn as much as possible regarding their consumption of energy, as well as the terms and conditions under which energy suppliers supply energy to consumers. Further, due to the many disparate locations and types of devices and services that consume energy as well as the dynamic nature of the price of energy, there is a need for real-time information regarding the consumer's energy consumption.

However, energy consumers may or may not understand that, due to the energy providers' tariff conditions as well as energy market conditions, energy is more expensive at certain times of the day and during certain seasons. For example, many utilities price energy delivery more expensively during a "peak" time as compared to an "off-peak time." Many energy consumers do not know exactly at what time of day they may be paying higher rates for energy. Additionally, energy consumers may not know which devices or services may be consuming the most energy. Further, many energy consumers are not aware that many devices and services consume energy even when those devices or services appear to the consumer to be in an inactive state. These inactive loads, also known as "vampire" loads, may contribute substantially over time to a consumer's energy consumption.

However, currently, the utilities are unable to effectively handle balancing supply and demand when there are constraints on supply, e.g., when it is impossible or cost prohibitive for a utility to generate additional electricity. For instance, when electricity storage potential is limited, since utilities cannot create additional supply in such situations, the utilities must balance supply and demand, but can do so only by reducing demand.

Conventionally, in order to reduce consumption a utility might take control of some portion of resource consumption via direct load control. With direct load control, a utility sends information to the home and expects devices in the home to respond according to a fixed set of preferences, such as when the load control device (e.g. central air conditioner cycling switch) was installed. While participation can be voluntary, consumers are left in a position of either participating in the program all the time, remembering to call a phone number to opt-out (when such an option is available), or not participating at all.

In fact, some electric companies have recently switched to variable pricing models, where the price of electricity fluctuates based on the time of day, grid conditions, premise consumption, etc. This switch has caused confusion among the consumer base, as a typical consumer may have no clue what the going rate of electricity may be, nor do they have any clue what their current consumption is. The only metric of consumption that most electricity providers give to consumers is in the form of a bill at the end of the month which is not nearly enough information to inform consumers of their daily and real-time energy needs.

More recently, many utility companies and government agencies have been installing "smart meters" which can record cumulative or total energy usage and transmit the data to a central location, avoiding the need to employ a fleet of meter readers to take meter readings. Smart metering systems also facilitate data collection in terms of speed, accuracy and total cost of collection. Moreover, smart metering allows for more detailed monitoring of time of use, cost and other data. Most smart meters are configured to monitor usage and apply different rates or tariffs for energy usage based on a current rate period or time of use period. Typical resolution of time measurement is 15 minute or 60 minute intervals. A number of different rate periods and corresponding rates may be established based on time of day (e.g. peak rates and off-peak rates), day of the week, month, season, varying cost of supply or other factors. Some utilities may set tiered rates based on consumption levels. Thus, utilities and local distribution companies can set different tariffs for usage depending on a rate period. Consumers may regulate their consumption accordingly, for example by deferring use to a lower cost, off peak rate period.

Smart meter systems are typically networked, through wired or wireless networks, to provide for remote monitoring and meter reading by utility/service providers. Consequently there are a number of known systems for providing consumers with information on their usage, for example in-home or on-premises displays which may be linked to the smart meter using wireless or wired connections. Smart meters may communicate with other devices such as remote appliance controllers (RACs), programmable communicating thermostats (PCTs) and in-home displays (IHDs) for energy management, etc. These in-home or in-building displays typically have a digital display to indicate usage information, such as consumption, and may provide for simple graphical representations of information, indicator lights and audible warnings.

Wirelessly-enabled smart metering and monitoring systems may rely on a number of known wireless networking, or mesh and sensor networking protocols depending on range of transmission and security requirements (e.g. based on IEEE 802.15.4, ANSI C12.19, C12.22, ZigBee). Some of these approaches exist to transmit inergy usage data from a smart meter to a central station, or possibly even to a location within a building, for reading by a user. Additionally, when smart meters are not installed, an electrician or the utility may need to install specialized equipment to retrofit a conventional meter, and the equipment generally requires a separate power supply or power source. In addition, to retrofit a meter, utility/grid operator can provide communications into a home via an alternative communications channel (e.g. Internet, pager, telephone line, etc.) instead of through the meter interface.

It should be readily apparent that the above situations and others of their kind do not satisfactorily address the needs and desires of consumers wishing to take part in conservation and other environmental activities. Further, these situations leave consumers without convenient access to energy consumption and expenditures, especially smart meter-based networks, potentially preventing them from making wiser energy-conscious decisions in their homes and businesses. More broadly, no system currently exists in which a consumer can effectively and efficiently monitor, understand, and control their personal energy usage in a home or business.

The above-described deficiencies of today's energy systems and methods are merely intended to provide an overview of some of the conventional problems of the state of the art, and are not intended to be exhaustive. Other problems with the state of the art may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description presented later.

The subject disclosure describes an architecture that can provide an interface in connection with management of resource consumption. In accordance therewith and to other related ends, the architecture can include a communications hub with multiple communications apparatuses. For example, the communications hub can include a first communications component that can be configured to communicatively couple to a resource metering device that monitors consumption of a resource at a premises or a predefined portion thereof.

In addition, the architecture can include a second communications component that can be configured to communicatively couple to a set of consumption endpoints that manage local consumption (as opposed to premises-wide consumption that can be identified by the resource metering device) of the resource. Advantageously, by supporting communications with both a resource metering device and various consumption endpoints (e.g., thermostat or a smart appliance, etc.), the communications hub can seamlessly operate as an additional layer of control and/or logic that can further be centralized to provide more robust features in a more convenient manner with respect to resource consumption at the premises. Furthermore, the architecture can include a user interface configured to control the communications hub, e.g., via input to the user interface. The user interface can also be configured to present information received from the communications hub, e.g., to a user.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein:

FIGS. 16A-21B illustrate various example graphic depictions presented by a suitable user interface associated with the hub;

DETAILED DESCRIPTION

Figure 1:
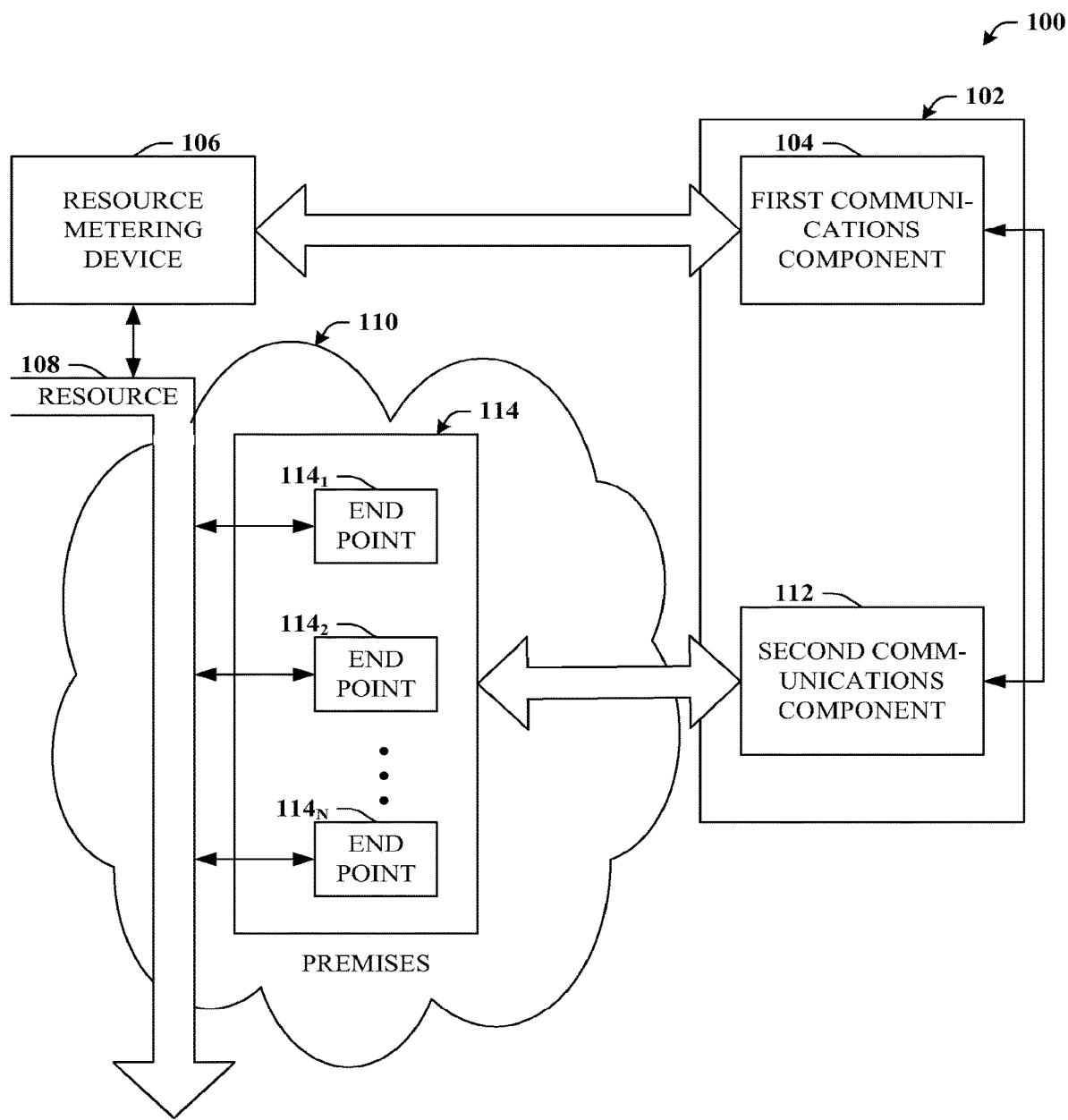
FIG. 1 is a block diagram of a system that can facilitate management of resource consumption.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "station," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term aie article of manufacture" as used herein is intended to encompass a computer program accessible from by a computing device.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media As used herein, the terms "infer" or "inference" generally refer to the process of reasoning about or inferring states of the system, environment, and/or user from a set of observations as captured via events and; or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and; or data. Such inference results in the construction of new events or actions from a set of observed events and/or stored event data, whether or not the events are correlated in close temporal proximity, and whether the events and data come from one or several event and data sources.

In addition, the words "exemplary" and "example" are used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Referring now to the drawings, with reference initially to FIG. 1, system 100 that can facilitate management of resource consumption is depicted. In particular, system 100 can include hub 102 that can be, for example, a housing with various components related to communication, processing or analysis, storage, and/or interface. Generally, hub 102 can include first communications component 104 that can be configured to communicatively couple to resource metering device 106 that monitors aggregate or premises-wide consumption of resource 108 at premises 110 or some predefined portion of premises 110 (e.g., such as an interior environment or a room or subset of rooms within the interior environment). Such communicative coupling between first communications component 104 and resource metering device 106 can be wireless or via hardwire, and can be in accordance with substantially any communications protocol or standard supported by resource metering device 106, as further detailed infra.

Resource 108 can be any suitable resource that is consumed and/or metered such as, e.g., water, air, gas, electricity, or steam (WAGES). Thus, while it should be understood that the disclosed subject matter can be applicable to substantially any resource 108, for the sake of simplicity and ease of explanation, many of the examples and illustrations provided herein relate to supply, consumption, and metering of electricity, which will serve as a common, though non-limiting, example of resource 108 for the remainder of this document.

Accordingly, resource metering device 106 will typically be installed at or near premises 110 by a resource utility provider (e.g., utility company) in order to monitor consumption of resource 108. Advantageously, resource metering device 106 can be, e.g., a smart meter associated with a utility resource provider, a standard meter associated with the utility resource provider that has been retrofitted to add communications capabilities, or a disparate communications device authorized by the utility resource provider to transmit data monitored by a meter associated with the premises or the predefined portion thereof. Thus, typically, resource metering device 106 will be communicatively coupled to the utility resource provider (not shown) by way of an advanced metering infrastructure (AMI) network or an automatic meter reading (AMR) network.

However, regardless of the nature or specific implementation of resource metering device 106 or the type of resource 108 being metered, as indicated above, first communications component 104 can be configured to communicatively couple to resource metering device 106. In addition, hub 102 can also include second communications component 112 that can be configured to communicatively couple to one or more of set 114 of consumption endpoints $114_1$-$114_N$, where N can be any substantially positive integer. It should be understood that consumption endpoint(s) $114_1$-$114_N$ can be referred to herein, either collectively or individually as consumption endpoint(s) 114, with appropriate subscripts employed generally only when necessary or convenient to highlight various distinctions or to better impart the disclosed concepts. In general, consumption endpoints 114 can be, e.g., appliances or devices that consume resource 108 or manage local consumption of resource 108, such as, e.g., a thermostat, a temperature control unit (TCU), a smart plug, a smart power strip, a load control switch, an electric charger (e.g., for a battery storage system or an electric vehicle), a smart appliance, and so forth. As depicted, consumption endpoints 114 can be, but need not be, included in premises 110. Likewise, hub 102 as well as all or a subset of components included therein can be located within or near to premises 110.

Regardless of the particular configuration or topology associated with hub 102, certain benefits should become apparent. For example, irrespective of other components detailed herein that can be included in hub 102, by including first communications component 104 and second communications component 112, hub 102 is able to communicate with both resource metering device 106 and consumption endpoint(s) 114. Thus, hub 102 can operate as a network or interface layer between resource metering device 106 and endpoint(s) 114, and can do so in a centralized and more convenient manner.

Figure 20A:
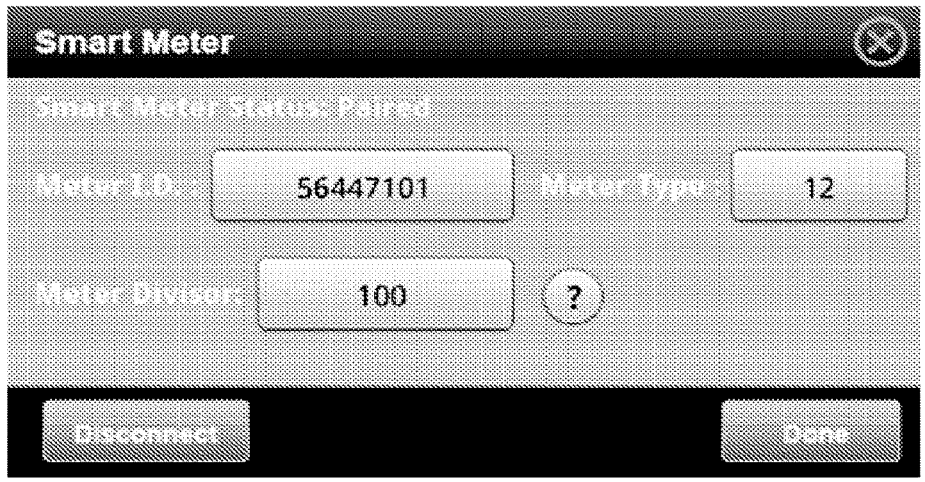

For instance, conventional thermostats or smart devices such as a smart washer/dryer unit, for example, can communicate with or receive instructions from a smart meter. Hence, during setup operations, the thermostat or the washer/dryer can be paired with the smart meter. Thus, in a hypothetical case in which energy grid conditions drive up the price for or reduce the availability of electricity, the smart meter can transmit suitable messages or commands to both the thermostat and the smart washer/dryer. However, in that case, how the thermostat and the washer/dryer will respond to such data must be configured individually for each endpoint, that is for the thermostat, for the smart washer/dryer unit, as well as for any other suitable appliance or device. Yet, by pairing with (see for example FIGS. 19C and 20A) and potentially imitating both smart resource metering device 106 and individual consumption endpoints 114, hub 102 can operate as an additional layer of logic and control, which can simplify numerous tasks for the end consumer (e.g., owner or occupier of premises 110) as well as provide additional features that can result in greater efficiencies in terms of cost and resource 108 consumption.

Figure 2:
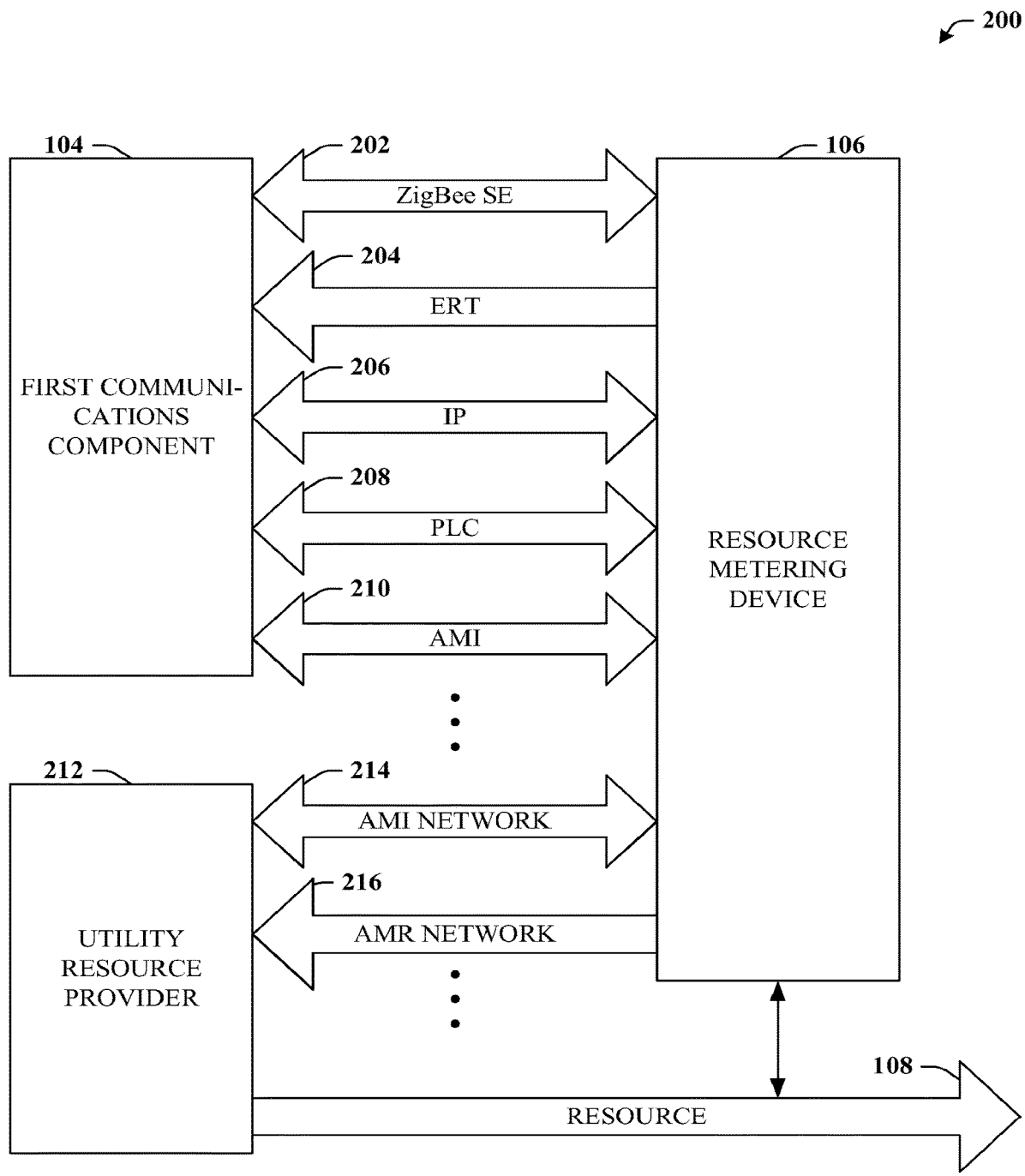
FIG. 2 provides a block diagram of a system that illustrates a variety of protocols by which the first communications component can communicate with the resource metering device.

Turning now to FIG. 2, system 200 illustrates a variety of protocols by which first communications component 104 can communicate with resource metering device 106. As noted previously, resource metering device 106 can monitor premises-wide consumption of resource 108. Such monitoring can be provided by utility resource provider 212 by way of AMI network 214, AMR network 216, or the like. Thus, data related to consumption of resource 108 as well as information provided by utility resource provider 212 such as pricing information, control signals, grid conditions and so on can be accessed by hub 102, and in particular by first communications component 104. In one or more aspect, first communications component 104 can be further configured to communicate with resource metering device 106 in accordance with at least one of ZigBee smart energy (SE) protocol 202, encoded receiver-transmitter (ERT) protocol 204, Internet protocol (IP) 206, power line carrier (PLC) protocol 208, AMI protocol 210, or similar.

Figure 3:
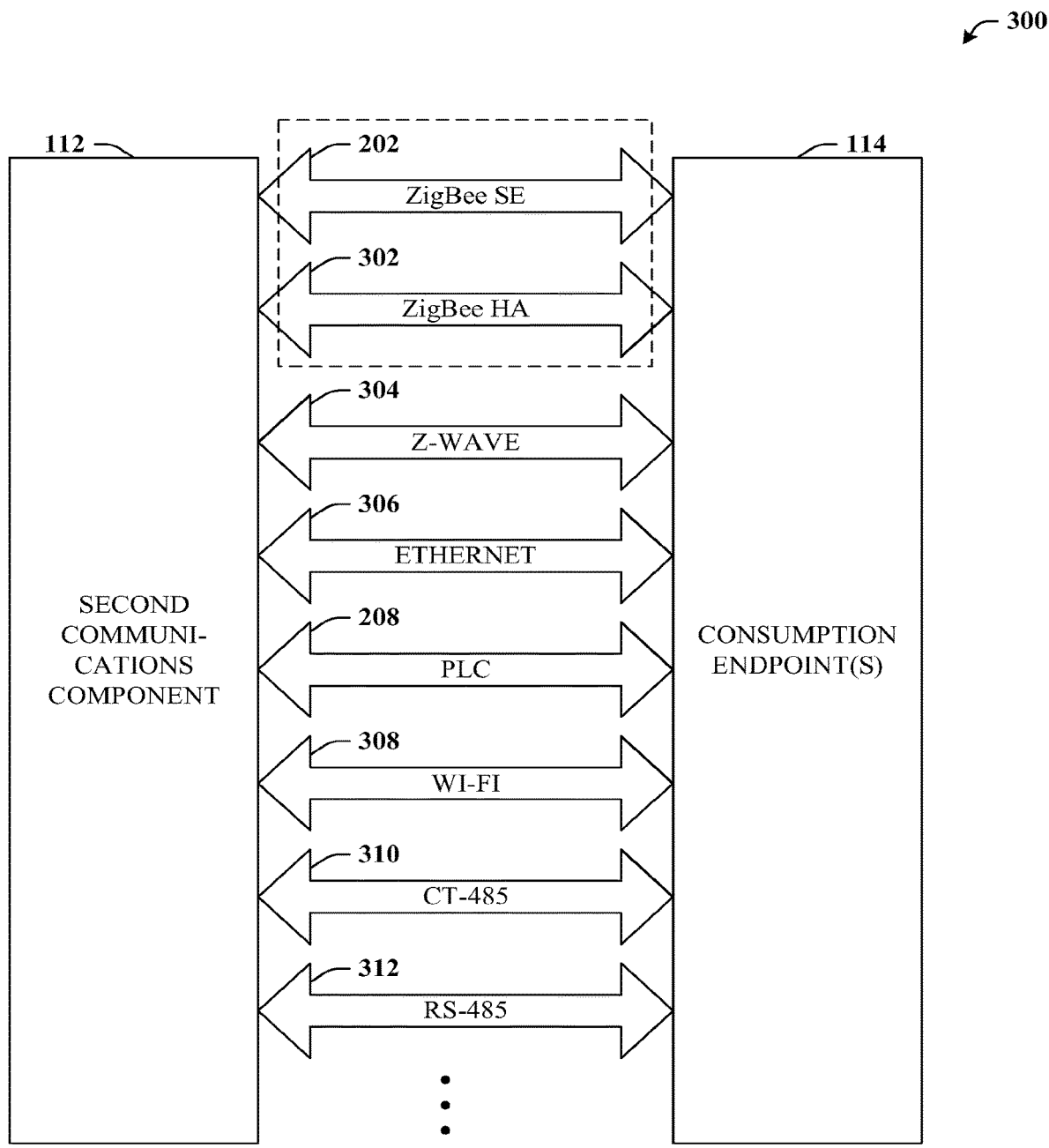
FIG. 3 illustrates a block diagram of a system that illustrates a variety of protocols by which the second communications component can communicate with one or more consumption endpoints.

With reference now to FIG. 3, system 300 illustrates a variety of protocols by which second communications component 112 can communicate with one or more of consumption endpoints 114. In one or more aspect, second communications component 112 can be configured to communicate by way of all or a subset of protocols employed by first communications component 104 (and vice versa) such as ZigBee SE protocol 202 and PLC protocol 208, as well as other protocols not expressly depicted in FIG. 3. In addition to those protocols characterized by system 200 of FIG. 2, system 300 can also operate in accordance with at least one of ZigBee home automation (HA) protocol 302, Z-Wave protocol 304, Ethernet protocol 306, wireless fidelity (WI-FI) protocol 308, CT-485 protocol 310, RS-485 protocol 312, or the like.

Moreover, it should be underscored that in one or more aspect, second communications component 112 can be further configured to concurrently support both ZigBee SE protocol 202 and ZigBee HA protocol 302. Conventionally, ZigBee SE protocol and ZigBee HA protocol were designed to be substantially mutually exclusive. As such, conventional devices tend to operate in accordance with one or the other standard, but not both standards. Thus, concurrently supporting both protocols can be particularly advantageous because hub 102 can therefore communicate with a wider range of devices and/or consumption endpoints 114 than any conventional device or system that only employs one or the other of these standards. As one example of achieving concurrent support for both ZigBee SE protocol 202 and ZigBee HA protocol 302, second communications component 112 can be configured to route both ZigBee smart energy profile messages and ZigBee home automation profile messages using ZigBee smart energy profile for encryption, transmission, and network management.

Figure 4:
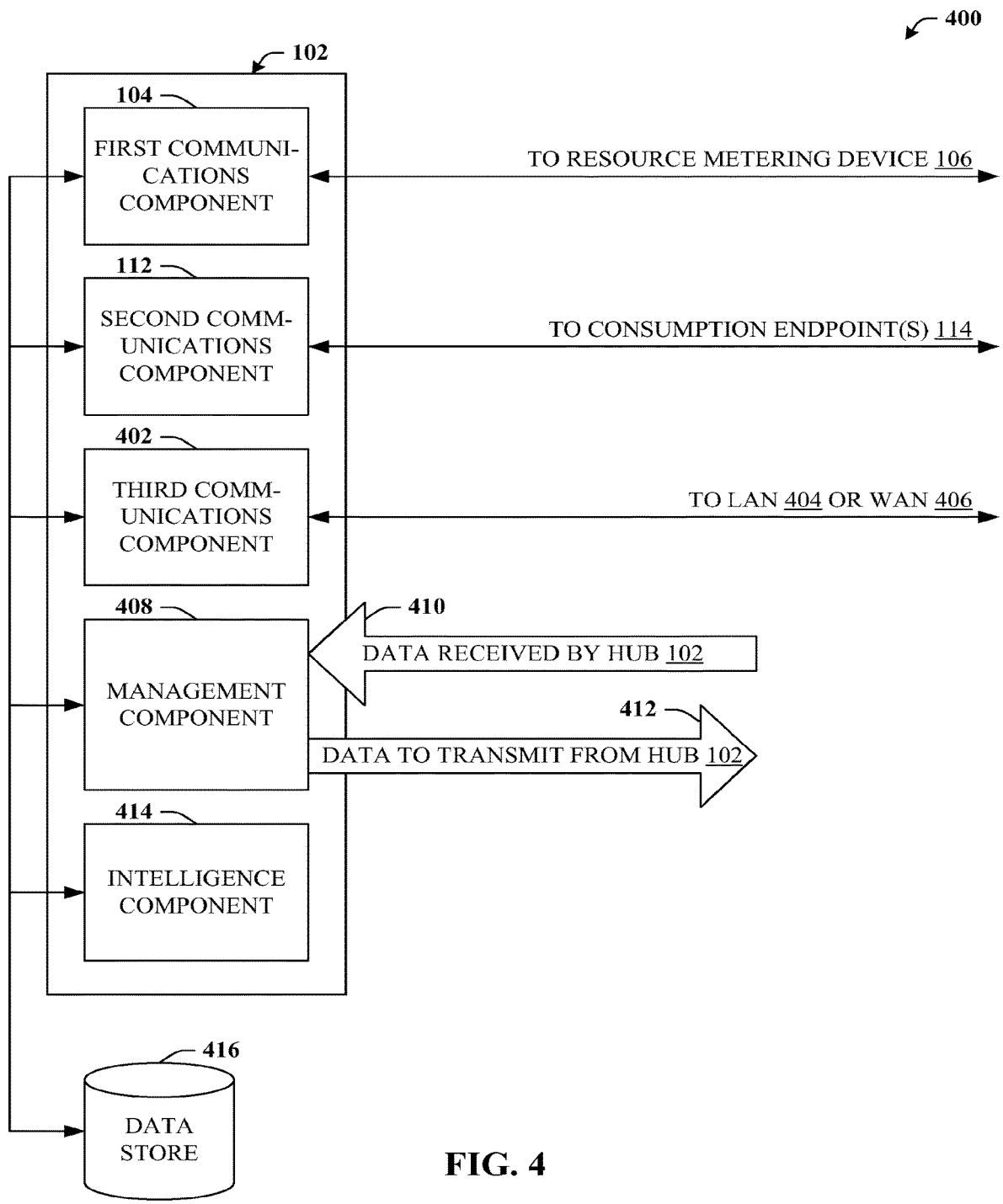
FIG. 4 provides a block diagram of a system that can include the hub with one or more additional features or aspects.

Referring now to FIG. 4, system 400 that can include hub 102 with one or more additional features or aspects is illustrated. Generally, as with system 100 of FIG. 1, system 400 can include first communications component 104 that can be configured to communicatively couple to resource metering device 106 as well as second communications component 112 that can be configured to communicatively couple to a set of consumption endpoints 114, as previously detailed herein. In addition, hub 102 can also include one or more of a variety of other components, which can now be described.

In one or more aspect, hub 102 can further comprise third communications component 402 that can be configured to interface to at least one of local area network (LAN) 404 or wide area network (WAN) 406. Advantageously, by providing support for LAN 404 or WAN 406, hub 102 can leverage widespread, existing networks and infrastructure in order to, e.g., enhance accessibility, feature sets, or utilization of the disclosed subject matter. As just one advantageous example, by leveraging LAN 404 or WAN 406, third communications component 402 can facilitate central storage of data associated with consumption of resource 108 or other data associated with premises 110, which can result in improved analytics or access. As another example, by leveraging LAN 404 or WAN 406, third communications component 402 can facilitate the propagation of data or messages from the utility resource provider by way of a network generally more robust than existing means for communicating with resource metering device 106 or other devices associated with premises 110. As still another example, by leveraging LAN 404 or WAN 406, third communications component 402 can facilitate remote access and/or control of hub 102 by way of substantially any suitable device. In particular, virtually any suitable device can operate as a user interface for hub 102, which is further described in connection with FIGS. 5, 6, and 7.

In addition, in one or more aspect, hub 102 can further comprise management component 408 that can be configured to analyze data received by hub 102 and to determine suitable data to transmit from hub 102, which are depicted by way of reference numerals 410 and 412, respectively. Data received 410 can be or relate to data received by any of the communications components 104, 112, or 402 any of which can be stored to data store 416 and later retrieved by management component 408. Likewise, data to transmit 412 can be or can relate to data received by any of the communications components 104, 112, or 402 or data retrieved from data store 416, potentially transformed in some manner by management component 408.

It should be appreciated that data store 416 is intended to be a repository of all or portions of data, data sets, or information described herein or otherwise suitable for use with the described subject matter. Data store 416 can be centralized, either remotely or locally cached, or distributed, potentially across multiple devices and/or schemas. Furthermore, data store 416 can be embodied as substantially any type of memory, including but not limited to volatile or nonvolatile, sequential access, structured access, or random access, solid state, and so on. It should be understood that all or portions of data store 416 can be included in hub 102, or can reside in part or entirely remotely from hub 102. For additional detail, FIG. 5 depicts additional features or aspects in connection with management component 408 or more generally hub 102.

Figure 5:
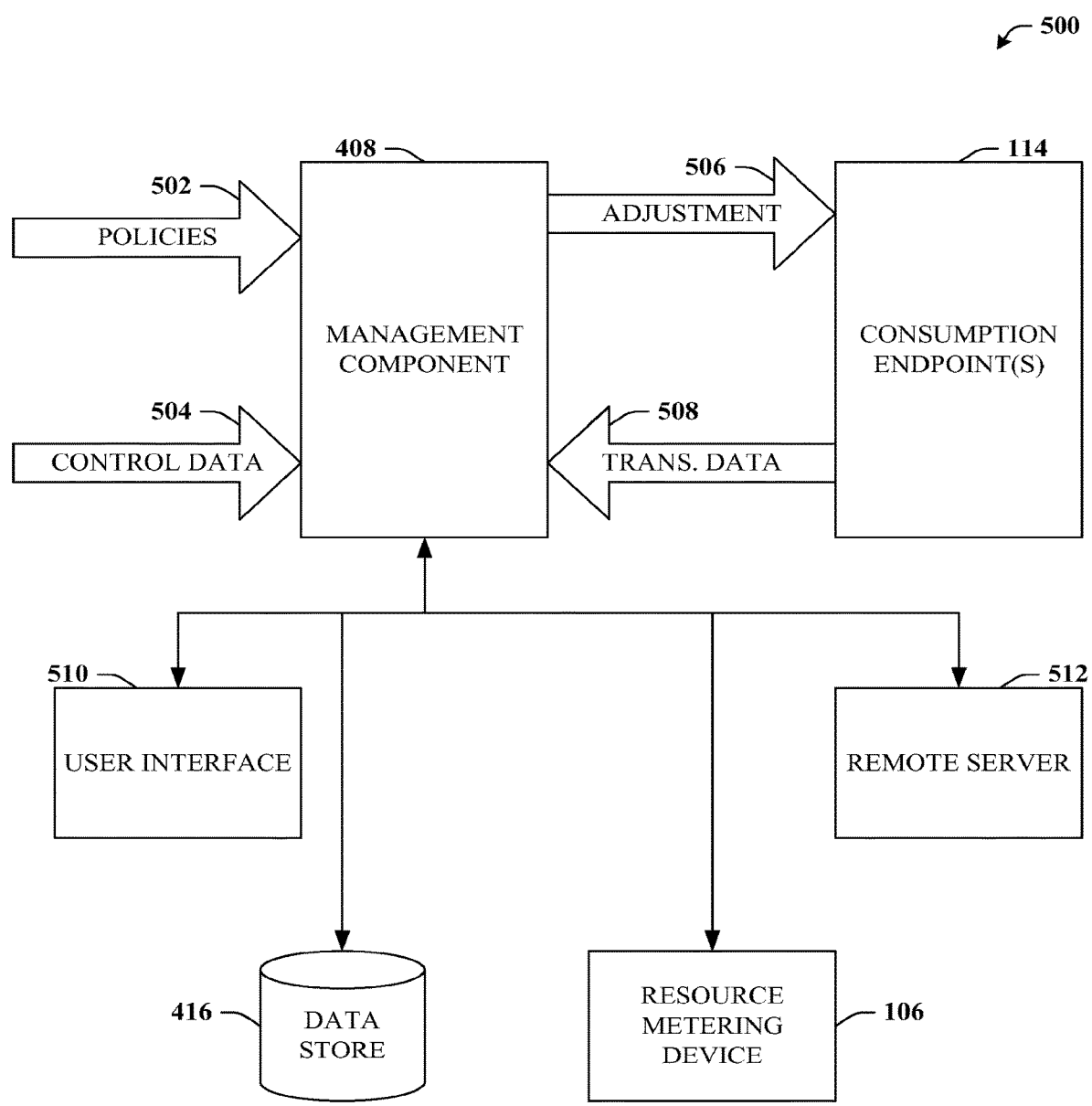
FIG. 5 illustrates a block diagram of a system that can facilitate management and/or control of consumption endpoints 114.

Accordingly, while still referring to FIG. 4, but turning now as well to FIG. 5, system 500 that can facilitate management and/or control of consumption endpoints 114 is provided. In one or more aspect, management component 408 can be further configured to analyze data received 410 by hub 102 (e.g., via first communications component 104, second communications 112, and/or third communications component 402), and to determine suitable data to transmit 412 from hub 102 based upon at least one configurable set of policies 502 that relate to a variety of features or parameters.

As one example, configurable set of policies 502 can relate to policies or preferences associated with premises 110 or the predefined portion thereof, such as a thermostat setting based upon whether or not occupants are home, away from home, sleeping or the like. For instance, even with a substantially identical set of base data analyzed by management component 408 in a given situation, data to transmit 412 can differ as a function of policies 502 that distinguish, e.g., "Home" and "Away" modes or settings. As another example, configurable set of policies 502 can relate to a current state of an environment associated with premises 110 or the predefined portion thereof, such as an extreme external weather condition. As still another example, set of configurable policies 502 can relate to policies or preferences associated with utility resource provider 212. For instance, utility resource provider 212 can provide opt-in/opt-out agreements or indicate that above a certain resource 108 usage, either instantaneously or over a given period, a unit-price for resource 108 increases.

In addition, in one or more aspect, management component 408 can be further configured to receive and store control data 504 received from resource metering device 106 or in another manner, such as by way of third communications component 402. Such control data 504 can include, e.g., one or more of the following: (1) an indication of a current rate of consumption of resource 108; (2) an indication of aggregate consumption of resource 108 over a predefined period of time; (3) a current or forecasted unit price for resource 108; (4) a condition or event associated with provision of resource 108; (5) a specific command or instruction intended for at least one consumption endpoint 114; or (6) a text message intended for display by at least one consumption endpoint 114 or by an informational display associated with premises 110. Any such control data 504 can be stored to data store 416 and/or can be propagated to a suitable consumption endpoint 114, to user interface 510, or to remote server 512, which is further discussed below.

Moreover, in one or more aspect, management component 408 can be further configured to facilitate adjustment 506. Adjustment 506 can be with respect to consumption of resource 108 by at least one consumption endpoint 114. Accordingly, adjustment 506 can be based upon control data 504 such as a direct load control event message or the like. Furthermore, in one or more aspect, adjustment 506 can be effectuated according to a variety of determinations or inferences associated with management component 408. For example, if management component 408 determines or infers (for example in connection with a current state of premises or components therein, current policies 502, scheduling, or other data or previous inferences) that received control data 504 is appropriate, then adjustment 506 can be effectuated by simply forwarding the control data to all or a subset of suitable consumption endpoints 114.

On the other hand, e.g., if management component 408 determines or infers that received control data 504 is not appropriate in a given situation, then adjustment 506 can be effectuated by either forwarding a modified version of control data 504 (e.g., modified for one or more particular consumption endpoint 114, or modified according to a global policy, schedule, state, or mode) or by transmitting disparate control data that appropriately varies from control data 504. Furthermore, management component 408 can determine no information should be transmitted (e.g., filter certain control data 504), in which case no adjustment 506 need be transmitted. As still another possibility, adjustment 506 can be effectuated based upon input received in response to a prompt or request for input, for instance a prompt presented to a user that solicits input by way of user interface 510. As noted previously, whether control data 504 is forwarded unchanged, filtered, forward as a modified version, transmitted independently, or leads to a prompt for user-input, any such decision can be determined by management component 408, which can rely entirely or in part on policies 502, which can be configurable and can change or can be selected according to appropriate context.

Figure 16A:
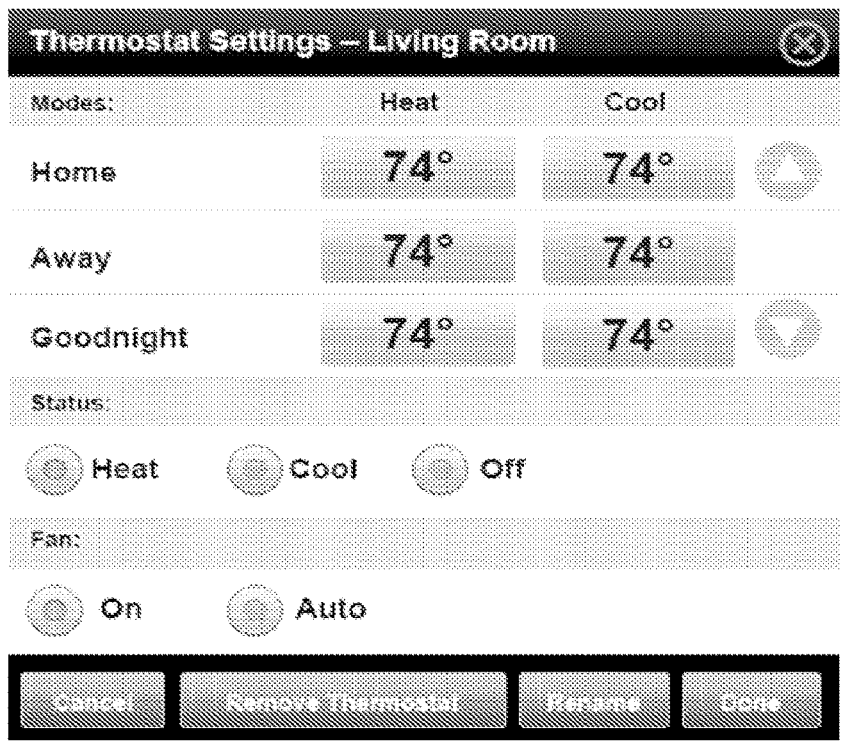
Figure 17A:
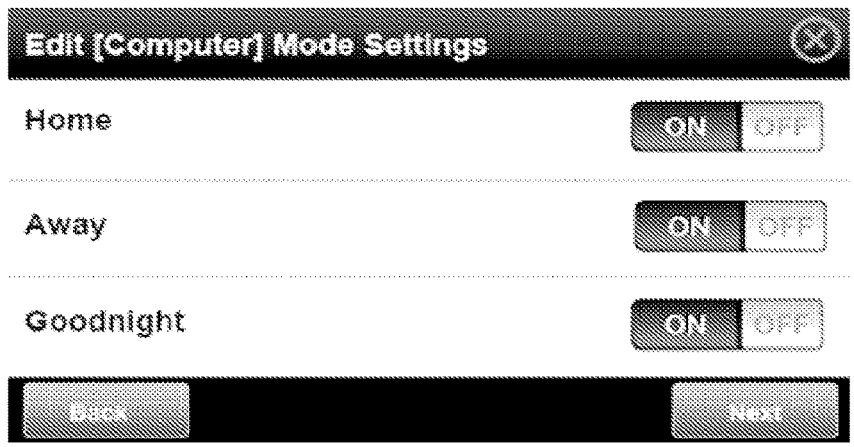
Figure 17B:
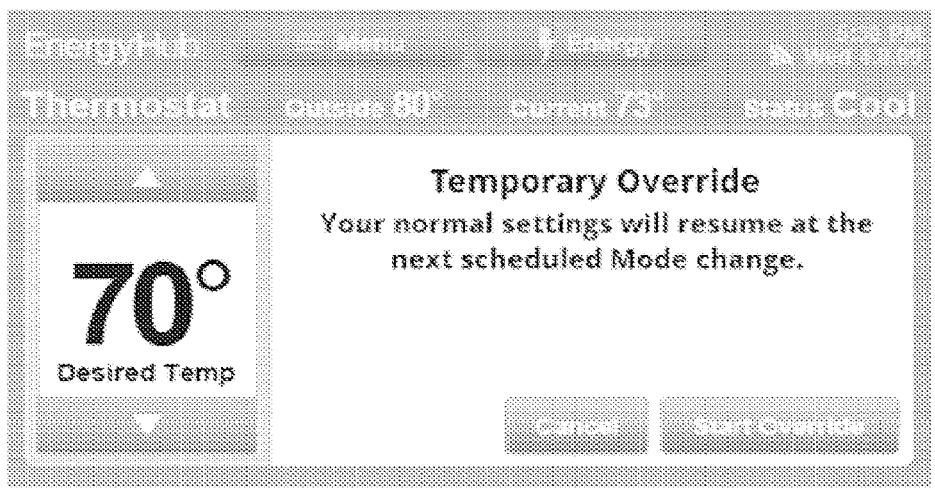
Figure 17C:
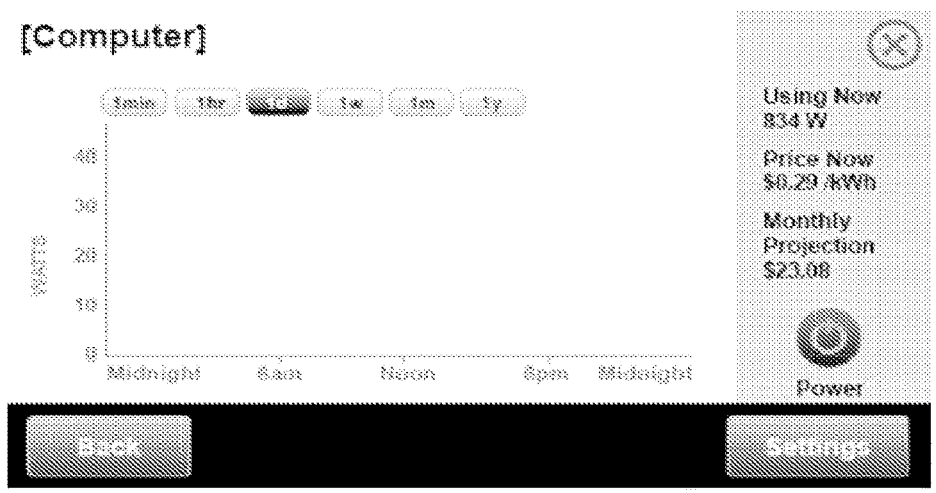

For example, it should be understood that configurable set of policies 502, or more particularly, which set of policies 502 that are employed in a given situation can be selected by management component 408. In one or more aspect, set of policies 502 can be selected based upon a determination of an occupancy state or mode within premises 110 or the predefined portion thereof (e.g., an individual room or wing). Additionally or alternatively, set of policies 502 can be selected based upon a schedule input to or otherwise available to management component 408. As used herein, occupancy state can refer to whether or not premises 110 or a portion thereof is occupied as well as to a number of occupants, a type of occupancy (active versus asleep), a location or locations of the occupancy and so on. As non-limiting classifications of occupancy state or mode, the disclosed subject matter provides for three convenient settings labeled "Home", "Away", and "Goodnight" (see FIGS. 16A, 17A), any one of which can be selected to invoke a particular set of policies 502 or emphasis for other policies 502. As a configurable default policy, a Home setting can operate to ensure endpoints 114 function the way a user might expect (e.g., by filtering various unexpected control signals that can otherwise cause a smart appliance to shut down or the like, or ensuring the user is aware of such signals prior to remedial action). In contrast, a default policy for Away or Goodnight setting can provide more latitude for unexpected events without disturbing the user or his or her expectations.

By way of illustration, consider once more a smart clothes dryer unit that is drying a load of laundry when a message arrives at a smart meter of premises 110 that the price of resource 108 will rise or that an associated utility resource provider 212 is requesting lower consumption. In conventional systems, the smart dryer can receive such information from the smart meter and, based upon configuration, either shut down or ignore the message from the smart meter; or perhaps react according to additional options if previously programmed for such behavior. While, various smart appliances today do have a degree of sophistication, such as the ability to modify operation modes or respond to certain predefined conditions, most such smart appliances do not include the level of sophistication, whether due to insufficient programming or to an inadequate user interface, to provide visibility into the operation of the smart appliance.

However, when employing hub 102, such information from the smart meter can be received (e.g., by way of first communication component 104), analyzed by management component 408, resulting in various outcomes depending on, for example configurable set of policies 502. In other words, by employing hub 102, the smart dryer (or another consumption endpoint 114) can interface with hub 102 to allow additional control or intelligence with respect to resource 108 pricing, occupancy states, or other criteria. For example, if hub 102 is currently set in "Home" mode the message from the smart meter can be ignored with respect to the smart dryer, but perhaps forwarded to other consumption endpoints, depending upon configuration. On the other hand, in the case where hub 102 is currently set to "Away" mode, management component 408 can determine, e.g., to forward the message to the smart dryer without substantial change and/or explicitly instruct the smart dryer to shut off. In the case in which hub 102 is set to "Goodnight", management component 408 can determine that compromise is the better course of action and instruct the smart dryer to turn off one or more of the heating elements but maintain tumble, or end earlier than programmed.

For these and other aspects detailed herein, management component 408 can be further configured to store any or all of the sets of configurable policies 502 upon receipt of one or more policies 502 or an update thereto from, e.g., user interface 510, which can be communicatively coupled to or included in hub 102. Additionally or alternatively, management component 408 can be further configured to store any or all of the sets of configurable policies 502 upon receipt of one or more policies 502 or an update thereto from remote server 512, such as default settings and/or predetermined configurations for particular situations that are made available for download. Moreover, configuration options associated with respective consumption endpoints 114 can be stored as well and/or downloaded, e.g., from remote server or from the consumption endpoint 114 on demand.

In one or more aspect, management component 408 can be further configured to receive and store transaction data 508. Transaction data 508 can be received from one or more consumption endpoint 114, as part of real-time monitoring, a periodic audit, or obtained by some other means. Typically, transaction data 508 will relate to a state or a history of states associated with one or more consumption endpoint 114; an operational mode or history thereof of one or more consumption endpoints 114, an input or transaction or history thereof of one or more consumption endpoints 114, or similar. Hence, all or a portion of all states, operational modes, and inputs can be logged and stored, e.g., for analytical purposes (e.g., efficiency analysis or forecasting, maintenance, etc.) or for recordkeeping purposes (e.g., history of use, warranty compliance, etc.). Moreover, all or a portion of the stored transaction data 508 can be uploaded to a server that is remote (e.g., remote server 512) from premises 110 by third communication component 402 via LAN 404 or WAN 406.

Still referring to FIGS. 4 and 5, management component 408 can be further configured to analyze received data 410 by hub 102 and to determine suitable data to transmit 412 based upon at least one intelligent inference. For example, Bayesian probabilities or confidence measures can be employed or inferences can be based upon machine learning techniques related to historical analysis, feedback, and/or previous determinations or inferences. As one example, inferences can be employed for forecasting consumption of resource 108 by one or more consumption endpoint, potentially based upon a particular setting or operation mode or relevant externality.

Such can be accomplished by way of intelligence component 414 that can provide for or aid in various inferences or determinations. In particular, in accordance with or in addition to what has been described supra with respect to intelligent determinations or inferences provided by various components described herein, e.g., all or portions of management component 408. Additionally or alternatively, all or portions of intelligence component 414 can be included in one or more components described herein. Thus, intelligence component 414 can reside in whole or in part within management component 408 or other components detailed herein. Moreover, intelligence component 414 will typically have access to all or portions of data sets, preferences, or histories described herein, such as those stored to data store 416 and/or remote server 512.

In more detail, in order to provide for or aid in the numerous inferences described herein, intelligence component 414 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inferences can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Still referring to FIG. 4, it should be appreciated that hub 102 can be a standalone unit with various features including, for instance, some or all of multiple radios (e.g., communications components 104, 112, and 402), processing/computation ability (e.g., components 408 and 414), storage (e.g., data store 416) as well as a user interface 510 that can be likewise included in hub 102 or remote from hub 102 as further detailed with reference to FIGS. 6 and 7.

However, in addition to a standalone implementation, the disclosed subject matter can further leverage existing infrastructure by including all or portions of hub 102 into other devices or components. For example, in one or more aspect, hub 102 or a portion thereof can be included in or integrated with a computer networking router associated with premises 110. As an example implementation, hub 102 or the portion thereof can be included in or integrated with the computer networking router as a modular or pluggable circuit block. For instance, communications components 104 and 112 can be mounted or inserted into the existing circuitry of a router. Certain inherent capabilities of the router can be leveraged to operate as third communications component 402. In addition, inherent features of the router, such as processing capabilities can provide the hardware utilized for management component 408, possibly with suitable software or firmware included in the hub 102 portion that is integrated with the router.

As another example implementation, hub 102 can be included in or integrated with an in-premise display, a disparate user interface (UI) device, or a disparate device with a suitable UI. For instance, in one or more aspect, hub 102 can be included in or integrated with a thermostat or another consumption endpoint 114. Likewise, hub 102 can be included in or integrated with a security system associated with premises 110. In any case, the advantages of leveraging existing infrastructure or suitable devices that are likely to otherwise be present at premises 110 are readily apparent.

Figure 6:
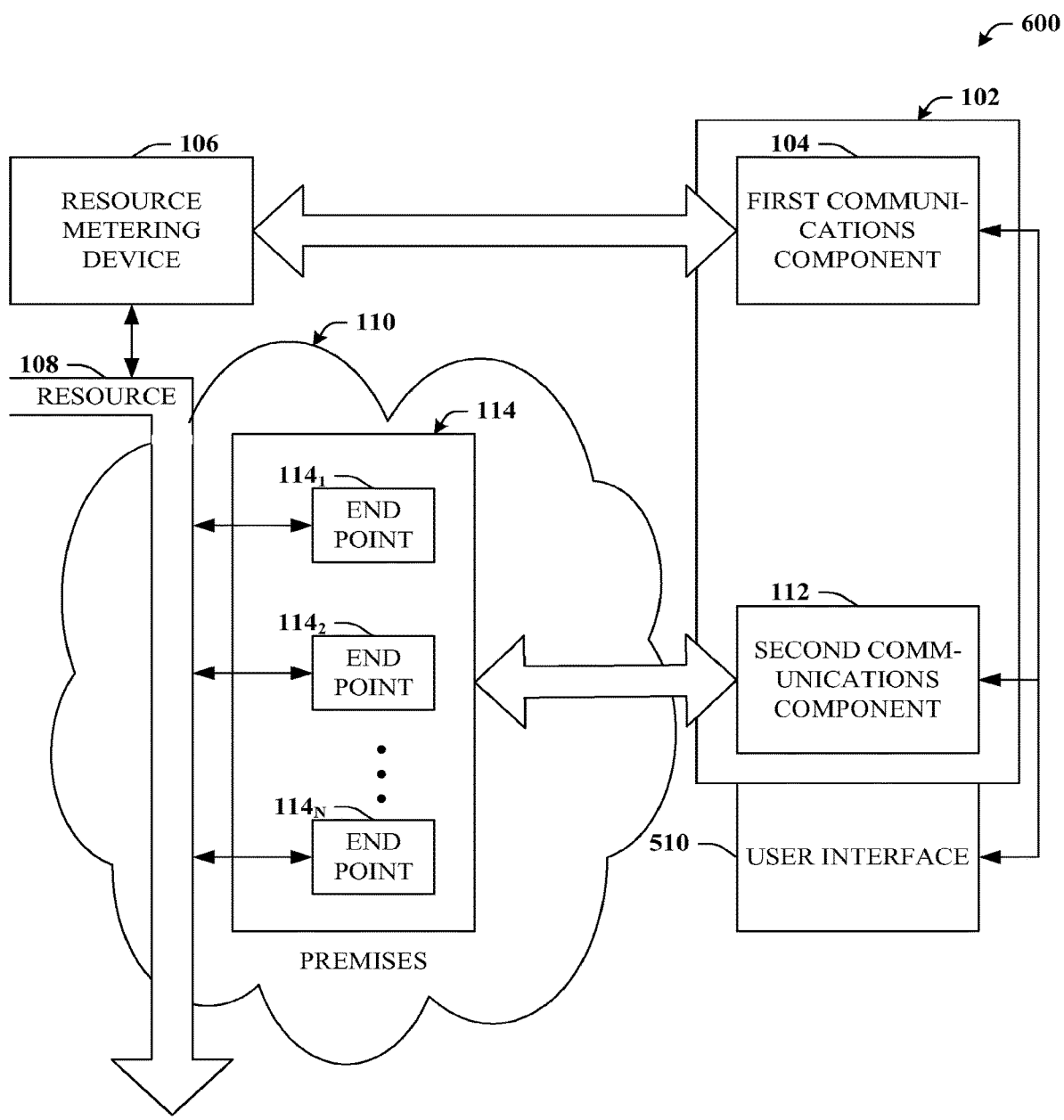
FIG. 6 is a block diagram of a system that can provide an interface in connection with management of resource consumption.

Referring now to FIG. 6, system 600 that can provide an interface in connection with management of resource consumption is depicted. Generally, system 600 can include user interface 510 that can be associated with hub 102, wherein hub 102, as detailed herein, can be configured to communicate with multiple resource consumption-related entities, such as consumption endpoint(s) 114. In other words, user interface 510 can provide various I/O capabilities for hub 102. As such, user interface 510 can provide a display or touch screen as well potentially any other suitable I/O feature such as, e.g., speakers, buttons, pointing or selection mechanisms and so forth.

As depicted, hub 102 can include first communications component 104 that can be configured to communicatively couple to resource metering device 106 that monitors consumption of resource 108 at a premises 110 or a predefined portion thereof. In addition, hub 102 can include second communications component 112 that can be configured to communicatively couple to a set of consumption endpoints 114 that manage local consumption of resource 108 such as, e.g., a thermostat, a temperature control unit (TCU), a smart plug, a smart power strip, a load control device, or a smart appliance.

However, in addition to what is depicted, hub 102 can also include other components, detailed herein such third communications component 402, management component 408, intelligence component 414, or any other suitable component or device with which hub 102 is coupled or integrated. Regardless of the composition of hub 102, interface 510 can be communicatively coupled to hub 102 and adapted to enable input of instructions or other data intended for hub 102 or devices with which hub 102 communicates (e.g., consumption endpoints 114, resource metering device 106, data store 416, remote server 512 . . . ) or to present information received by hub 102, for instance, to a user. Thus, user interface 510 can be configured to, inter alfa, enable input associated with management of the set of consumption endpoints 114.

It should be understood that while user interface 510 can be physically integrated with hub 102, for example as a single, integrated unit, such need not be the case. Rather, in one or more aspect, user interface 510 can be physically remote from hub 102, which can provide a number of advantages, as further detailed infra. Briefly, one such advantage can be that substantially any suitable user interface (UI), including a UI associated with a different device (e.g., a computer, phone, integrated display or the like) can be employed to operate as user interface 510. Hence, other or existing equipment can be leveraged including equipment that is not or need not be located at premises 110 or otherwise confined to a location suitable for listening to resource metering device 106 and/or consumption endpoints 114. Rather, hub 102 can be programmed by a remote device serving as user interface 510 or that remote device, say a mobile phone, can receive and present various information delivered by hub 102, such as alerts or other messages or data.

Figure 7:
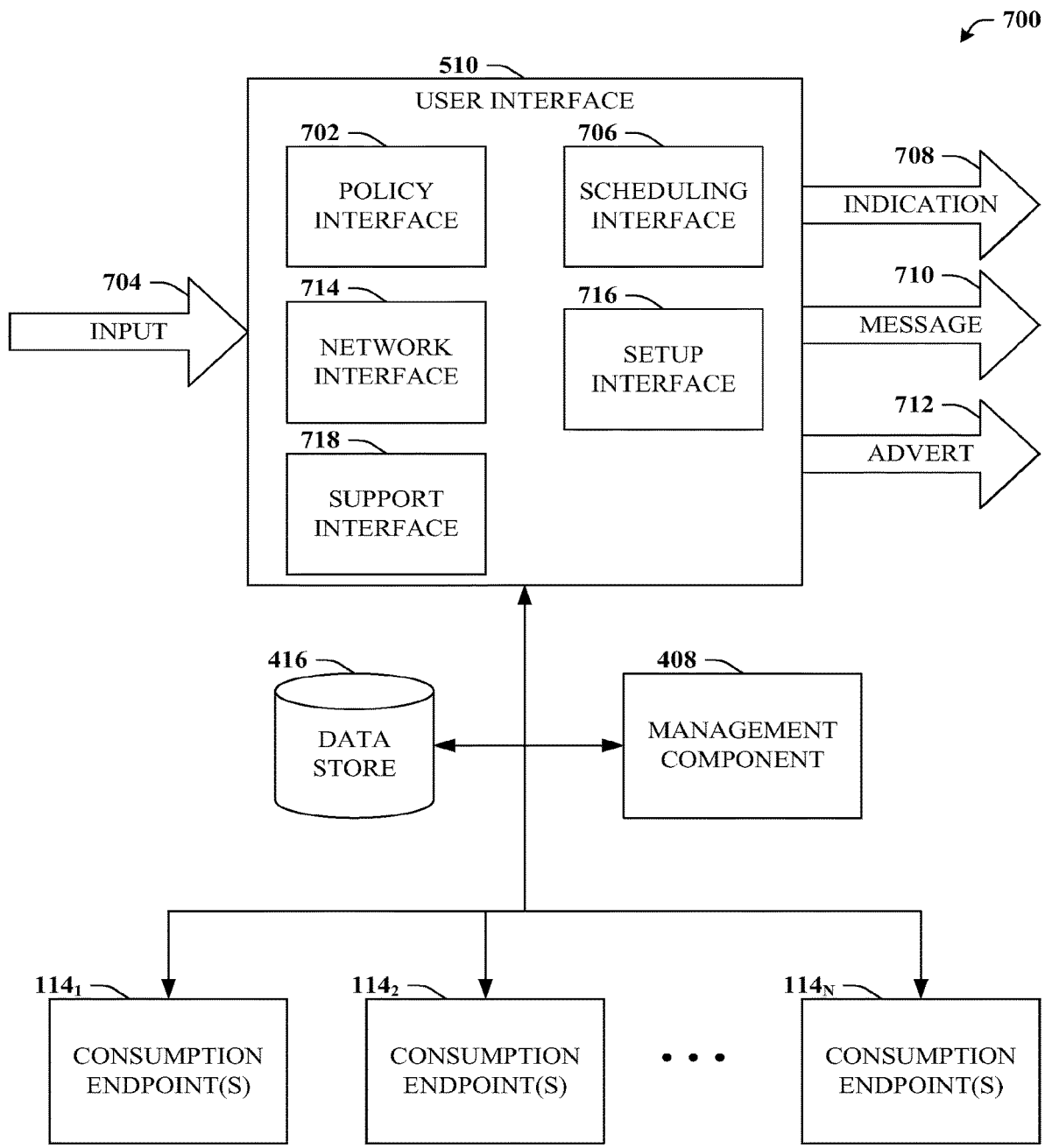
FIG. 7 illustrates a block diagram of a system that provides additional detail with respect to the user interface.

FIG. 7 relates to various exemplary types of suitable input to user interface 510 as well as suitable output of user interface 510 potentially based upon the received input. With reference now to FIG. 7, system 700 provides additional detail with respect to user interface 510. Generally, system 700 can include user interface 510, which, as noted, can be either physically coupled to or physically remote from hub 102 and/or related subcomponents. As discussed, user interface 510 can be configured to enable input 704 associated with management of the set of consumption endpoints 114. In one or more aspect, input 704 can relate to or define at least one of a mode of operation (e.g., for the consumption endpoints 114), a temperature setting or another environmental or device setting associated with premises 110 or the predefined portion thereof, an amount of resource 108 to consume, an amount of resource 108 to consume as a function of price-per-unit of resource 108, an occupancy state within premises or the predefined portion thereof, and so forth. It should be underscored that certain input 704 can result in varying behavior or varying instructions that control behavior for various consumption endpoints 114. In other words, although input 704 might be the same, the actual instructions to or behavior of various consumptions endpoints 114 (e.g., a thermostat versus an appliance) can differ.

As discussed previously, hub 102 can manage consumption endpoints 114 according to one or more policies 502. In accordance therewith, such policies can be input via user interface 510, and particularly via a policy interface 702 included in or provided by user interface 510. Specifically, policy interface 702 can be configured to receive input 704 that defines policies 502 associated with the set of consumption endpoints 114. In one or more aspect, such policies 502 can determine at least one of (i) actions of at least one consumption endpoint 114 in response to a price associated with resource 108; (ii) actions of at least one consumption endpoint 114 in response to an alert or load control message received from utility resource provider 212 or resource metering device 106; (iii) a resource priority associated with the set of consumption endpoints 114 in connection with a limitation on or a shortage of resource 108; (iv) whether to opt-in or opt-out of a program or service associated with utility resource provider 212; or (v) whether a notification is issued to a user such as a request for a response, verification, or other feedback. For example graphical depictions of the above-mentioned features, see e.g., FIGS. 18A and 19B, infra.

Figure 16B:
Figure 16C:
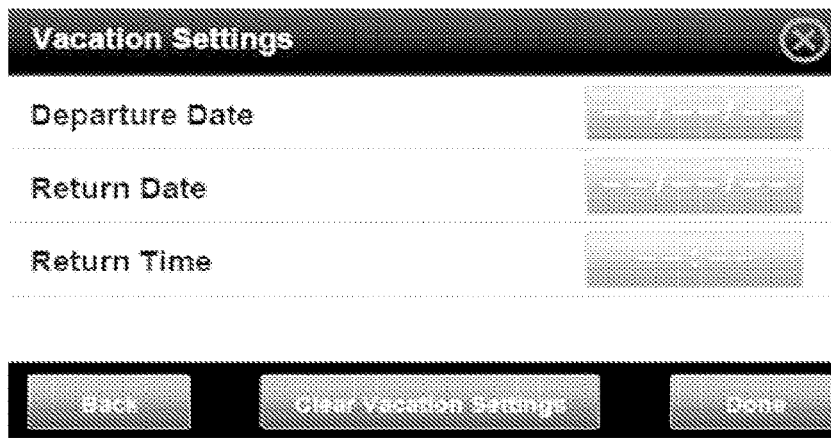

Furthermore, given that hub 102 can employ a schedule in order to manage certain aspect of premises 110 as previously detailed, user interface 510 can also include scheduling interface 706 that can be configured to receive input 704 that relates to or defines a schedule of operation of one or more of the set of consumption endpoints 114. For instance, the schedule of operation included in scheduling interface 706 can determine at least one of a time of operation or inactivity, a preferred mode of operation, a temperature setting, or an amount of resource 108 to consume, as well as, e.g., a period for vacation settings or the like. For example graphical depictions of the above-mentioned features, see e.g., FIG. 16B or 16C.

Other features that can be provided by user interface 510 can relate to presentation of various relevant data in connection with hub 102 and/or premises 110. For example, in one or more aspect, user interface 510 can be configured to present indication 708 of a state of or conditions associated with premises 110, the predefined portion thereof, or an environment thereof. Indication 708 can relate to at least one of real-time consumption of resource 108, real-time costs associated with the consumption of resource 108, an aggregate history or portion thereof of the consumption of resource 108 or costs associated therewith, a forecast of future consumption of resource 108 or costs associated therewith, a comparison to resource consumption or associated costs in connection with one or more disparate premises (e.g., comparison with other users with like demographics) or consumption endpoints 114 (e.g., comparison by device), an ambient condition associated with premises 110 (e.g., ambient temperature or humidity), the predefined portion thereof, or the environment thereof. For example graphical depictions of the above-mentioned features, see e.g., FIG. 17B, 17C, 18B, or 19A.

In another example aspect, user interface 510 can be configured to present indication 708 in a manner that relates to a state of or a parameter associated with at least one consumption endpoint 114. To illustrate, in this case, indication 708 can be, e.g., a current ambient condition associated with premises 110, the predefined portion thereof, an environment thereof, a device associated with at least one consumption endpoint 114, or a cost or resource savings of the device based upon a particular model, design, setting or operation mode. For example graphical depictions of the above-mentioned features, see e.g., FIG. 17B or 19A.

Additionally or alternatively, user interface 510 can be configured to present messages, alerts, or queries, depicted here as message 710, received from resource metering device 106, from utility resource provider 212, or from a third-party entity. For example, such message(s) 710 can relate to important alerts relating to grid conditions or the like (see FIG. 19B). Moreover, user interface 510 can be configured to present advertisements 712 received from resource metering device 106, from utility resource provider 212, or from a third-party entity. For instance, advertisement 712 can indicate that if a user is willing to opt-in to a particular program, then that user (or associated premises 110) will be eligible for a discount during, e.g., non-peak hours. As another example, a disparate, competing utility resource provider can employ advertisement 712 as an incentive to switch providers. As a third example, advertisement 712 can be employed in connection with lead generation. For example, residential solar installers or home energy audit companies as well as retailers (e.g., appliance discounts and/or recommendations) can leverage advertisement 712 in suitable ways.

Figure 20B:
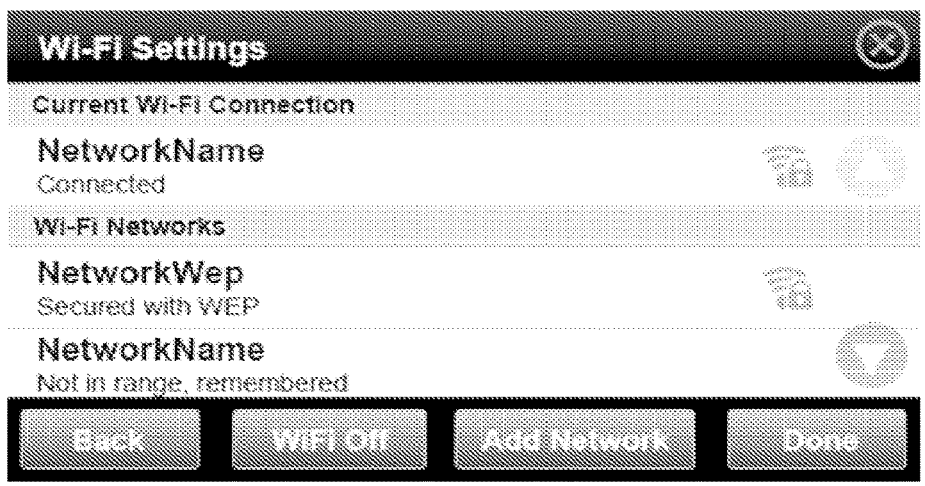

Continuing the discussion of FIG. 7, user interface 510 can further include or provide network interface 714 that can be configured to manage a home area network (HAN). Network interface 714 can be employed for, inter alia, setting up networks associated with various communications component 104, 112, or 402. In one or more aspect, network interface 714 can enable at least one of connection or disconnection of hub 102 to or from resource metering device 106 via first communications component 104 (see e.g., FIG. 20A), connection or disconnection of hub 102 to or from the set of consumption endpoints 114 via second communications component 112 (see e.g., FIG. 19C), connection or disconnection of hub 102 to or from LAN 404 or a WAN 406 via third communications component 402 (see e.g., FIG. 20B), or connection or disconnection of user interface 510 or an associated device to or from hub 102.

Figures 18A, 18B:
Figure 20C:
Figure 21A:
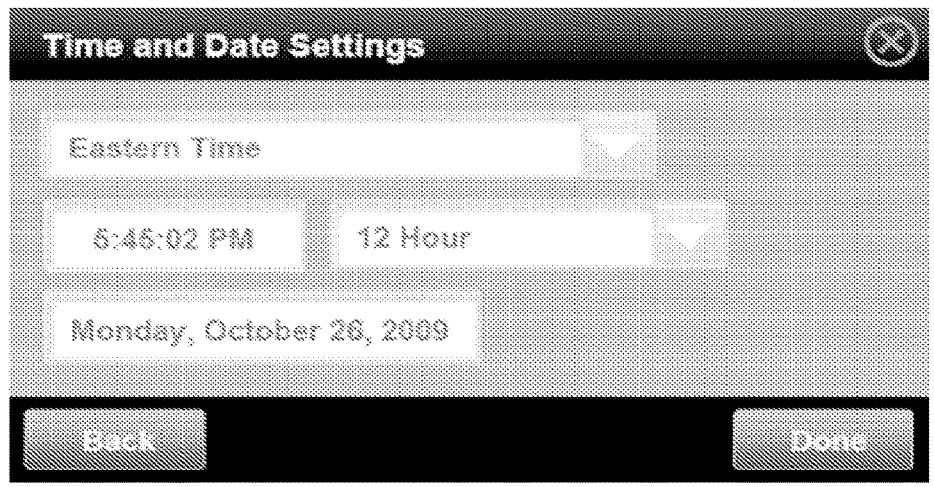
Figure 21B:
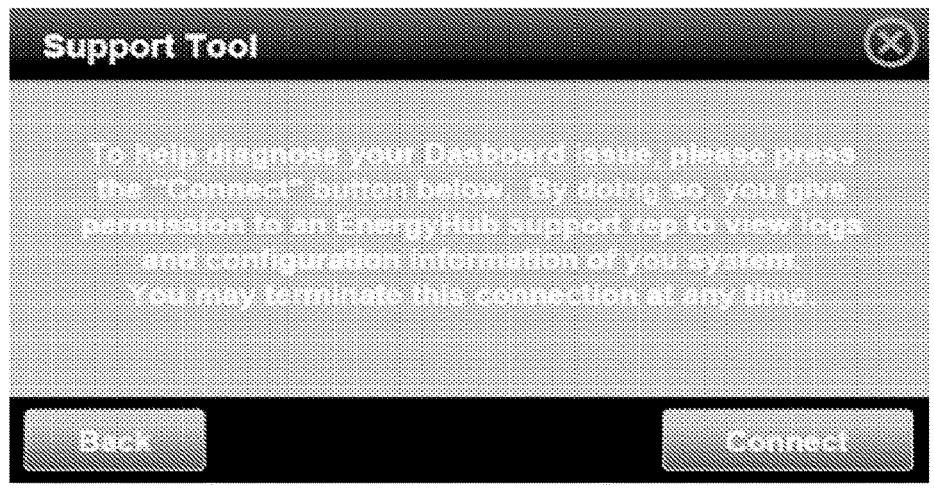

In addition, user interface 510 can also include setup interface 716 that can be configured to define settings of a user or of the premises or the predefined portion thereof (see e.g., FIG. 18A, 20C, or 21A). In one or more aspect, setup interface 716 can enable presentation or review of at least one of language, location, time, date, or at least one preferred or current utility resource provider 212. Likewise, user interface 510 can further include support interface 718. Support interface 718 can be configured to access customer support associated with at least one of utility resource provider 212 or a third-part entity (see, e.g., FIG. 21B).

Figure 8:
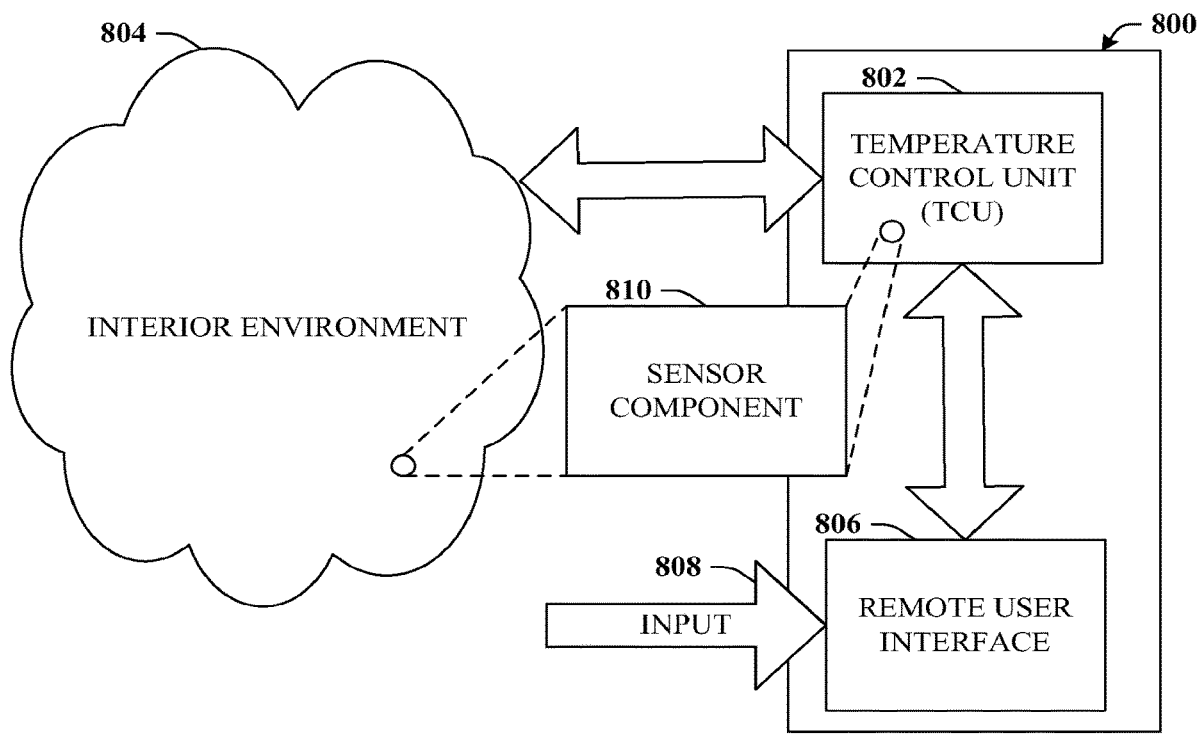
FIG. 8 depicts a block diagram of a system that can provide remote management of certain resource consumption.

With reference now to FIG. 8, system 800 that can provide remote management of certain resource consumption is provided. Typically, system 800 can include one or more temperature control unit (TCU) 802 configured to control climate conditions associated with interior environment 804. As used herein, TCU 802 is intended to represent a portion of a thermostat device, and in particular that portion that, via various electronic switches or relays, activates certain HVAC equipment in order to control climate conditions. In addition, system 800 can farther include remote user interface 806 that can be physically remote from and communicatively coupled to the one or more TCU 802. Moreover, remote user interface 806 can be configured to control TCU 802 based upon input 808 received at remote user interface 806.

It should be understood that conventional thermostats typically include a controller that activates HVAC equipment, sensors that collect data about an interior environment in order to determine when to activate HVAC equipment, and a user interface for controlling the thermostat or inputting preferences. Such thermostats are well-known, and are generally mounted on an interior wall as a single unit. Accordingly, it is to be underscored the disclosed subject matter separates various features of the thermostat as physically distinct entities, which can provide improved features or convenience as well as other potential benefits.

For example, unlike conventional thermostats, system 800 employs a user interface (e.g., remote user interface 806) that is physically remote from TCU 802. Such a configuration allows TCU 802 to be much simpler in design and, moreover can result in more convenient placement of TCU 802, since the physical relays and switches employed to control HVAC equipment need not be located on a wall-mounted unit as is customary with today's thermostats, but rather can be placed elsewhere such as a junction box, electrical cabinet, or the like. Equally as important, if not more so, by employing remote user interface 806, the UI employed to control TCU 802 need not be any set configuration or form factor, but can be substantially any suitable UI, including UIs associated with other devices such as computers, laptops, gaming consoles, netbooks, smart phones, or other mobile devices.

Accordingly, remote user interface 806 can be much more convenient to use when compared to UIs for conventional thermostats (e.g., confined to a fixed form factor and features, as well as a fixed location). Moreover, remote user interface 806 can be much more robust than conventional UIs associated with thermostats. For example, conventional, wall-mounted thermostats do not, as a rule, have power running to the unit, or very little power such as a few milliwatts, which is not enough to power a robust UI and related electronics. Hence, previous attempts to enhance the UI of thermostats have required either a very expensive installation (to run power lines to the thermostat) or to operate on battery power, which severely limits the capabilities as well as attractiveness of such a solution.

However, there has for some time been a need in the marketplace to improve the capabilities and desirability of the UI for a thermostat. For example, today's thermostats are often equipped with robust, energy-saving features. Yet, research shows that end consumers rarely ever take advantage of these features. For whatever reason, end consumers simply do not tend to use their thermostats, irrespective of capabilities, for anything but the most elementary purposes, such as to provide an indication of current temperature, or an input device for setting the current desired temperature. It is generally agreed the reason various features of modern thermostats are widely ignored, even by conservation-minded consumers is due to shortcomings of the associated UIs of thermostats. But, as noted above, attempts to enhance thermostat UIs have been ineffective in the marketplace.

Thus, additional benefits arise by employing remote user interface 806. First, remote user interface 806 can be much more robust. Second, very little or no change to existing infrastructure need be made, and new installs can be much less costly than requiring power to the thermostat. Third, the same UI (e.g., remote user interface 806) can be employed to control other consumption endpoints (e.g., appliances and devices) associated with a premises in addition to HVAC equipment, as well as other resources beyond electricity or gas or whatever resource(s) are employed by a given set of HVAC equipment. Accordingly, it should be appreciated that all or a portion of the description associated with user interface 510 can thus apply to remote user interface 806, and vice versa.

Moreover, it should be appreciated that in one or more aspects, TCU 802 can be further configured to monitor and control climate conditions associated with interior environment 804. As noted above, TCU 802 can include various switches and relays the controlling climate (via HVAC equipment). Thus, in order to also provide for monitoring, TCU 802 can include sensor component 810. Sensor component 810 can include various sensing or monitoring devices for determining climate-based conditions associated with interior environment 804, such as temperature, humidity, and so forth. As depicted, sensing component 810 can be built-in or integrated with TCU 802, or can be physically remote from TCU 802, yet communicatively coupled to exchange information with TCU 802.

Figure 9:
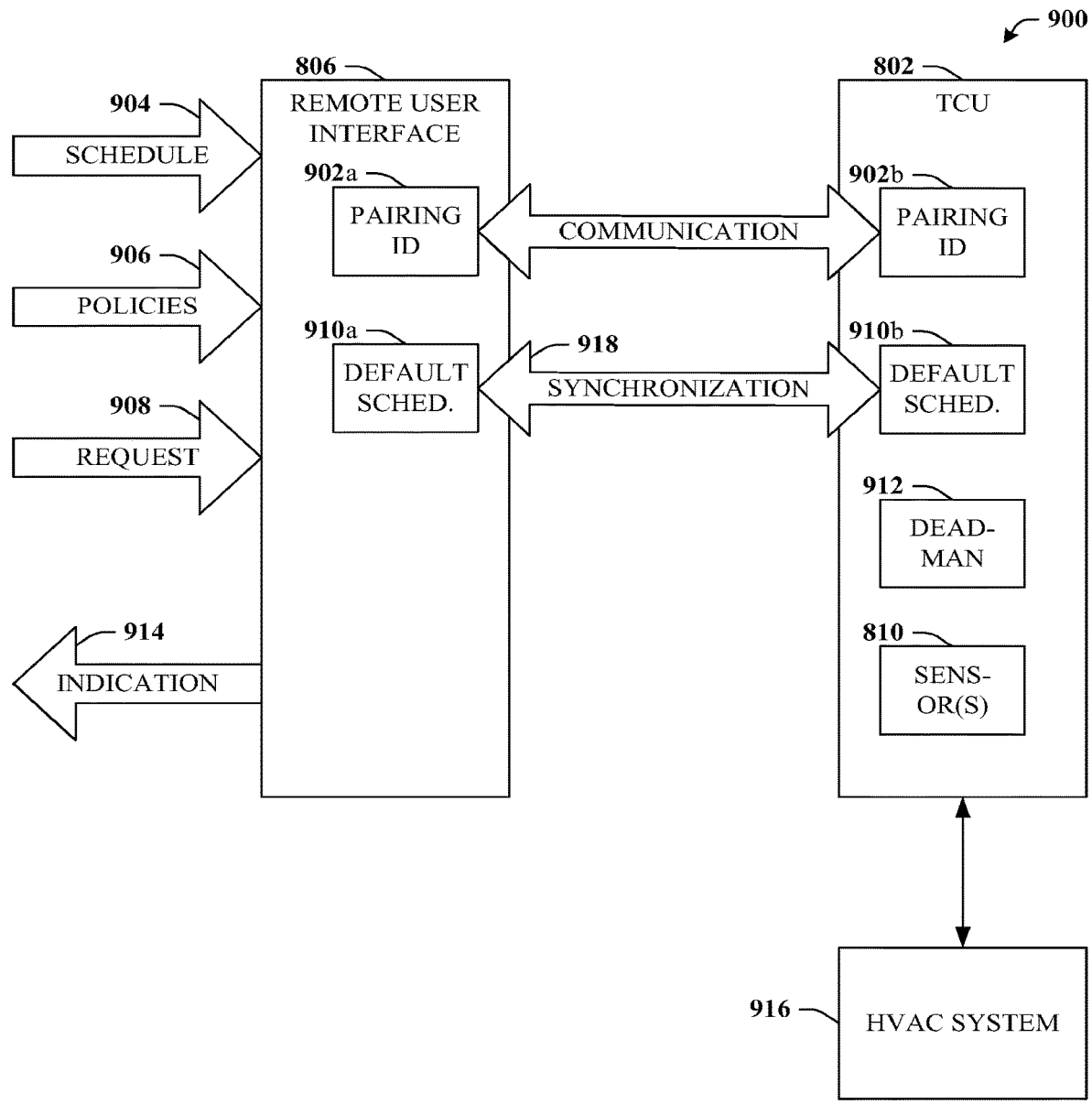
FIG. 9 illustrates a block diagram of a system that can provide additional features or aspects in connection with remote management of resource consumption.

Turning now to FIG. 9, system 900 that can provide additional features or aspects in connection with remote management of resource consumption is illustrated. For instance, in one or more aspect, remote user interface 806 can be preconfigured to pair with, or preconfigured to, upon initiation or bootup, automatically pair with, at least one of TCU 802 or sensor component 810 associated with TCU 802. Appreciably, TCU 802 can include a set of relays and switches for controlling HVAC system 916 or associated equipment. An example pairing mechanism is illustrated in FIG. 9 by way of the respective pairing IDs 902a and 902b, which can facilitate or enable communication between components 806 and 802 (or 810). In such cases, it should be appreciate that a user need not be required to following pairing procedures as appropriate pairing is preconfigured or automatically configured.

Irrespective of whether or not automatically paired, remote user interface 806 and TCU 802 can communicate by way of at least one of a ZigBee smart energy (SE) protocol, a ZigBee home automation (HA) protocol, a Z-Wave protocol, a CT-485 protocol, a RS-485 protocol, a power line carrier (PLC) protocol, an Ethernet protocol, a wireless fidelity (WI-FI) protocol, or an Internet Protocol (IP). Appreciably, other suitable protocols, in addition to those expressly noted, can be employed as well.

Moreover, in one or more aspect, remote user interface 806 can be configured to control TCU 802 based upon at least one of schedule 904 input or received by way of remote user interface 806, a set of policies 906 input or received by remote user interface 806, or a policy or request 908 from a utility resource provider or third-party entity, which can be substantially similar to policies 502 and control data 504, respectively, detailed supra.

In accordance with other features, in one or more aspect, remote user interface 806 and TCU 802 can be preconfigured with identical or substantially identical default schedules, labeled 910a and 910b, respectively. Moreover, in one or more aspect, remote user interface 806 or TCU 802 can be configured to synchronize schedules as illustrated by arrow 918. Thus, whether default schedules 910a, 910b are maintained or employed or other schedules are maintained or employed, such schedules are likely to evolve over time and/or be updated. As one example, a user at premise 110 can update a schedule at remote user interface 806, and either the updated schedule or the specific updates can be propagated to TCU 802. Likewise, as another example, TCU 802 can receive an update, which can be propagated to remote user interface 806, which can display the updated schedule. Furthermore, TCU 802 can be configured to operate in accordance with deadman mode 912. For example, deadman mode 912 can apply a set of safe or default setting when it is detected communication with remote user interface is lost. Advantageously, deadman mode 912 can be an optional setting. On the other hand, as briefly introduced previously, remote user interface 806 can include a display configured to present various indications 914. Indication(s) 914 can relate to, e.g., a state of or conditions associated with interior environment 804 or an exterior environment, or associated with a state of or a parameter associated with TCU 802 or to a device controlled by the one or more TCU (e.g., HVAC system 916).

FIGS. 10-15 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Figure 10:
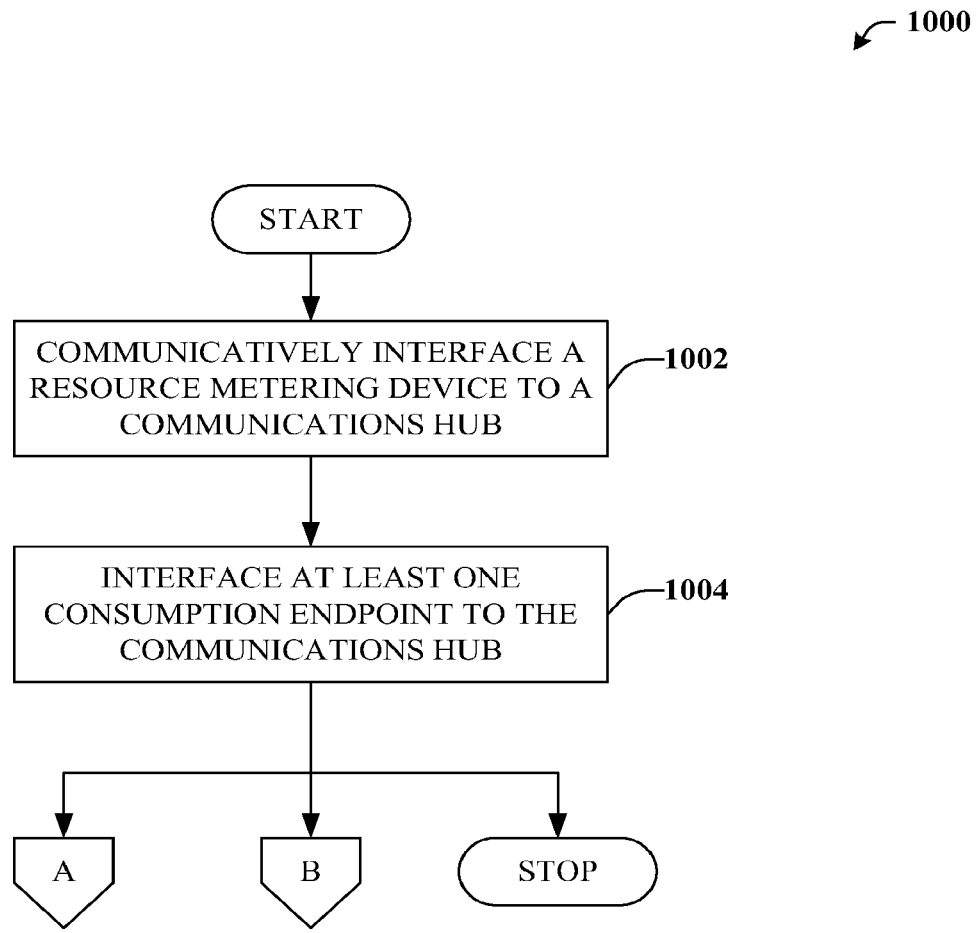
FIG. 10 depicts an exemplary flow chart of procedures defining a method for facilitating management of resource consumption.

Turning now to FIG. 10, exemplary method 1000 for facilitating management of resource consumption is depicted. Generally, at reference numeral 1002, a resource metering device for monitoring consumption of a resource such as, e.g., water, air, gas, electricity, or steam can be interfaced to a communications hub. Such interfacing can be according to substantially any network protocol supported by the resource metering device.

In addition, at reference numeral 1004, at least one consumption endpoint such as, e.g., a thermostat, a TCU, a smart plug, a smart power strip, a load control switch, or a smart appliance can be interfaced to the communications hub. In this case, such interfacing can be according to substantially any network protocol supported by the at least one consumption endpoint. Accordingly, the communications hub can concurrently interface and/or communicate or listen to both the resource metering device and consumption endpoints, allowing the communications hub to operate as layer of logic and control between resource metering device and the consumption endpoints, as well as a centralized management apparatus for a particular environment or premises.

Figure 11:
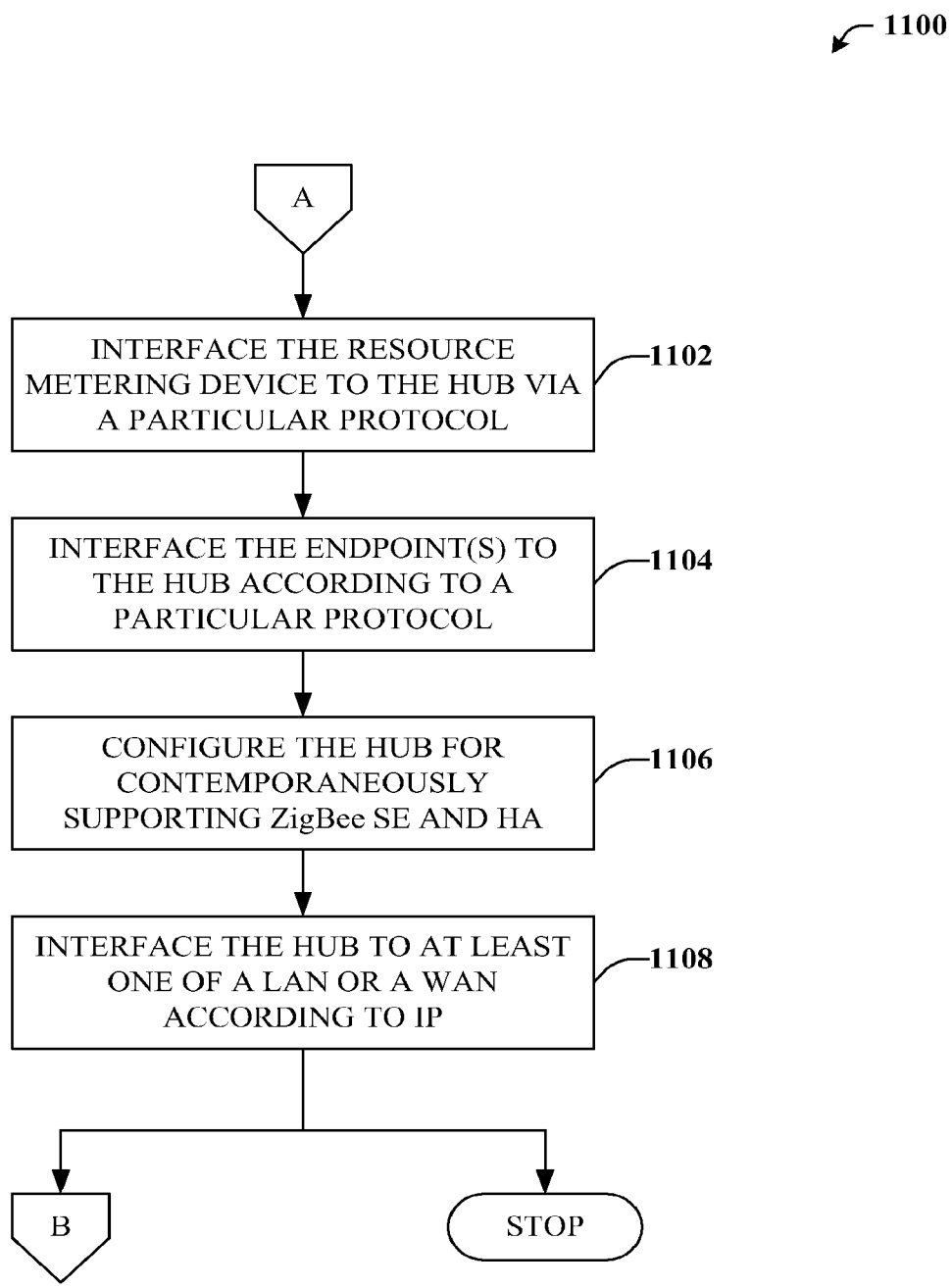
FIG. 11 is an exemplary flow chart of procedures that define a method for providing additional features or aspects in connection with interfacing the hub.

Referring now to FIG. 11, exemplary method 1100 for providing additional features or aspects in connection with interfacing the hub is illustrated. At reference numeral 1102, the resource metering device interfaced to the communications hub at reference numeral 1002 of FIG. 10, can be interfaced according to at least one of a ZigBee smart energy (SE) protocol, an encoded receiver-transmitter (ERT) protocol, an Internet protocol (IP), a power line carrier (PLC) protocol, or an advanced metering infrastructure (AMI) protocol.

Next to be described, at reference numeral 1104, the at least one consumption endpoint interfaced to the communications hub at reference numeral 1004 can be interfaced according to at least one of a ZigBee SE protocol, a ZigBee HA protocol, a Z-Wave protocol, an Ethernet protocol, a PLC protocol, or a WI-FI protocol.

Moreover, at reference numeral 1106, the communications hub can be configured for contemporaneously supporting ZigBee SE profile-based communications and ZigBee HA profile-based communications between the communications hub and the at least one consumption endpoint. Given that ZigBee HA and ZigBee SE are typically incompatible standards, such can be accomplished, e.g., by routing both ZigBee smart energy profile messages and ZigBee home automation profile messages using ZigBee smart energy profile for encryption, transmission, and network management. As a result, the communications hub can interface to a wider range of devices, as well as the ability to bridge a set of devices that would be otherwise incapable of direct inter-communication.

Additionally, at reference numeral 1108, the communications hub can be interfaced to at least one of a local area network (LAN) or a wide area network (WAN) according to one or more Internet Protocol (IP). Hence, in addition to capabilities that provide communication with both a resource metering device and resource consumption endpoints, the hub can also leverage communications over more ubiquitous networks such as the Internet or a home area network (HAN).

Figure 12:
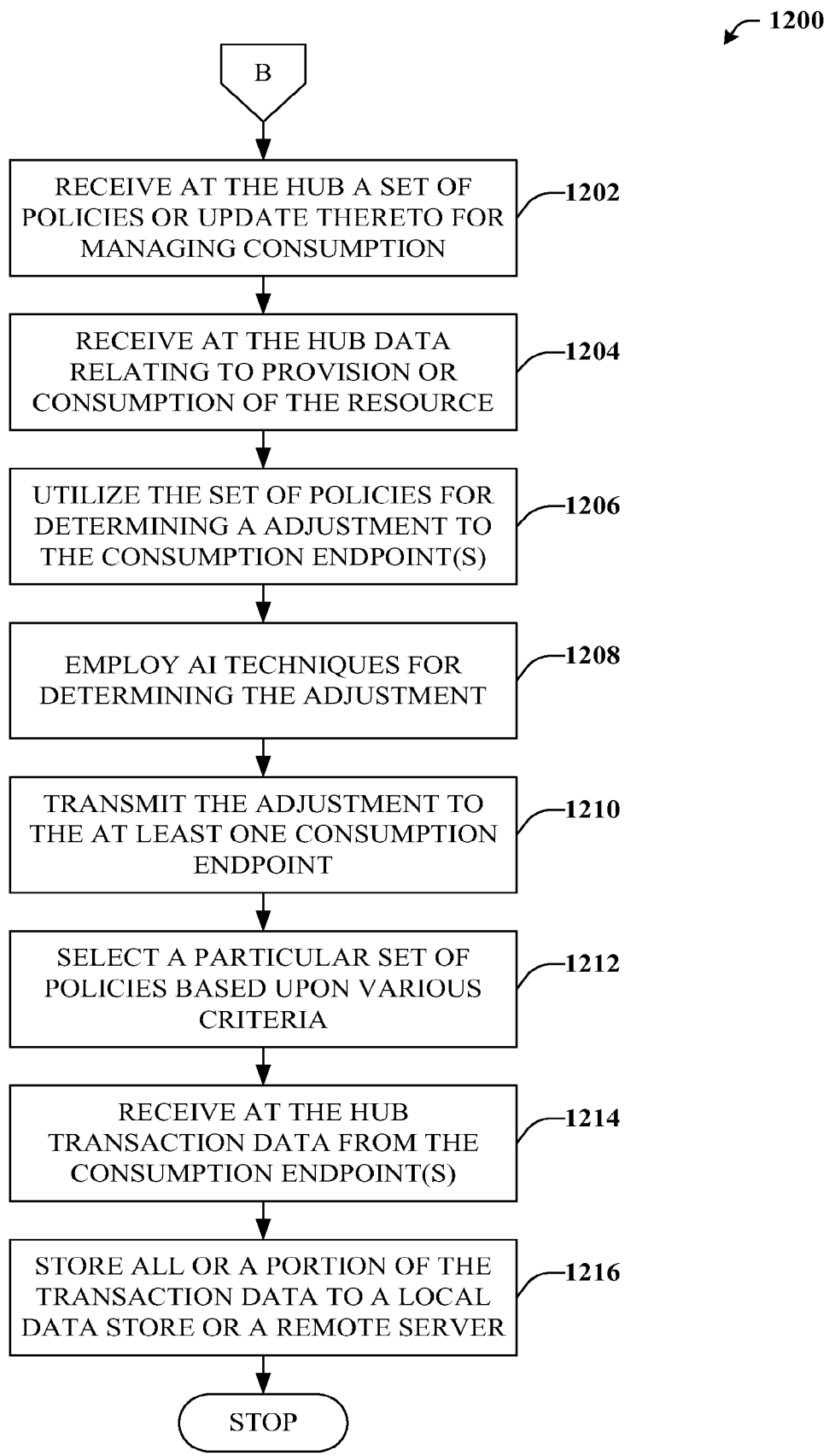
FIG. 12 depicts an exemplary flow chart of procedures defining a method for providing additional features or aspects in connection with management of resource consumption.

With reference to FIG. 12, exemplary method 1200 for providing additional features or aspects in connection with management of resource consumption is depicted. At reference numeral 1202, all or a portion of, or an update to, a set of policies for managing consumption of the resource with respect to the at least one consumption endpoint can be received at the communications hub. In other words, data relating to policies for determining the consumption of the resource by various endpoints can be collected at the communications hub.

In addition, the communications hub can also receive various other data. For example, at reference numeral 1204, the communications hub can receive control data including any of a variety of information that can be supplied by an associated utility resource provider. By way of illustration, such control data can relate to, e.g., an indication of a current rate of consumption of the resource, an indication of aggregate consumption of the resource over a predefined period of time, a current or forecasted unit price of the resource, a condition or event associated with provision of the resource, a specific command or instruction intended for at least one consumption endpoint included in the set of consumption endpoints, or a text message intended for display by at least one consumption endpoint included in the set of consumption endpoints.

At reference numeral 1206, the set of policies received at reference numeral 1202 can be utilized in conjunction with the control data received at reference numeral 1204 for determining an adjustment relating to modifying the behavior of or a setting of the at least one consumption endpoint. Put another way, rather than relying solely upon a preprogrammed mode of operation for endpoints or solely upon control signals propagated by a utility resource provider, multiple data sets can be examined in order to determine appropriate behavior of the consumption endpoints, which can result in selecting one preference over another competing preference, or selecting a compromise between the competing interests.

In that vein, at reference numeral 1208, artificial intelligence (AI) techniques can be employed in conjunction with the set of policies and/or the control data for determining the adjustment relating to modifying the behavior of or a setting of the at least one consumption endpoint that was provided at reference numeral 1206. For instance, Bayesian probabilities or confidence measures can be employed in connection with AI techniques, as can various inferences based upon machine learning techniques related to, e.g., historical analysis, current or previous feedback, and/or previous determinations or inferences. Regardless of the manner employed to determine a suitable adjustment for the at least one consumption endpoint, at reference numeral 1210, the adjustment can be transmitted to the at least one consumption endpoint for processing, or even entirely filtered (not transmitted) in some cases.

Continuing the discussion of FIG. 12, at reference numeral 1212 a particular set of policies can be selected based upon, e.g., a type of device associated with the at least one consumption endpoint (e.g., a priority assigned to the function of the device), a determination of an occupancy state associated with the premises (e.g., whether or not the premises or portions thereof are occupied, as well as a type of occupation), a calendar or schedule, or a parameter associated with the control data (e.g., inordinately high prices or emergency events).

Furthermore, in addition to management or control of various consumption endpoints, the communications hub can also provide for thorough monitoring or tracking of the consumption endpoints. For example, at reference numeral 1214, transaction data can be received at the communications hub, either by persistent monitoring or via periodic polling or auditing. Such transaction data can relate to a description of at least one of a state or a history of states associated with the at least one consumption endpoint, an operational mode or history thereof of the at least one consumption endpoint, or an input or transaction or history thereof of the at least one consumption endpoint. Moreover, at reference numeral 1216, all or a portion of the transaction data can be stored to at least one of a local data store or data store associated with a remote server.

Figure 13:
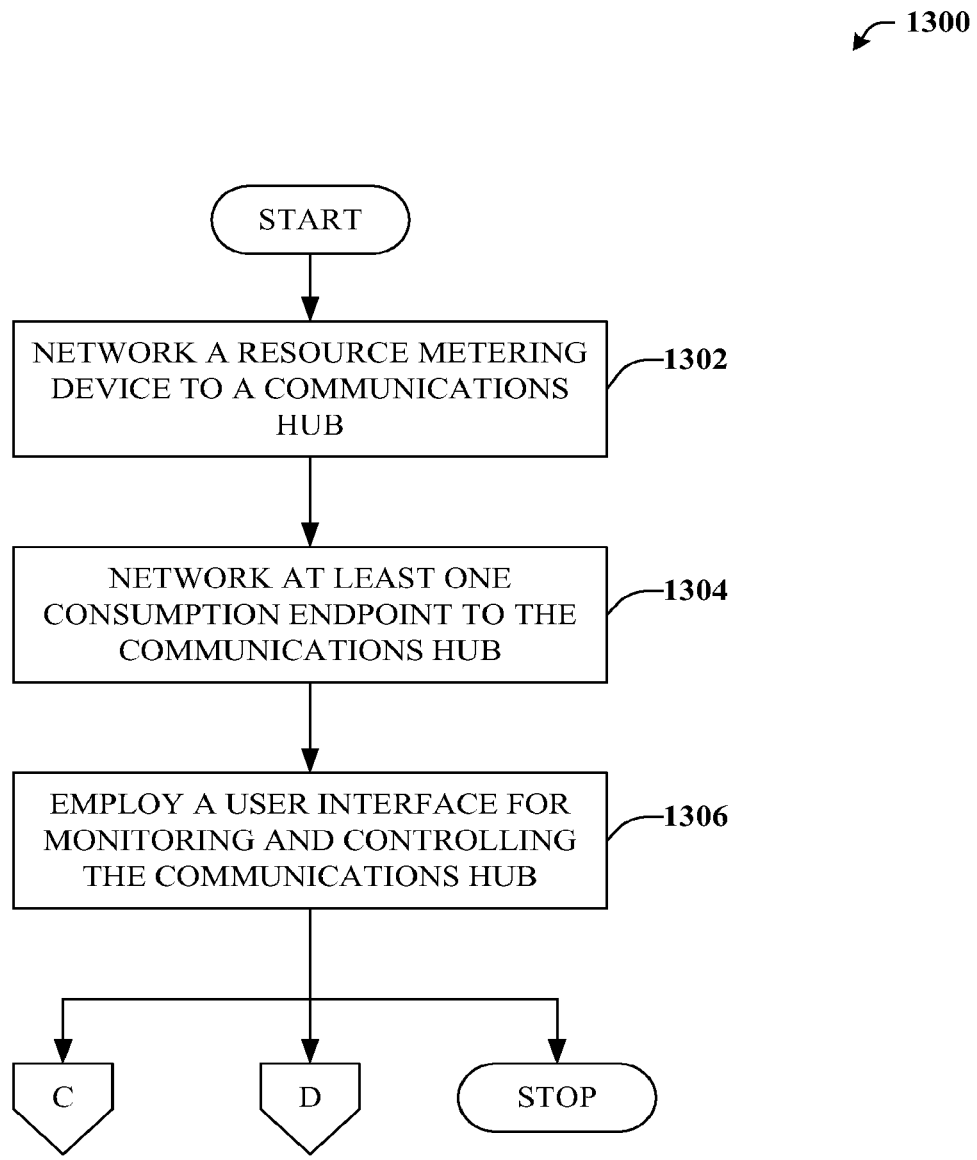
FIG. 13 depicts an exemplary flow chart of procedures defining a method for interfacing to a communications hub for facilitating management of resource consumption.

FIG. 13 provides exemplary method 1300 for interfacing to a communications hub for facilitating management of resource consumption is illustrated. Generally, at reference numeral 1302, a resource metering device for monitoring consumption of a resource at a premises can be networked to a communications hub. Such networking can be according to substantially any network protocol supported by the resource metering device.

In addition, at reference numeral 1304, at least one consumption endpoint (e.g., a thermostat, a TCU, a smart plug, a smart power strip, a load control switch, or a smart appliance) can be networked to the communications hub. In this case, such networking can be according to substantially any network protocol supported by the at least one consumption endpoint. Moreover, at reference numeral 1306, a user interface can be employed for monitoring and controlling the communications hub.

Figure 14:
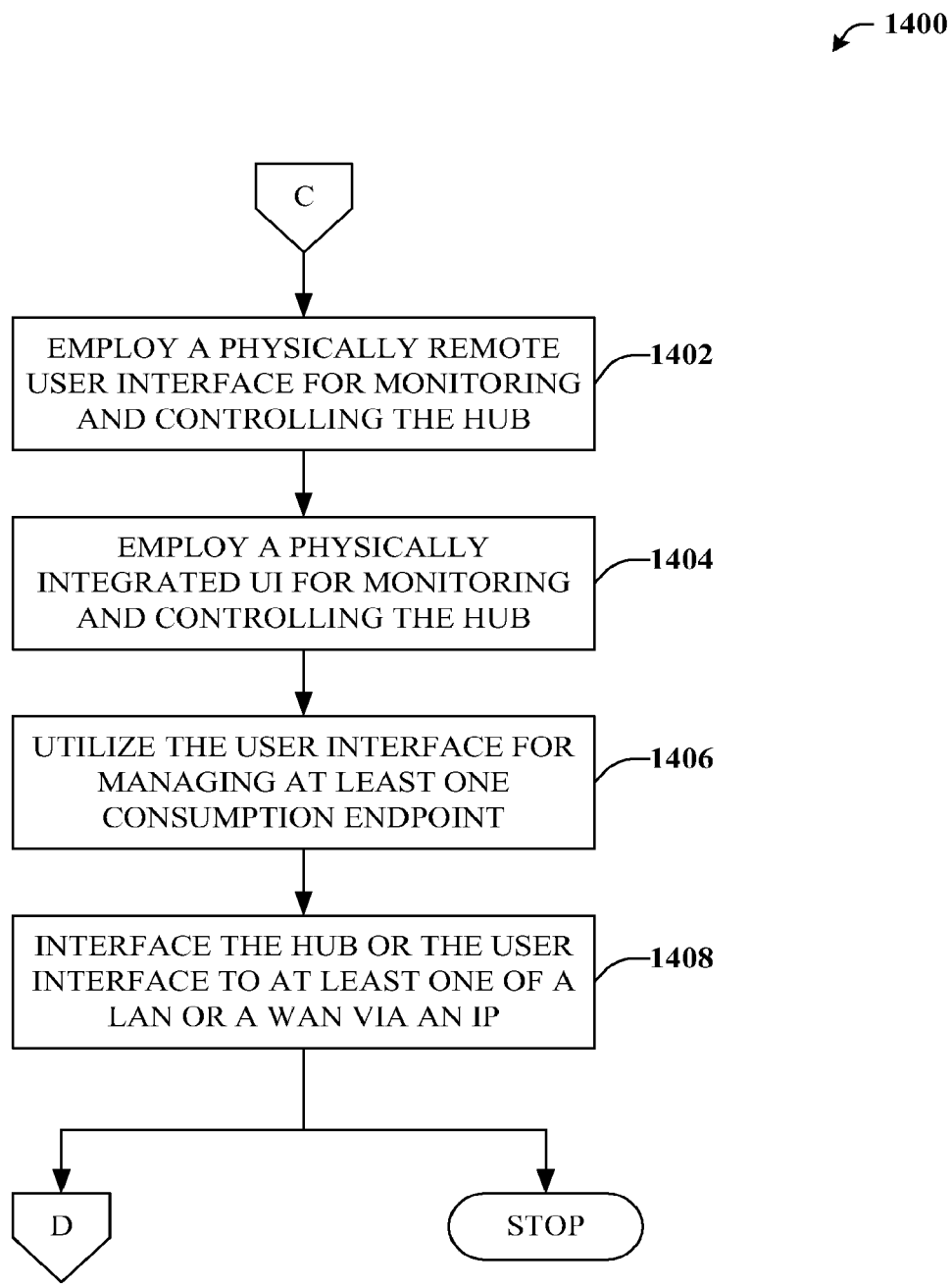
FIG. 14 depicts an exemplary flow chart of procedures defining a method for employing various interface types in connection with a communications hub for facilitating management of resource consumption.

Turning now to FIG. 14, exemplary method 1400 for employing various interface types in connection with a communications hub for facilitating management of resource consumption is provided. For example, at reference numeral 1402, the user interface employed for monitoring and controlling the communications hub as detailed with respect to reference numeral 1306 of FIG. 13 can be a physically remote user interface. In an alternative embodiment, at reference numeral 1404, the user interface employed for monitoring and controlling the communications hub as detailed with respect to reference numeral 1306 can be a physically integrated user interface.

In either case, at reference numeral 1406, the user interface can be utilized for managing at least one consumption endpoint. For example, forwarding or reconstructing control signals intended for the consumption endpoint, or controlling the consumption endpoint according to preferences, policies, or schedules, as further detailed in connection with FIG. 15. Furthermore, at reference numeral 1408, at least one of the communications hub or the user interface can be interfaced to at least one of a LAN or a WAN according to one or more Internet Protocol.

Figure 15:
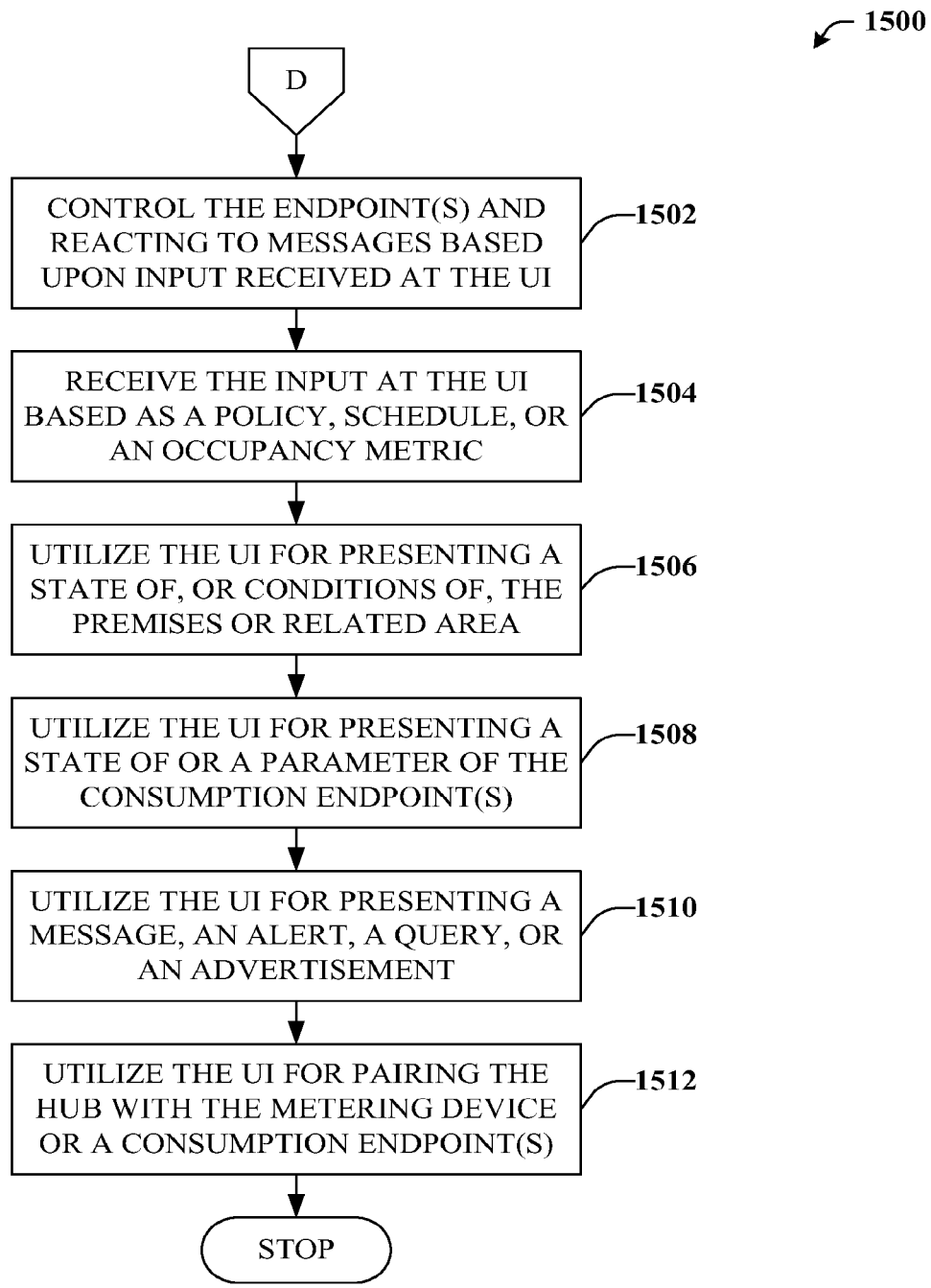
FIG. 15 is an exemplary flow chart of procedures that define a method for providing additional features or aspects in connection with interfacing to a communications hub for facilitating management of resource consumption.

Turning now to FIG. 15, exemplary method 1500 for providing additional features or aspects in connection with interfacing to a communications hub for facilitating management of resource consumption is depicted. Generally, at reference numeral 1502, the at least one consumption endpoint can be controlled, for example, based upon reactions to messages received from the resource metering device and further based upon input to the user interface. In other words, the consumption endpoints can be controlled based upon various data sets, included, e.g., messages received (typically from a utility resource provider) as well as input to the user interface (typically from a user), for instance as a set of policies, preferences, schedules, or the like.

In accordance therewith, at reference numeral 1504, the input detailed above in connection with reference numeral 1502, can be received at the user interface as at least one of a policy, a schedule, an occupancy metric (e.g., "Home", "Away", "Goodnight" or the like) or some suitable combination thereof. Moreover, at reference numerals 1506, 1508, and 1510 the user interface can be utilized for presenting various information, e.g., to a user. At reference numeral 1506, such information presented by user interface can relate to, e.g., a state of or conditions associated with the premises or an environment related thereto (e.g., a temperature associated with the premises or that for a room or section thereof). At reference numeral 1508, such information presented by user interface can relate to, e.g., a state of or a parameter associated with the at least one consumption endpoint (e.g., a current operation mode, resource usage, schedule, setting or the like). At reference numeral 1510, such information presented by user interface can relate to, e.g., a message, an alert, a query, or an advertisement received from at least one of the resource metering device, a utility resource provider, or a third-party entity. In addition, at reference numeral 1512, the user interface can be utilized for pairing the communications hub with at least one of the resource metering device or the at least one consumption endpoint.

FIGS. 16A-21B illustrate various example graphic depictions presented by a suitable user interface (e.g., 510 or 806) associated with hub 102 or TCU 802.

Figure 22:
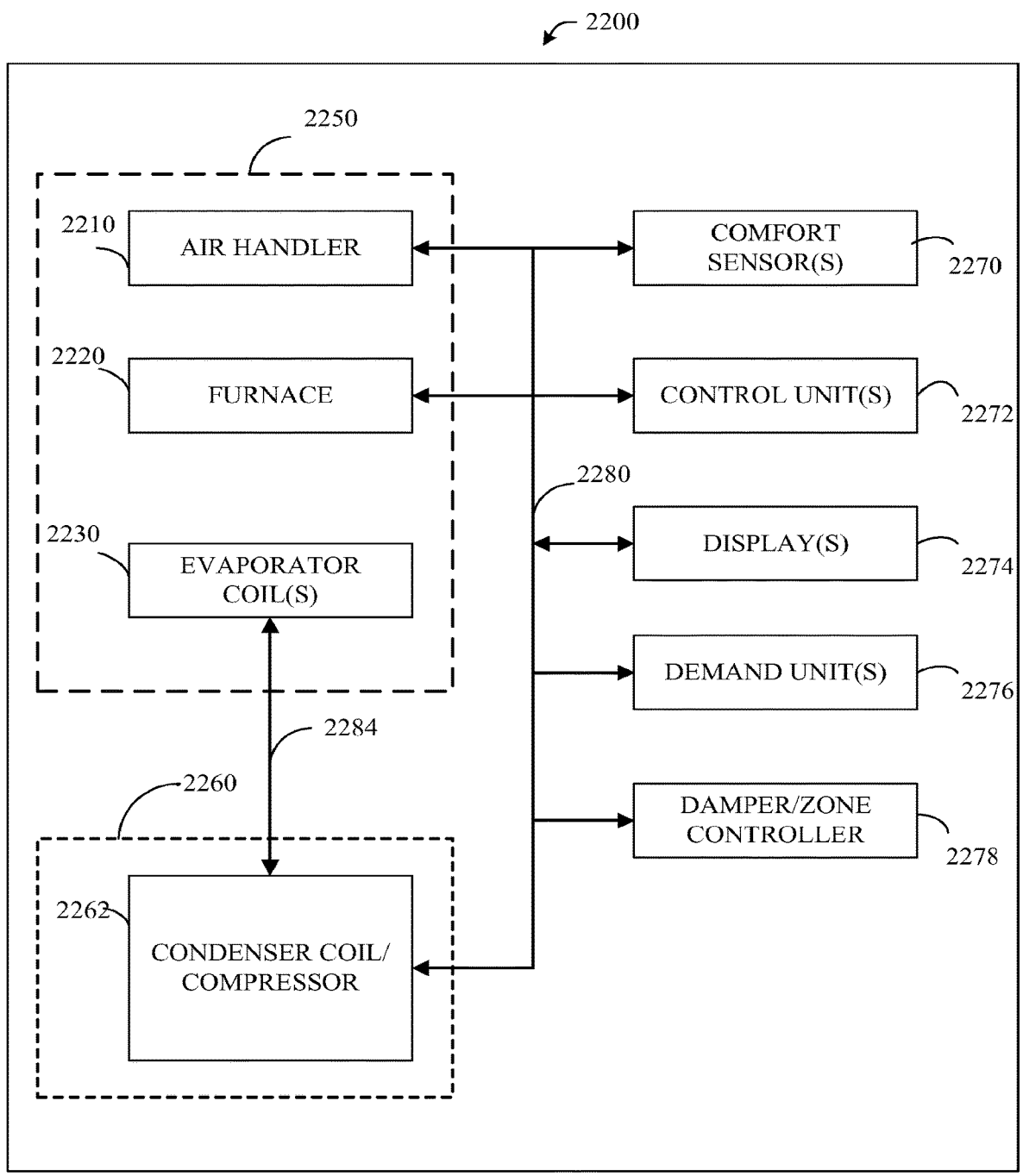
FIG. 22 is a high-level block diagram of a HVAC system.

FIG. 22 is a high-level block diagram of a HVAC system, generally designated 2200. The HVAC system 2200 may be configured to provide ventilation and therefore includes one or more air handlers 2210. In an alternative embodiment, the ventilation includes one or more dampers 2278 to control air flow through air ducts (not shown). Such control may be used in various embodiments in which the system 2200 is a zoned system. In the context of a zoned system 2200, the one or more dampers 2278 may be referred to as zone controllers 2278. In an alternative embodiment, the system 2200 is configured to provide heating and, therefore, includes one or more furnaces 2220, typically associated with the one or more air handlers 2210. In an alternative embodiment, the system 2200 is configured to provide cooling and includes one or more refrigerant evaporator coils 2230, typically associated with the one or more air handlers 2210. Such embodiment of the system 2200 also includes one or more compressors and associated condenser coils 2262, which are typically associated in one or more so-called "outdoor units" 2260. The one or more compressors and associated condenser coils 2262 are typically connected to an associated evaporator coil 2230 by a refrigerant line 2284. In an alternative embodiment, the system 2200 is configured to provide ventilation, heating and cooling, in which case the one or more air handlers 2210, furnaces 2220 and evaporator coils 2230 are associated with one or more "indoor units" 2250, e.g., basement or attic units.

A demand unit 2276 is representative of the various units exemplified by the air handler 2210, furnace 2220, and compressor 2262, and more generally includes an HVAC component that provides a service in response to control by the control unit 2272. The service may be any service normally associated with a conventional HVAC system, such as, for e.g., heating, cooling, or air circulation. The demand unit 2276 may provide more than one service, and if so, one service may be a primary service, and another service may be an ancillary service. For example, for a cooling unit that also circulates air, the primary service may be cooling, and the ancillary service may be air circulation (e.g. by a blower).

The demand unit 2276 may have a maximum service capacity. For example, the furnace 2220 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 2276 may be configured to provide a primary or ancillary service in staged portions. For example, a blower may have two or more motor speeds, with a different CFM value associated with each motor speed.

One or more control units 2272 control one or more of the one or more air handlers 2210, the one or more furnaces 2220 and/or the one or more compressors 2262 to approximately regulate the temperature of the premises. In various embodiments to be described, the one or more displays 2274 provide additional functions such as operational, diagnostic and status message display and an attractive, visual interface that allows an installer, user or repairman to perform actions with respect to the system 2200 more intuitively. Herein, the term "operator" will be used to refer either individually or collectively to any of installation personnel, a user, or a maintenance personnel unless clarity is served by greater specificity.

One or more separate comfort sensors 2270 may be associated with the one or more control units 2272 and may also optionally be associated with one or more displays 2274. The one or more comfort sensors 2270 provide environmental data, e.g. temperature and/or humidity, to the one or more control units 2272. An individual comfort sensor 2270 may be physically located within a same enclosure or housing as the control unit 2272. In such cases, the commonly housed comfort sensor 2270 may be addressed independently. However, the one or more comfort sensors 2270 may be located separately and physically remote from the one or more control units 2272. Also, an individual control unit 2272 may be physically located within a same enclosure or housing as a display 2274. In such embodiments, the commonly housed control unit 2272 and display 2274 may each be addressed independently. However, one or more of the displays 2274 may be located within the system 2200 separately from and/or physically remote to the control units 2272. The one or more displays 2274 may include a screen such as a liquid crystal display (not shown).

Although not shown in FIG. 22, the HVAC system 2200 may include one or more heat pumps in lieu of or in addition to the furnace 2220 and/or compressors 2262. In another alternative embodiment, one or more humidifiers or dehumidifiers may be employed to increase or decrease humidity. Additionally, dampers may be used to modulate air flow through ducts (not shown). Additionally, air cleaners and lights may be used to reduce air pollution, while air quality sensors may be used to determine overall air quality.

A data bus 2280, which in the illustrated embodiment is a serial bus, couples the one or more air handlers 2210, the one or more furnaces 2220, the one or more evaporator coils 2230, the one or more condenser coils and compressors 2262, the one or more control units 2272, the one or more remote comfort sensors 2270 and the one or more displays 2274 such that data may be communicated therebetween or thereamong. It will be understood that the data bus 2280 may be advantageously employed to convey one or more alarm messages or one or more diagnostic messages.

The data bus 2280 can be any bus that provides communication between or among the elements of the network. It should be understood that the use of the term "residential" is intended to be non-limiting; the network 2200 may be employed in any premises whatsoever, fixed or mobile. Other embodiments of the data bus 2280 are also contemplated, including e.g., a wireless bus, as mentioned previously, and 2-, 3- or 4-wire networks, including IEEE-1394 (Firewire™, Lynx™), Ethernet, Universal Serial Bus (e.g., USB 1.x, 2.x, 3.x), or similar standards. In wireless embodiments, the data bus 2280 may be implemented, e.g., using Bluetooth™ (e.g., IEEE standard 802.15.x), ZigBee or a similar wireless standard.

Figure 23:
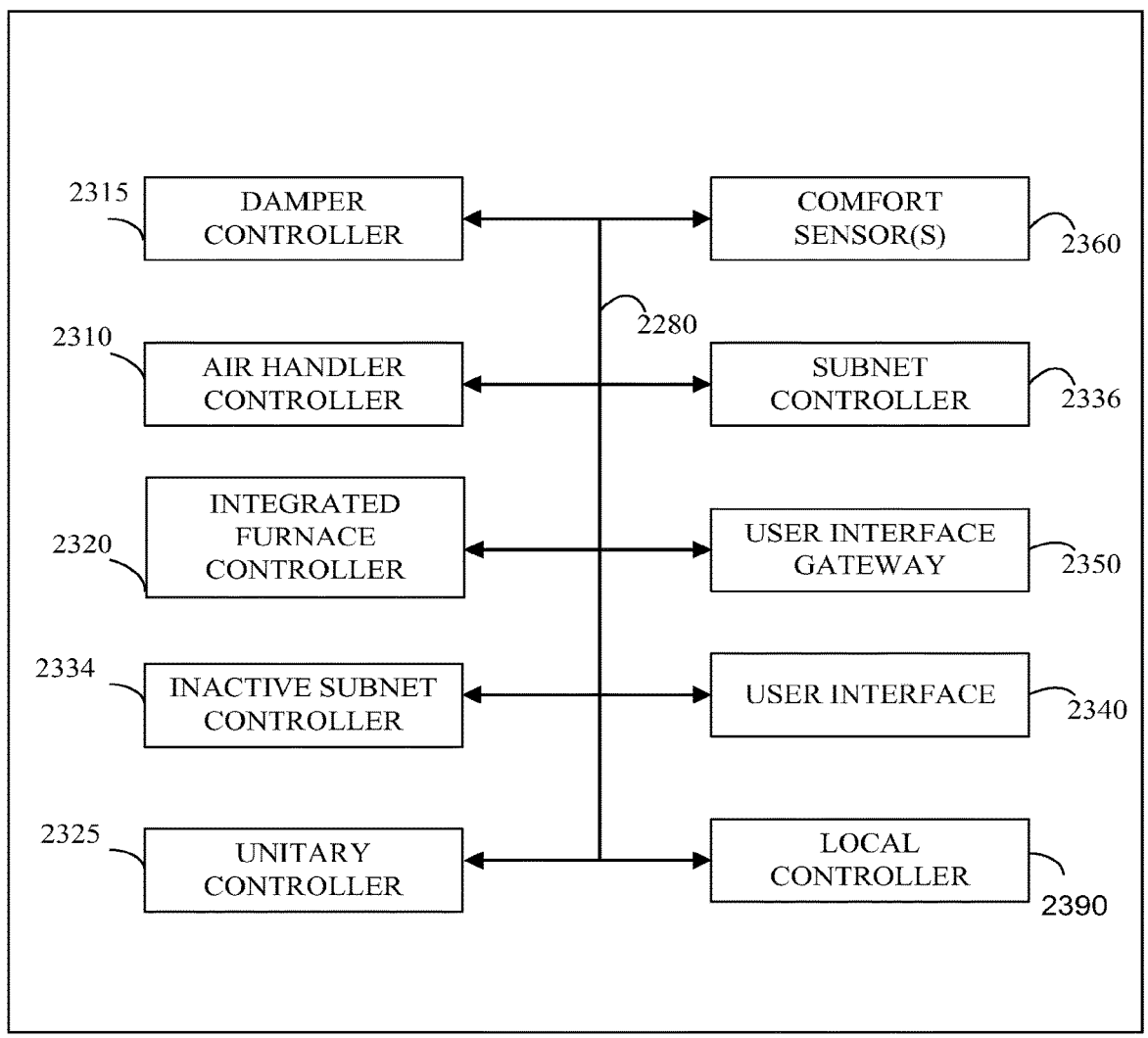
FIG. 23 is a high-level block diagram of one embodiment of an HVAC data processing and communication network.

FIG. 23 is a high-level block diagram of one embodiment of an HVAC data processing and communication network 2300 that may be employed in the HVAC system 2200. One or more air handler controllers (AHCs) 2310 may be associated with the one or more air handlers of FIG. 22. One or more integrated furnace controllers (IFCs) 2320 may be associated with the one or more furnaces 2220. One or more damper controller modules 2315, also referred to herein as a zone controller module 2315, may be associated with the one or more dampers 2278. One or more unitary controllers 2325 may be associated with one or more evaporator coils and one or more condenser coils and compressors 2262 of FIG. 22. The network 2300 includes an active subnet controller 2336 and an inactive subnet controller 2334. The active subnet controller ("ASC") 2336 may act as a network controller of the system 2200. The ASC 2336 is responsible for configuring and monitoring the system. 2200 and for implementation of heating, cooling, humidification, dehumidification, air quality, ventilation or any other functional operations therein. It will be understood that two or more ASC 2336 may also be employed to divide the network 2300 into subnetworks, or subnets, for simplifying various aspects of network management, including installation configuration, communication and control. Each subnet generally contains one indoor unit, one outdoor unit, a number of different accessories including humidifier, dehumidifier, electronic air cleaner, filter, etc., and a number of comfort sensors, subnet controllers and user interfaces. The inactive subnet controller ("ISC") 2334 is a subnet controller that does not actively control the network 2300.

In some embodiments, the ISC 2334 listens to all messages broadcast over the data bus 2280, and updates its internal memory to match that of the ASC 2336. In this manner, the ISC 2334 may backup parameters stored by the ASC 2336, and may be used as an active subnet controller if the ASC 2334 malfunctions. Generally, there is only one ASC 2336 in a subnet, but there may be multiple ISCs therein, or no ISC at all. Herein, where the distinction between an active or a passive SC is not germane the subnet controller is referred to generally as a subnet controller.

A user interface ("UI") 2340 provides a means by which an operator may communicate with the remainder of the network 2300. In an aspect, a user interface gateway 2350 provides a means by which a remote operator or remote equipment may communicate with the remainder of the network 2300.

Such a remote operator or equipment is referred to generally as a remote entity. A comfort sensor interface 2360, referred to herein interchangeably as a comfort sensor ("CS") 2360, may provide an interface between the data bus 2280 and each of the one or more comfort sensors 2270. The comfort sensor 2360 may provide the ASC 2336 with current information about environmental conditions inside of the conditioned space, such as temperature, humidity and air quality.

Figure 24:
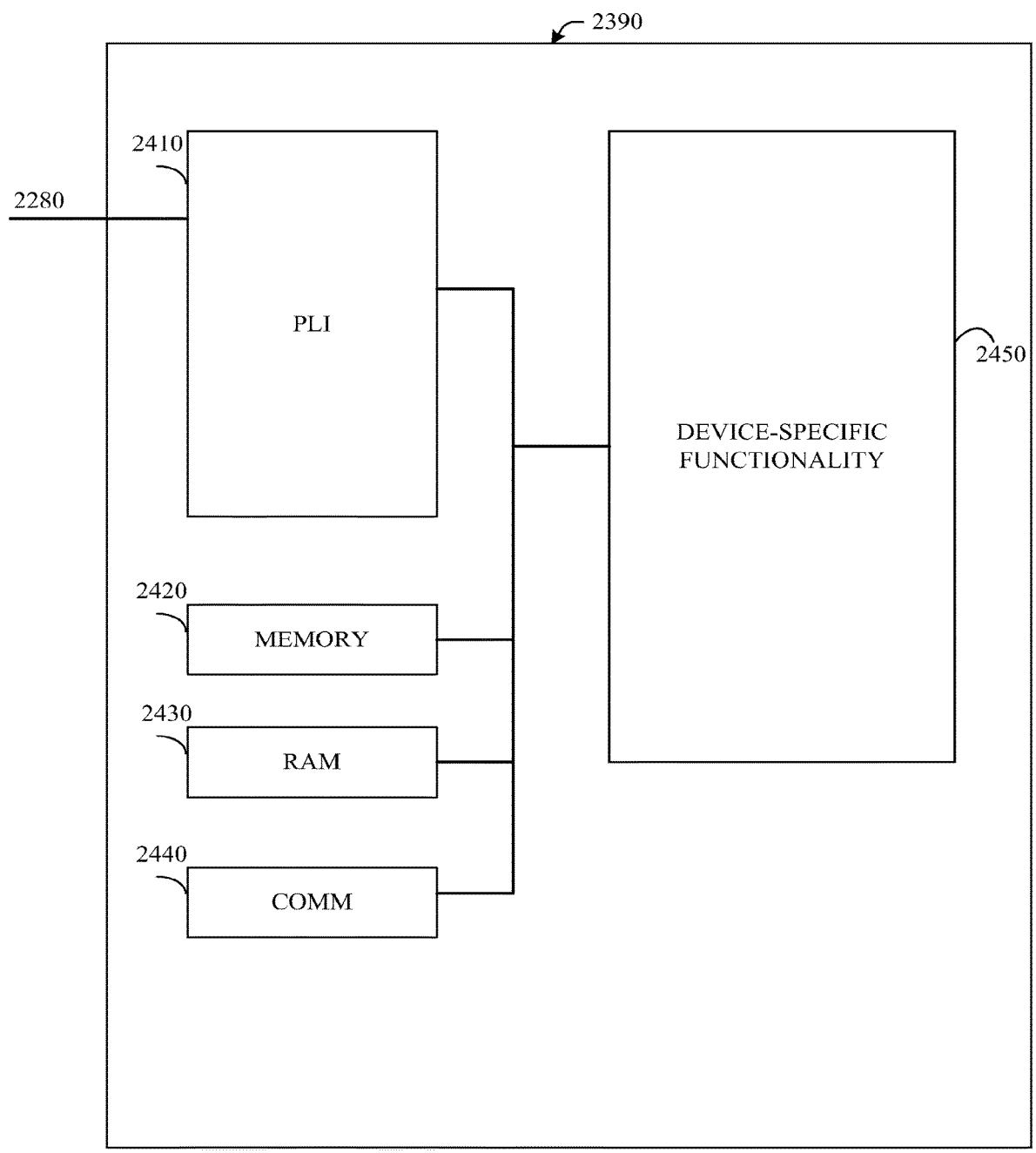
FIG. 24 is a high-level block diagram of the local controller.

For ease of description, any of the networked components of the HVAC system 2200, e.g., the air handler 2210, the damper 2215, the furnace 2220, the outdoor unit 2260, the control unit 2272, the comfort sensor 2270, the display 2274, may be described in the following discussion as having a local controller 2390. The local controller 2390 may be configured to provide a physical interface to the data bus 2280 and to provide various functionality related to network communication. It will be understood that the subnet controllers 2334, 2336 may be regarded as a special case of the local controller 2390, in which the subnet controller 2334, 2336 has additional functionality enabling it to control operation of the various networked components, to manage aspects of communication among the networked components, or to arbitrate conflicting requests for network services among these components. It will be readily understood that while the local controller 2390 is illustrated as a stand-alone networked entity in FIG. 23, it is typically physically associated with one of the networked components illustrated in FIG. 22, FIG. 24 illustrates a high-level block diagram of the local controller 2390. The local controller 2390 includes a physical layer interface (PLI) 2410, a memory 2420, a RAM 2430, a communication module 2440 and a functional block 2450 that may be specific to the demand unit 2276, e.g., with which the local controller 2390 is associated. The PLI 2410 provides an interface between a data network, e.g., the data bus 2280, and the remaining components of the local controller 2390. The communication module 2440 is configured to broadcast and receive messages over the data network via the PLI 2410. The functional block 2450 may include one or more of various components, including without limitation a microprocessor, a state machine, volatile and nonvolatile memory, a power transistor, a monochrome or color display, a touch panel, a button, a keypad and a backup battery. The local controller 2390 may be associated with a demand unit 2276 and may provide control thereof via the functional block 2450. The memory 2420 provides local persistent storage of certain data, such as various configuration parameters. The RAM 2430 may provide local storage of values that do not need to be retained when the local controller 2390 is disconnected from power, such as results from calculations performed by control algorithms. Use of the RAM 2430 advantageously reduces use of the memory cells that may degrade with write cycles.

In some embodiments, the data bus 2280 is implemented over a 235-wire cable (not shown), in which the individual conductors are assigned as follows: R—the "hot"—a voltage source, 24 VAC, for example; C—the "common"—a return to the voltage source; i+—RSBus High connection; and i—RSBus Low connection.

The disclosure recognizes that various innovative system management solutions are needed to implement a flexible, distributed-architecture HVAC system, such as the system 2200. More specifically, cooperative operation of devices in the system 2200, such as the air handler 2210 or UI 2340, is improved by various embodiments presented herein. More specifically still, embodiments are presented of treating HVAC components abstractly in a manner that decouples the HVAC physical layer from the HVAC logical or network layer. In many cases, more sophisticated control of the HVAC system is possible than in conventional systems, allowing expanded feature availability to the user and more efficient operation of the system.

Figure 25:
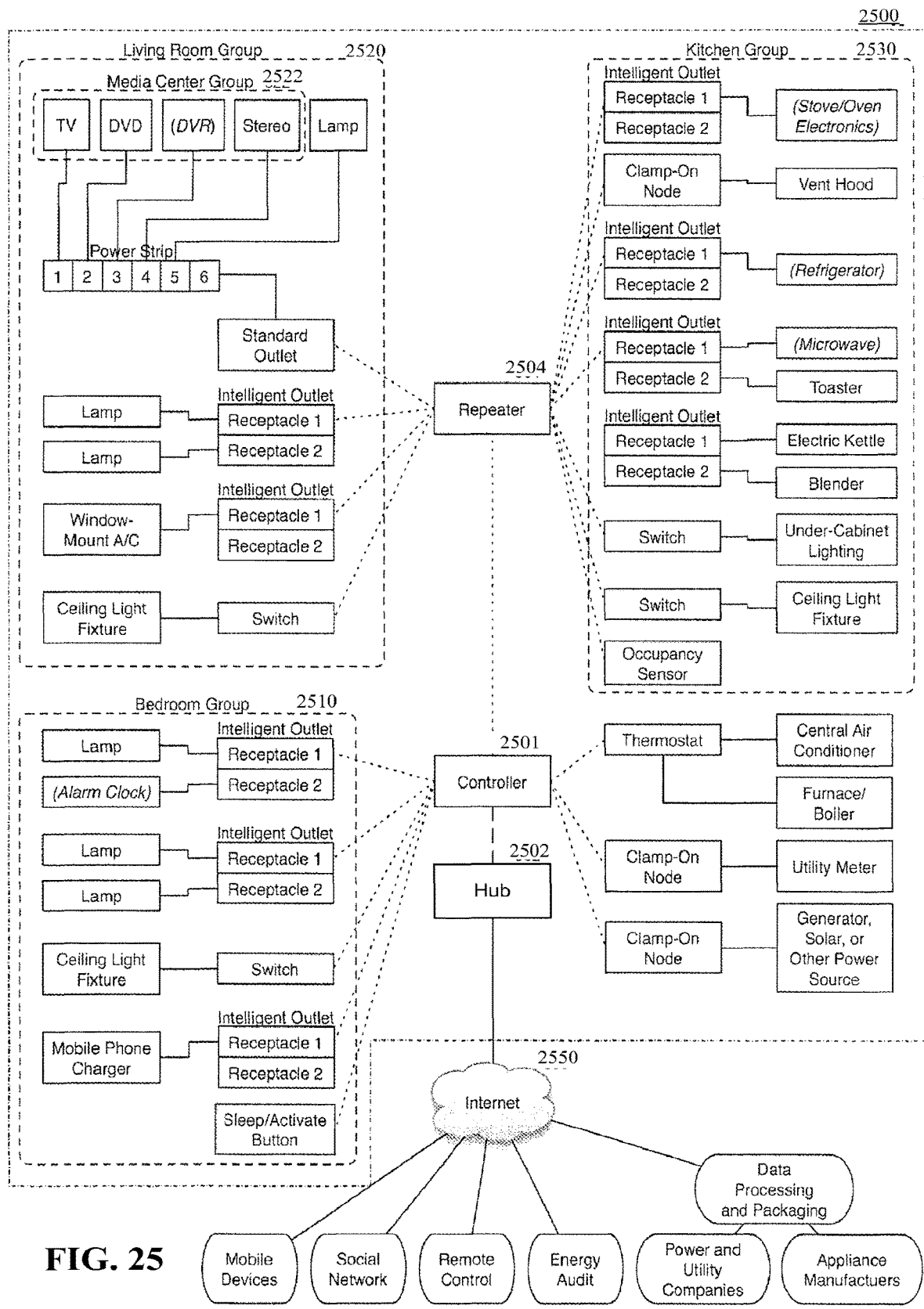
FIG. 25 is a simplified schematic diagram of a home energy network according to exemplary embodiments.

FIG. 25 is an exemplary relational chart according to embodiments of the innovation. System 2500 shows an example home energy network according to an embodiment of the innovation. In system 2500, a variety of nodes, groups, appliances, and devices are situated. In various aspects, nodes may also be embedded directly within appliances and devices, embedded directly into the wiring system of the home or building itself, or be devices able to connect to the various appliances and devices, as well as the power network in the home or building as more fully described below. By way of example, appliances and devices that may be excluded from automated switching are shown in italics and parentheses, however the exclusion of devices from the control of the controller 2501 is purely optional. Groups 2510, 2520, and 2530 are illustrative groupings of nodes that are individually controllable by controller 2501. Media center group 2522 is illustrative of nested sub-groupings possible by the hierarchical structure of groups according to various aspects of the present innovation. In other embodiments of the innovation, groups may be created through the use of tagging. Tags may be keywords or terms associated with or assigned to devices, thus describing the device and enabling a keyword-based grouping of the device with other devices. Tags may be chosen from a predefined list or added manually by a user or by the system itself. Tags may also be added to the predefined list, or to various devices automatically by the user community described herein.

The aspects of the innovation contemplate devices having multiple assigned tags so that the device may belong to any number of groups at the same time, and be controlled and monitored accordingly. Various repeaters 2504 may be used in embodiments of the present innovation in order to extend the reach of controller 2501 to distant nodes. Further, according to some embodiments the controller may be separate from a hub 2502, as described more fully herein. In another aspect, the network may connect to the Internet 2550, which may consist of any type of public or private network.

A particular type of controller 2501 is a thermostat or any type of temperature controlling device which can control cold and heat source devices according to the contrast between the required temperature and current temperature. It can achieve the user's required temperature by increasing or decreasing temperature, so that it meets the purpose of comfort and energy-saving.

The early stage of thermostat is the mechanical thermostat which adopts the bimetallic strip or the gas filled bellow to sense room temperature and realize control cold and heat source, and it can achieve the user's required temperature by increasing or decreasing temperature. Nowadays, the bimetallic strip thermostat has already been eliminated, it is only used in some occasions which is not higher requirement or in lower level occasion. Generally speaking, the function of mechanical-type thermostat is simple and it has big deviation for measuring temperature. The electronic-type thermostat is widely used in the fields of industry and agriculture as well as the daily life of the average consumer. In recent years, the development of thermostat has undergone the following stages: (1) Analog integrated mechanical-type thermostat; (2) Electronic intelligent thermostat; and (3) Intelligentized and networking thermostat.

Figure 26:
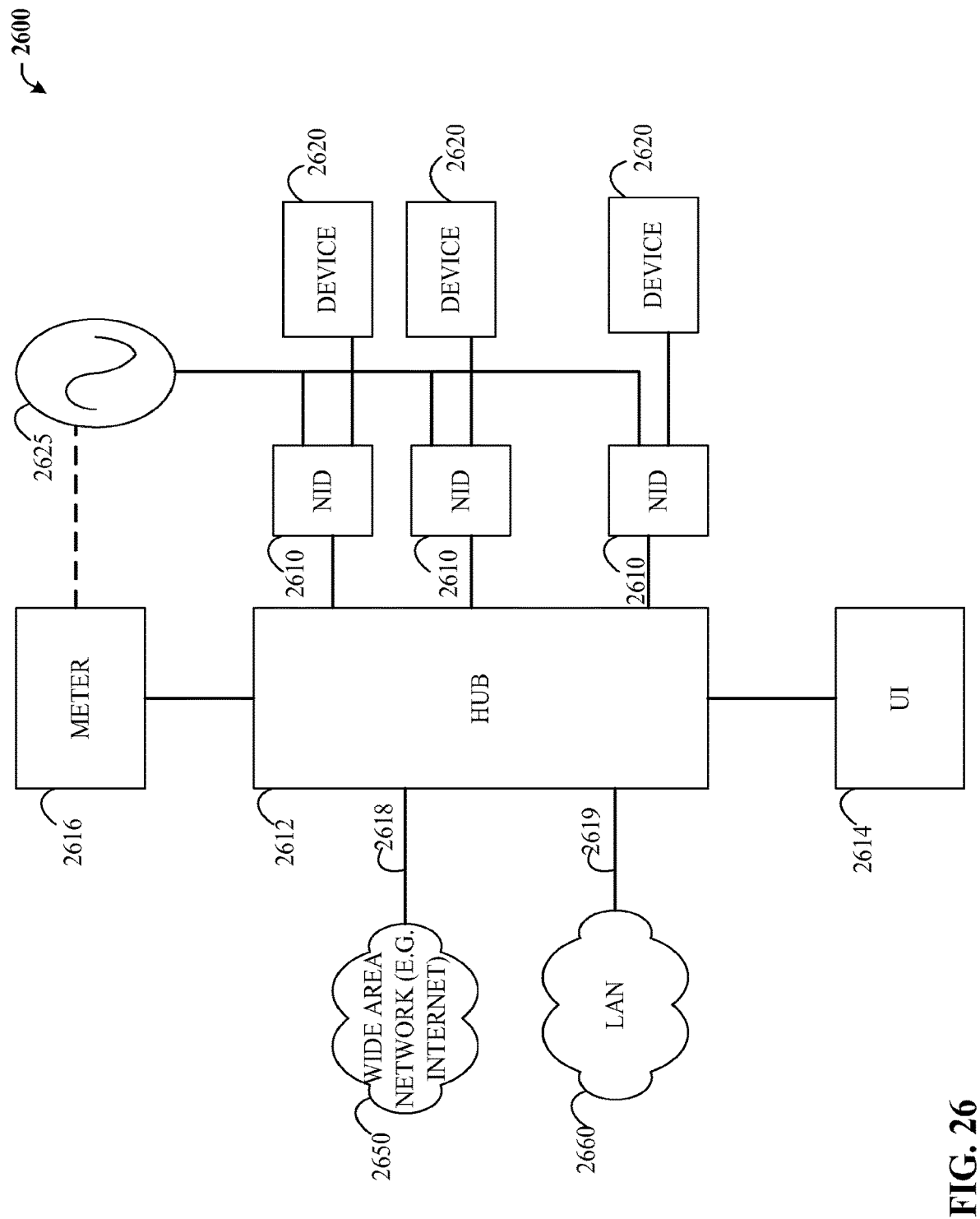
FIG. 26 is a block diagram of an exemplary embodiment of an energy monitoring and management system according to exemplary embodiments.

FIG. 26 illustrates a block diagram of an exemplary embodiment of an energy monitoring and management system 2600. As shown in FIG. 26, system 2600 includes a hub 2612 which is in communication with one or more node interface devices (NIDs) 2610, each NID 2610 being associated with a respective energy consuming device 2620. The communication between hub 2612 and each NID 2610 may be wired or wireless. NIDs can be physically part of the energy consuming device, e.g. built into the washing machine, or can be separate, e.g. a smart plug into which the washing machine is plugged. Additionally, hub 2612 may be in communication with a user interface ("UI") 2614. The communication between hub 2612 and the UI 2614 may also be wired or wireless. In an exemplary embodiment, the UI 2614 may take the form of a thermostat, for example, that has the ability to communicate with the hub 2612. In another aspect, the UI 2614 may comprise a user configurable dashboard or other equipment embodying a user interface. In yet another aspect, the UI 2614 may be a configurable part of the hub 2612. Although the hub 2612 and the UI 2614 are illustrated separately, it will be understood that the functions of the hub and the UI may be integrated into a single equipment embodied by the dashboard for integrating storage, processing, and user interface functions.

The various communication interfaces among the elements of FIG. 26 may be in compliance with any suitable open or proprietary communications protocol or standard, including but not limited to: Ethernet, RS232/485, USB, wireless RF (e.g., Bluetooth), infrared, "X10" or similar, HTML, 802.x wireless, Modbus, Device Net I. Control Net, SCADA, WI-FI, Universal Power Bus, ZigBee, and Z-Wave, power line communications (PLC), among others.

The hub 2612 may be a stand-alone device or it may be part of another system, such as a card in a personal computer, wireless router, security system, or a power distribution panel, for example. Further, the hub 2612 may also be in communication with a third-party device, such as but not limited to, an energy company's meter 2616 (e.g., a utility meter), preferably a smart meter. The meter 2616 is associated with the provision of electric energy such as via electrical power mains 2625 of premises at which devices 2620 are located. The communication between the hub 2612 and the utility meter 2616 may be wired or wireless. In some embodiments, the hub 2612 may be a configurable part of the utility meter 2616.

The personal computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

The hub 2612 may also be in communication with a wide area network 2650, such as but not limited to the Internet, a local area network ("LAN") 2660, and/or a personal computer or the like (not shown), via wired or wireless connections 2618 and 2619, respectively.

As mentioned, in one aspect, the hub 2612 interfaces to a smart meter 2616. The hub 2612 provides data to the smart meter which the smart meter may send to the utility company, and there is also a path for sending data that does not pass through the meter network. For example, with respect to smart meters having limited bandwidth, unlimited data can't be sent through the meter network due to bandwidth constraints. Accordingly, in such a situation, the hub routes certain communications information to the utility company or other controlling entity (or third-party analytics/data collector) through an alternative channel (e.g., WAN). Also, it is contemplated that the meter 2616 may send data from the utility, such as actual power usage, peak hours, rate data, demand response and direct load control commands, statistical data and the like to the hub 2612.

In the embodiment of FIG. 26, each of the one or more NIDs 2610 is coupled to an energy consuming device 2620. Energy consuming devices 2620 may be, but are not limited to, those devices commonly found in residential, commercial or industrial environments, such as air conditioning units, lighting units, refrigerators, furnaces, tools, appliances, and the like. Additionally, each NID 2610 may be coupled to electrical power mains 2625. Electrical power from power mains 2625, typically 120 volts AC at 60 Hz or 240 volts AC at 60 Hz, but not limited to these, is provided to each of device 2620 via a respective NID 2610. In one non-limiting embodiment, the power provided to each device 2620 may be monitored and/or controlled by its respective NID 2610. As described in greater detail below, each NID 2610 can communicate to hub 2612 information related to the monitoring of power applied to its respective device 2620. Additionally, those NIDs 2610 capable of controlling the application of power to a device 2620 can do so in accordance with commands from hub 2612 and/or independently of hub 2612.

Each NID 2610 will preferably have a specific identifier that is used in communications with hub 2612 in order to distinguish among multiple NIDs. Identifiers can be assigned to the NIDs by any of a variety of suitable means, such as by switches on the NID, automatically by hub 2612, by pre-programming upon manufacture, or user-programming via hub 2612, among other possibilities. It is contemplated that the user may also assign each NID through a simple assignment process initiated at the user interface 2614.

Figure 27:
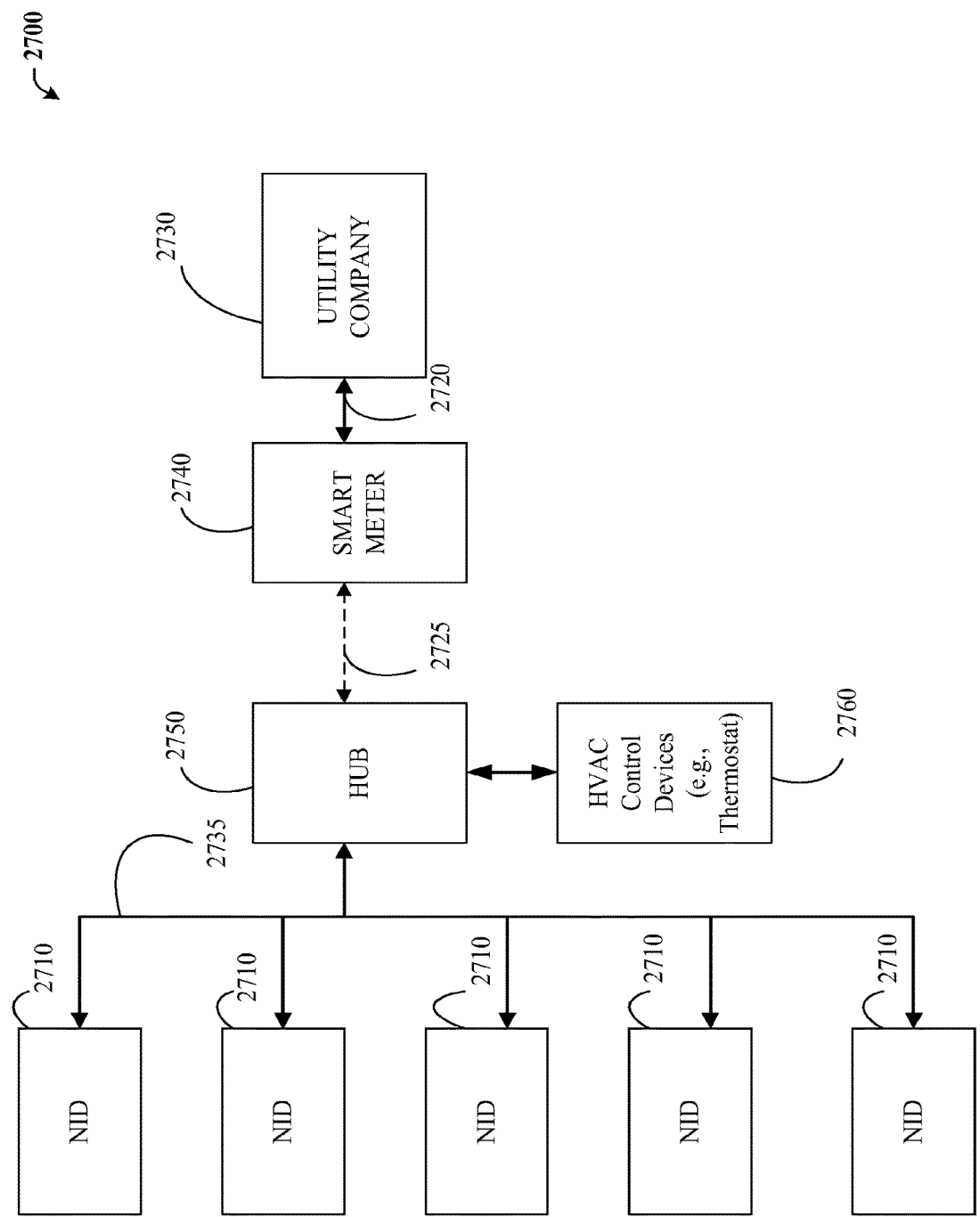
FIG. 27 is a high level block diagram of the infrastructure of the smart meter network interfacing with a home area network according to exemplary embodiments.

FIG. 27 is a high level block diagram of the infrastructure 2700 of the smart meter network interfacing with a home area network. In such an infrastructure, the smart meter 2740 communicates usage to a utility company 2730 through the use of a communications path 2720. The smart meter 2740 measures usage of the utility's commodity (e.g., electricity, water, gas), and displays the cumulative usage on its display, and communicates usage back to utility company 2730. The communications path 2720 is a two-way communications path such that utility company 2730 can use to forward control signals and other information to each consumer. In an aspect, the communication path 2720 is wired. In another aspect, the communication path 2720 can use wireless communication pathways, including WiMax or narrow bandwidths such as 900 MHz, to effect the required two-way communications.

The smart meter 2740 also communicates to the hub 2750 through a communications path 2725. In an aspect, the communications path 2725 is a wireless path. In another aspect, the communications path 2725 uses a protocols such as ZigBee to effect the required two-way communications. For example, ZigBee is a wireless mode of communication, operating at 2.4 GHz. However, it should be understood that other technologies, including wired technologies such as Ethernet and PLC can be employed as well. The hub 2750 is further coupled to various NIDs 2710 through a communications path 2735, as well as to various HVAC control devices or objects 2760, such as a thermostat. In an aspect, the communications path 2735 is a wireless path. In another aspect, the communications path 2735 uses a protocols such as ZigBee, Ethernet, PLC, or utilizes narrow bandwidths at frequencies such as 900 MHz to effect the required two-way communications. Each of the one or more NIDs 2710 is further coupled to an energy consuming device. Energy consuming devices may be, but are not limited to, those devices commonly found in residential, commercial or industrial environments, such as air conditioning units, lighting units, refrigerators, furnaces, tools, appliances, consumer electronics, and the like. Additionally, each NID 2710 may be coupled to electrical power mains. In an exemplary, non-limiting embodiment, electrical power from power mains, e.g., 120 volts AC at 60 Hz or 240 volts AC at 50 Hz, is provided to each of device via a respective NID 2710, though it is to be understood respective NIDs 2710 are not required.

Figure 28:
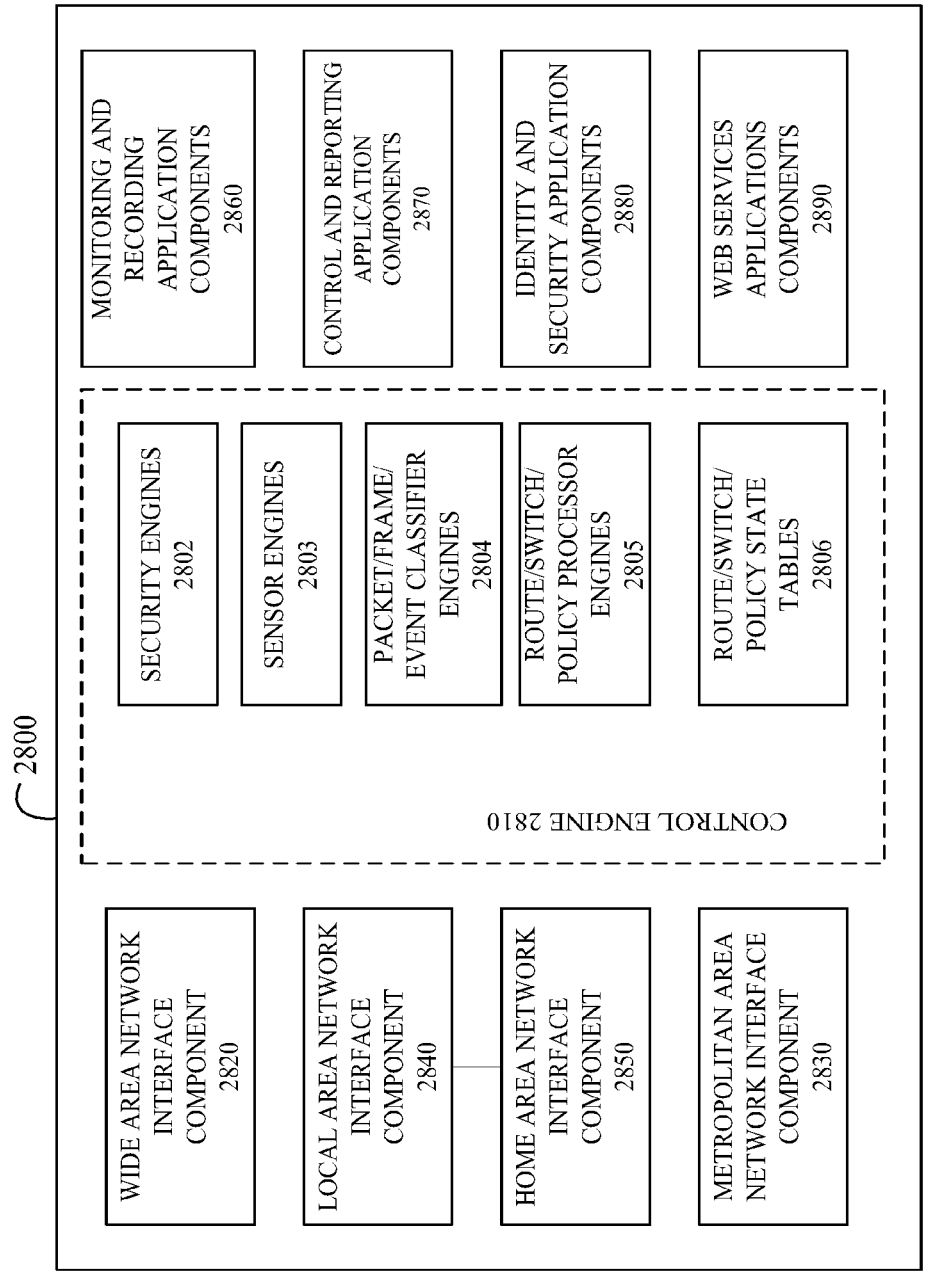
FIG. 28 is a logical block diagram illustrating the main functional elements of the hub according to exemplary embodiments.

FIG. 28 is a logical block diagram illustrating the main functional elements of the hub 2800. The hub includes a control engine 2810 which includes security engines 2802, sensor engines 2803, packet/frame/event classifier engines 2804, route/switch/policy processor engines 2805, route/switch/policy state tables 2806. The hub additionally includes wide area network interface components 2820, metropolitan area network interface components 2830, local area network interface components 2840, home area network interface components 2850, monitoring and recording application components 2860, control and reporting application components 2870, identity and security application components 2880, and web services applications components 2890. In various embodiments, the engines and components of hub 2800 may be provided in extension using a policy-based configuration, analytics, and control mechanism.

The control engine 2810 may be any hardware and/or software elements configured to implement a predetermined policy. In general, a policy is a set of defined rules, conditions, and actions. Each rule is associated with one or more conditions and one or more actions. Generally, the one or more conditions must be satisfied for the one or more actions to be performed. Some examples of conditions are number values, time values, date values, rate values, monetary values, and the like. Some examples of actions are collect data, retrieve data, store data, generate messages, generate reports, operate one or more metrology functions, operate one or more load control functions, and the like.

A policy may be implemented in conjunction with utility industry end device tables (e.g., ANSI C12.19) or utility meter objects (e.g., IEC 62056). These tables and/or objects may define configuration values associated with a meter, results of metrology functions, and the like. Some examples of end device tables/objects are configuration tables/objects, data source tables/objects, register tables/objects, local display tables/objects, security tables/objects, time-of-use tables/objects, load profile tables/objects, history and event logs, load control and pricing tables/objects, manufacture tables/objects, and the like.

In various embodiments, sensor engines 2803, packet/frame/event classification engines 2804, monitoring and recording application components 2860, and control and reporting application components 2870 may detect outages, failures, disruptions, and restoration in utility distribution. Additionally, in an aspect, an embodiment of these engines and components may take actions in the event of a detected outage, failure, disruption, and restoration, such as generating notifications, opening/closing switches, generating reports, and the like.

In one aspect, sensor engines 2803, packet/frame/event classification engines 2804, monitoring and recording application components 2860, and control and reporting application components 2870 may implement one or more utility tariff/rate programs that are to be associated with a utility service. For example, a specific utility tariff/rate program may be implemented to sense, measure, meter, record, and report one or more utility service tiers or levels of service.

In another aspect, sensor engines 2803, packet/frame/event classification engines 2804, route/switch/policy state tables 2806, and monitoring and recording application components 2860 may define the conditions that establish baseline physical and logical operation of a meter indicative of a healthy meter. Additionally, other aspects of these engines and components may define actions to be performed when conditions associated with meter fail to satisfy the definition of a healthy meter. In one aspect, such health monitoring functionality is provided by the meter.

In yet another aspect, security engines 2802 and identity and security application components 2880 may define who has access to data, and what policies are to be enforced in the event of an intrusion or unauthorized attempt to access data. In yet another aspect, control and reporting application components 2870 and route/switch/policy processor engines 2805 may define how much of a utility service or consumable may be distributed, and at what rate it is distributed. In yet another aspect, sensor engines 2803, monitoring and recording application components 2860, and control and reporting application components 2870 may control which data is obtained to provide a daily tracking of utility usage, quality, and the like. Additionally, an aspect of these engines and components may define actions to be performed that report the results of metrology functions. Further, an aspect of these engines and components may define conditions for pre-paid energy delivery service, and may enable/disable service delivery according to account status. In another embodiment, the enabling/disabling logic is in the meter, but the hub may still know the conditions for pre-paid energy service delivery.

In various aspects, packet/frame/event classifier engines 2804, route/switch/policy processor engines 2805, and route/switch/policy state tables 2806 define conditions for and provide priority internetworking communications to hub 2800. In some aspects, sensor engines 2803, monitoring and recording application components 2860, and control and reporting application components 2870 may control power quality monitoring and reporting, and define limits or thresholds establishing the quality of energy distribution, and enforce the policies to be applied when the quality or condition of energy distribution fails to satisfy the conditions. An aspect of these engines and components may define conditions in which demand is slowing or increasing such that appropriate actions are taken.

In further aspects, security engines 2802 and identity and security application components 2880 may enforce security policies for hub 2800. In one example, a security policy defines one or more conditions associated with security of hub 2800. When the one or more conditions associated with the security of hub 2800 are met or satisfied, one or more actions defined by the security policy are performed. For example, the security policy may define a set of network addresses, ports and interfaces from which hub 2800 is allowed to be accessed. When the hub 2800 receives a request or packet from the set of network addresses, ports and interfaces from which it is allowed to access, the one or more actions defined by the security policy may be performed to allow the request or packet from the set of network addresses, ports and interfaces.

In yet another aspect, sensor engines 2803, monitoring and recording application components 2860, and control and reporting application components 23770 may enforce metrology policies on hub 2800. When the one or more rules or conditions associated with metrology functions of hub 2800 are met or satisfied, one or more actions defined by the metrology policy are performed. For example, a metrology policy may configure a utility device, such as an energy meter to record energy usage, store energy usage in a particular format, and send alerts and signals when an energy usage exceeds a specific minimum or maximum threshold.

In yet another aspect, the sensor engines 2803, monitoring and recording application components 2860, and control and reporting application components 2870 may enforce a consumption policy that defines one or more rules or conditions associated with consumption of utilities associated with hub 2800. Policies can come from an interaction between utility options and user preferences, or user preferences only if the utility places no restrictions on the consumer, e.g., if the hub was purchased at a retail store. When the one or more rules and/or conditions associated with the consumption policy are met or satisfied, one or more actions defined by the consumption policy are performed. For example, the consumption policy may define tiers for consumption, and rates associated with the predetermined tiers of consumption. The consumption policy may further define time intervals associated with usage of a particular utility. If a predetermined tier of consumption is exceeded, the consumption policy may define an action that throttles or disables utilities associated with hub 2800. In another example, the consumption policy may define an action that configures or disables consumer appliances (such as electric hot water heaters, air conditioners, or washer/dryers) during periods of usage, such as during energy emergencies.

In yet another aspect, control and reporting application components 2870 may enforce a reporting policy that defines one or more rules or conditions associated with how data is to be reported from hub 2800. When the one or more rules and/or conditions associated with how data is reported from hub 2800 are met or satisfied, one or more actions defined by the reporting policy are performed. For example, the reporting policy may define conditions for when and how data, such as utility consumption and utility quality, are reported to a utility organization. When the predefined conditions are satisfied, messages including the data may be generated and queued/sent to the utility organization for collection. It is noted also that the information can go to device manufacturer/operator, third-party data analyst, etc., i.e., the information does not have to go to the utility.

In one nonlimiting embodiment, web services application components 2890 can be used to deploy policies that are provisioned using the Common Open Policy Service (COPS) protocol. Generally, COPS is part of the Internet protocol suite as defined by the IETF's RFC 2748. COPS specifies a simple client/server model for supporting policy provisioning and enforcement. COPS policies are typically stored on policy servers, known as Policy Decision Points (PDP), and are enforced on distributed clients, also known as Policy Enforcement Points (PEP).

Generally, there may be two aspects or models of COPS, including the Outsourcing Model and the Provisioning Model. The Outsourcing Model is the simplest flavor of COPS. In this model, all policies are stored at the PDP. Whenever the PEP needs to make a decision, it sends all relevant information to the PDP. The PDP analyzes the information, takes the decision, and relays it to the PEP. The PEP then simply enforces the decision. In the Provisioning Model, the PEP reports its decision-making capabilities to the PDP. The PDP then downloads relevant policies on to the PEP. The PEP can then make its own decisions based on these policies. The Provisioning Model can use the route/switch/policy processor engines 2805 to enforce the policies, and the route/switch/policy state tables 2806 as an in-memory repository of the policies.

In further examples of operation, the hub 2800 provides integration and interrelation of utility sensory and measurement functions, service monitoring and recording functions, service control and policy enforcement functions, web-based configuration and service delivery interfaces, and secure communications into a single device.

Figure 29:
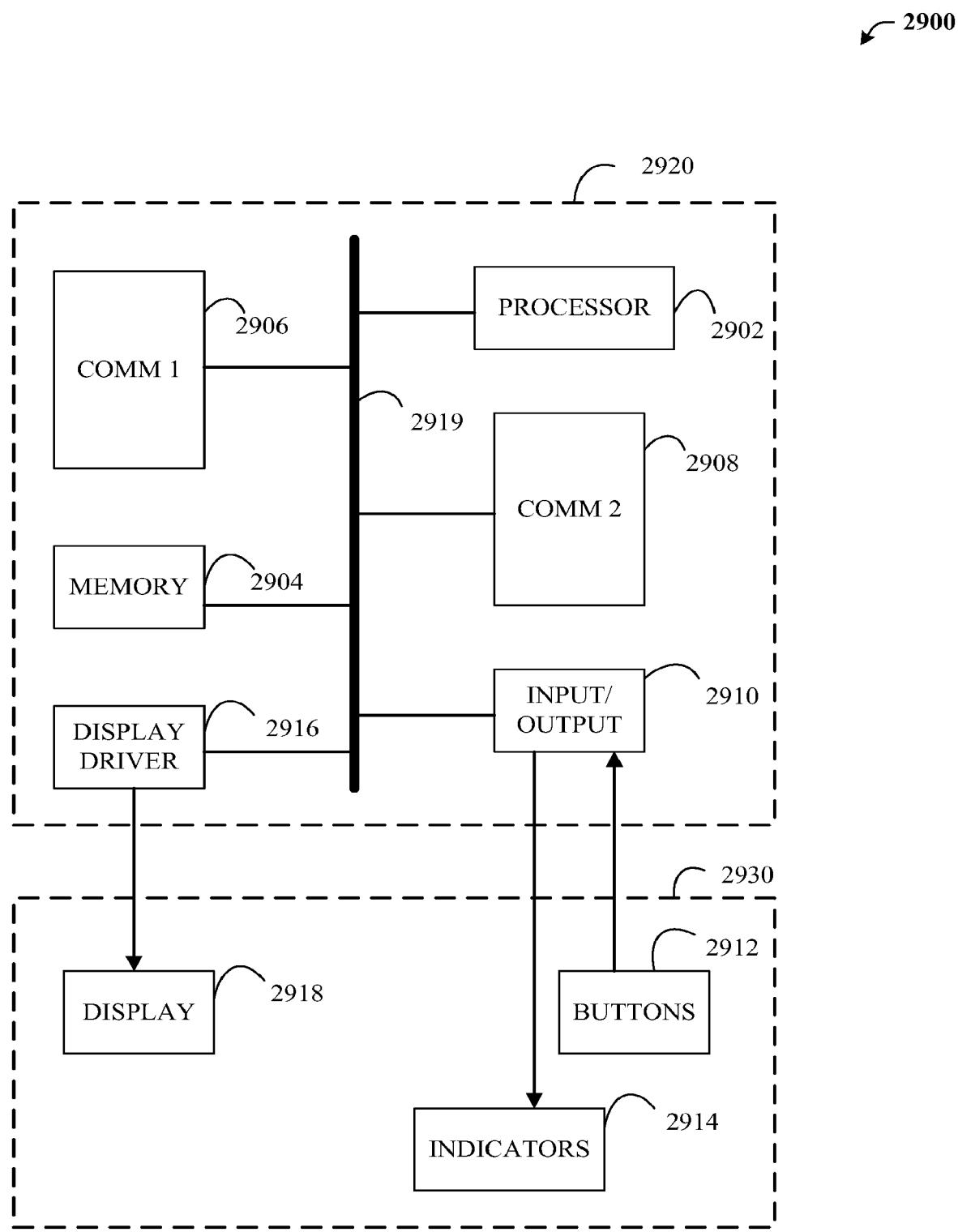
FIG. 29 is schematic diagram of an exemplary embodiment of an integrated hub which includes a user interface according to exemplary embodiments.

FIG. 29 is a schematic diagram of an exemplary embodiment of an integrated hub 2900 which includes a user interface 2930. As seen in FIG. 29, hub 2900 has at least one programmable microprocessor 2902, memory 2904 and various communications and interface blocks 2906, 2908, 2910 and 2916, interconnected via a bus structure 2919. The aforementioned blocks and bus structure can be implemented in an integrated circuit 2920, as discrete circuits, or a combination of both.

Communication component (COMM 1) 2906 provides hub 2900 with an interface capability to communicate with individual NIDs. Communication component (COMM 2) 2908 provides hub 2900 with an interface capability with one or more third-party devices or software systems via one or more of the aforementioned communications interfaces. In an aspect, COMM 2 may exploit any wireless telecommunication, or radio, technology; for example, WI-FI, Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSDPA), or LTE Advanced. Additionally, substantially all aspects of the subject communication can include legacy telecommunication technologies. Further, the hub 2900 may communicate with more than one third-party device at the same time and may do so with different communications protocols.

Integrated hub 2900 may also include or be coupled to a user interface 2930. User interface 2930 may include various combinations of buttons 2912 and indicators 2914 and one or more displays 2918. In an aspect, the user interface includes buttons to instantly shed load from any device upon user activation. For instance, the user may be actively monitoring the load of a single device on the home energy network and may choose to shed the load for conservation purposes. It is contemplated that buttons 2912 may include any suitable user input devices such as switches, keys, or the like, indicators 2914 may include LEDs, lamps, or other simple display devices, and that display 2918 may include larger display devices such as multi-pixel flat panel LCD displays or the like. In the exemplary arrangement shown, I/O block 2910 interfaces with buttons 2912 and indicators 2914, whereas display driver block 2916 interfaces with display 2918.

Through user interface 2930, a PC attached directly to hub 2900, or a PC or mobile device over a network connection to integrated hub 2900, among other possibilities, a user may configure hub 2900 to perform various functions. For example, hub 2900 can be configured to perform automatic load-shedding, system consumption analysis, alarm generation, and individual device analysis, among other possible functions described below in greater detail.

A user can also use the aforementioned interfaces to perform system setup via integrated hub 2900. For example, where a system includes multiple NIDs in communication with hub 2900, the user can specify a user-friendly name for each NID, such as a description of the device to which the NID is coupled (e.g., "refrigerator" or "furnace" or "big TV", etc.), which the hub 2900 will use when interacting with the user in connection with a device in the system. The user-specified name associated with a NID can be the same as or different than the identifier used in communications between the NID and the hub 2900.

As data describing the power profiles of specific types and models of appliances are generated both in the user's home and throughout the user community, this data can be used to improve the heuristic analysis for identifying new devices as they are connected to the system. For instance, if the system detects a pattern of high power consumption on a predictable duty cycle, the new appliance might be assumed to contain a compressor. If the appliance is attached to an outlet known to be in a bedroom, the appliance could be reasonably assumed to be a window-mounted air conditioner and not a refrigerator, and if the duty cycle or other characteristics correspond to those of a known make and model, the system could infer this as well.

The firmware and configuration, memory, and databases of hub 2900 and/or of the NIDs may be upgraded, for example, from a PC attached directly to hub 2900, or from a server over a network connection to hub 2900, among other possibilities.

As mentioned, NIDs are coupled to devices so that energy monitoring may be packaged in the form of common electrical fixtures such as outlets, switches, dimmers, power strips, thermostats, bulb sockets, and any other form of fixture or power-related devices. Nodes may also take the form of more industrial or commercial electrical fixtures known to those in the art. In an aspect, the nodes may be packaged as clamp-on current transducers to monitor current in any wire, such as the power cord for an appliance or device.

Nodes may also be installed in the circuit breaker box in the form of circuit breakers, clamp-on current transducers on each circuit, or clamp-on current transducers monitoring the main electrical feed in a home or business. Nodes can also be embedded in appliances, devices, light fixtures, other data acquisition or monitoring systems, or any other power consuming or providing device known to those of skill in the art.

Figure 30:
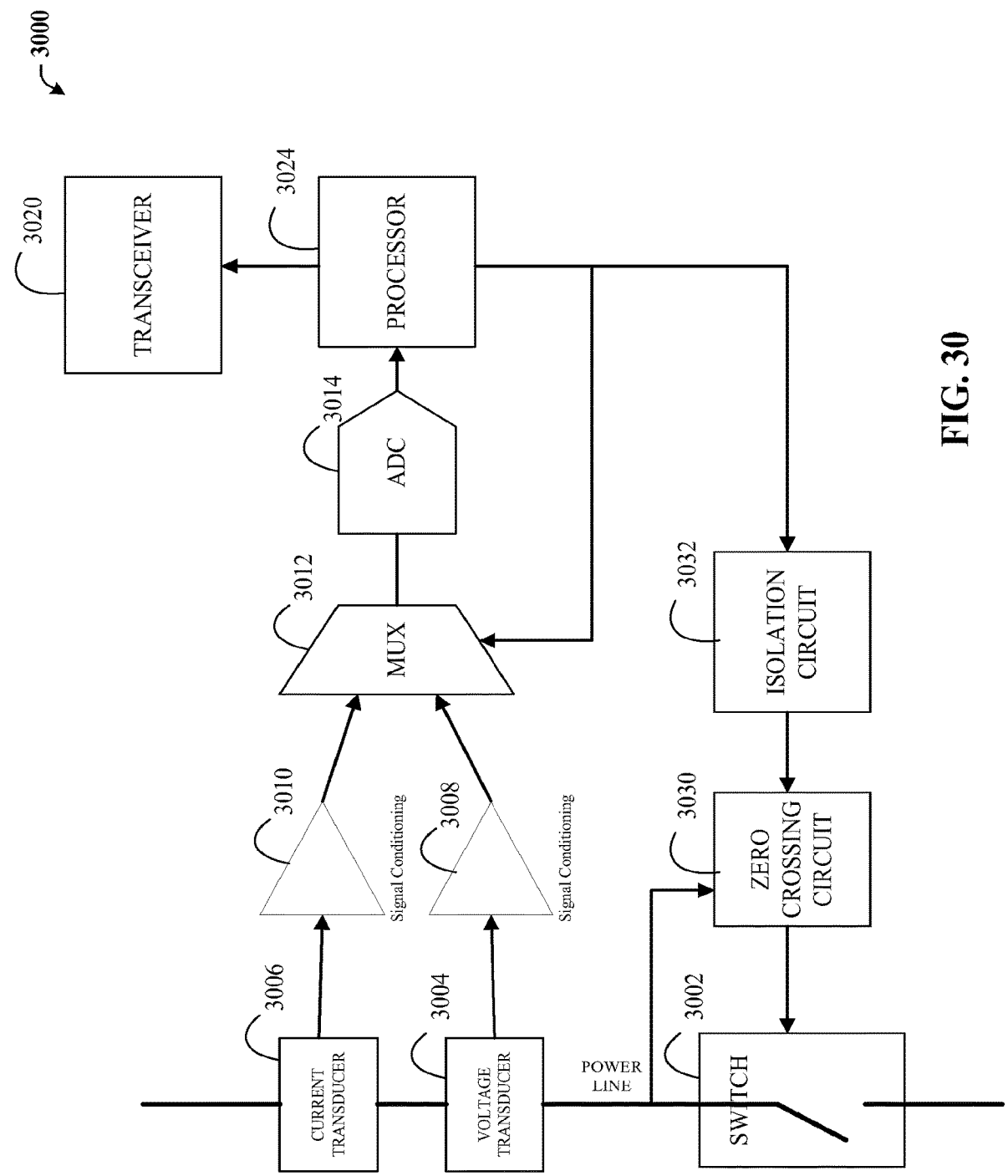
FIG. 30 is a logging and control circuit according to exemplary embodiments.

In various aspects, a node may be composed of an electronic circuit, such as a logging and control circuit, and application-specific packaging. FIG. 30 is one example of an illustrative, but non-limiting, circuit 3000 which acts as a logging and control circuit. The circuit 3000 may contain a microprocessor 3024 and is capable of measuring and recording electrical current and voltage; deriving, processing, and storing power data; and communicating power data over the network. The circuit may monitor the current and voltage via a voltage transducer 3004 and a current transducer 3006. Such measurements are then fed through to signal conditioners 3008 and 3010 and into an analog-to-digital conversion circuit ("ADC") 3014 via a multiplexer ("MUX") 3012. The digitally converted signal may then be interpreted by microprocessor 3024. The circuit may also be capable of controlling an attached electrical device by switching the power to said device or controlling the amount of power received by the device, and of communicating the switch state or power consumption level over the network. Communication of information to the network may be accomplished through a network transceiver 3020.

In another aspect, the node may be embedded in an appliance or other device and may be able to control that devices power consumption and switch state, and be able to communicate those variables over the network. Nodes may additionally contain one or more temperature sensors, such as a thermocouple of thermistor, or any of the other types and kinds of sensors mentioned herein. Nodes may also be wired in other various configurations or using other circuitry as will be appreciated by those of skill in the art. According to other aspects of the innovation, nodes and other devices in the home energy network may also monitor their own power consumption and report that information to the network and user.

As discussed above, a circuit 3000 that is capable of controlling the application of power to a device can do so in accordance with commands from hub 2900. In operation, an illustrative load-shedding routine is demonstrated. In the load-shedding routine, a user may set a configurable threshold (e.g. 5 kW) of total consumption for a residential system and may specify an action to be taken (e.g., remove power from a hot tub heating device, reduce power to a compressor coil, etc.) if the threshold is exceeded. Based on consumption information collected from the NIDs in the system, hub 2900 will determine the total consumption and compare that to the pre-set threshold. If total consumption exceeds the threshold, the hub will then command the NID associated with the hot tub heater to turn off power to the hot tub heater.

The consumer may base an automatic load-shedding routine exclusively on data available to the hub 2900. In another aspect, the consumer may also base the load-shedding routines on information obtained from the utility via the utility meter or data gathered from the Internet. In another aspect, the consumer may base the decision to shut down a service or device via an NID if the threshold is exceeded and the utility, through the utility meter or the Internet, informs the hub 2900 that the conditions are "peak" for energy transmission. For example, the consumer may permit a third party (e.g., a utility) to take the control action through the utility meter or the Internet via the hub to shut down a device if certain conditions designated by the consumer are met. The consumer may permit the transfer of information from the hub to a third party via the utility meter or the Internet. If the consumer so desires, the control aspect of the hub and the NID may further be used as a remote control over the devices connected to the NIDs and turn such devices off at the consumer's discretion.

In another aspect, a consumer may, via the user interface or a personal computer, for example, access the hub 2900 and perform analysis of the consumer's energy system. By way of example and not limitation, the consumer may command the processor of the hub 2900 to report analysis such as peak load analysis, indication of peak loads and times of those loads, identification of devices and total consumption of those devices, suggested peak load shedding, and to view pre-configured load control. In yet another aspect, a consumer may access the hub through a website so that monitoring and control of the energy usage may be performed remotely. For instance, the consumer may command the processor of the hub 2900 to report analysis such as peak load analysis, indication of peak loads and times of those loads, identification of devices and total consumption of those devices, suggested peak load shedding, and to view pre-configured load control while the consumer is at work, or while travelling.

Further, for other energy consumables, such as natural gas, the BTU content per the time of consumption and the amount consumed may be determined and displayed. For water, for instance, the gallon or acre-foot content per the time of consumption and the amount consumed may be determined and displayed, or drought-related restrictions or time of use (TOU) pricing can be enforced. Additionally, the consumer may configure the hub 2900 to generate a communication to the consumer that a consumer configured energy alarm condition has occurred. For example, the hub 2900 may be configured to send an email through the Internet or may activate a light or sound on the UI when an alarm condition occurs, such as the energy consumption threshold has been exceeded. The consumer may also command the hub 2900 to act via a remote control to the hub.

Also a consumer may evaluate the published efficiency of a new appliance device that is connected to an NID. The consumer may, as discussed above, access the hub 2900 and determine the real-time energy consumption of a specific device and compare that to a published efficiency that is either input by the consumer to the hub or accessed by the hub via the Internet, for example. In another aspect, the hub may incorporate a database which stores efficiency data for each of the connected devices. Such efficiency data may include published or expected efficiency as provided by the manufacturer as well as an archive or history of the efficiency of the device as experienced over the course of time at the customer premises. The efficiency data may be accessed from the manufacturer's database through the Internet, such as by entering the manufacturer and the model number of the device.

By way of example and not limitation, a power line communications protocol, such as "X10", can be used to send digitized measurement values from one or more NIDs over existing AC power lines within a building to hub (or central computer) that keeps track of the power consumption over time of each device. A NID could be included in a power conditioning unit that is connected via a wired or wireless network to a central server, laptop, or other PC for real time information regarding the power usage of an entire rack or server system that is connected to the power conditioning unit.

Although various illustrative aspects of monitoring and controlling energy usage have been illustrated, the aspects are intended not to be restrictive or limiting. In fact, once real-time energy usage has been measured by the NID or the hub, there is virtually no limit to what can be done with the data. By way of example and not limitation: a) exchange data with a "smart meter" 2616 and with the "smart grid," including reporting power conditions which are valuable to the utility about the quality of power they are providing and giving the consumer feedback about usage so that they can make informed decisions about when to consume; h) communicate with the user interface 2614 which provides various forms of visible feedback to the consumer about the power usage in real- or near real-time; c) communicate with third-party products using open source communication protocols (as listed previously for example) to display real time data in more sophisticated projects including automated smart houses and corporate institutions.

The flexibility of exemplary configurations and the programmability of NIDs and hub, allows communication with a large number of devices, using established technologies and future technologies that may appear. In further exemplary embodiments, at least some of the above-described capabilities can be embedded in many different types of devices that run on electricity or other energy sources.

Figure 31:
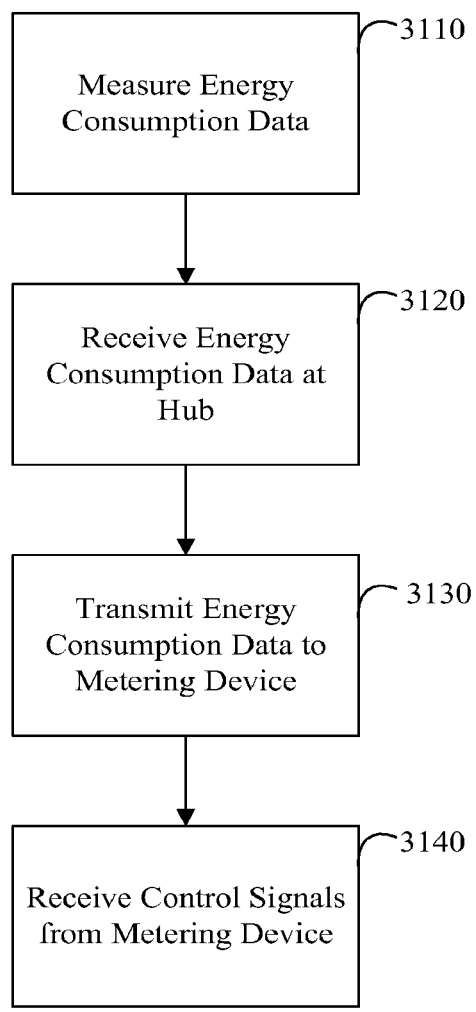
FIG. 31 is a summary flow chart for the power monitoring process according to exemplary embodiments.

FIG. 31 is a summary flow chart 3100 illustrating the power monitoring process according to an aspect. In one aspect, the method may be utilized by the hub in order to transmit energy consumption data to the metering device and to receive control signals and other data from the metering device. Initially, energy consumption data is measured at each NID at 3110. This consumption data is received at the hub at 3120. At 3130, the hub provides translations between protocols, if necessary, and transmits the energy consumption data to the metering device. At 3140, the hub receives control signals from the metering device. The control signals may include requests for appliances or power consuming devices to be shut down (and conversely to be allowed to power up). Control signals are particularly useful for a utility company to shape its load at any time during the day so as to minimize the load peaks which typically result in the highest marginal prices to consumers. The hub allows consumers to either pass through these control signals, or in the alternative, only limit the control signals from reaching the appliance or power consuming device.

Figure 32:
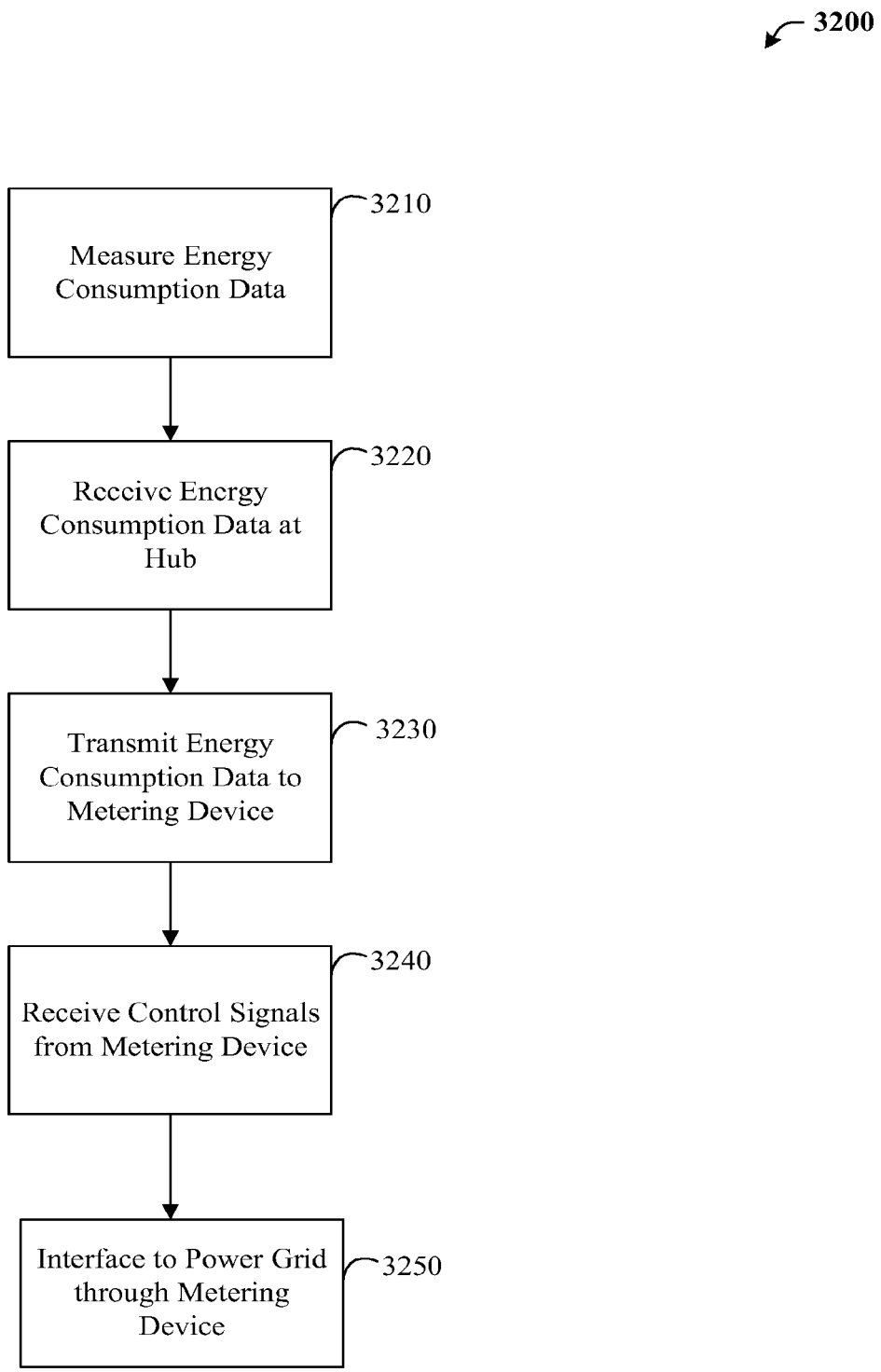
FIG. 32 is a summary flow chart for the power monitoring process according to exemplary embodiments.

FIG. 32 is a summary flow chart 3200 illustrating the power monitoring process according to another aspect. In one aspect, the method may be utilized by the hub in order to transmit energy consumption data to the metering device and to receive control signals and other data from the metering device. Initially, energy consumption data is measured at each NID at 3210. This consumption data is received at the hub at 3220. At 3230, the hub provides translations between protocols, if necessary, and transmits the energy consumption data to the metering device. At 3240, the hub receives control signals from the metering device. The control signals may include requests for appliances or power consuming devices to be shut down (and conversely to be allowed to power up). Control signals are particularly useful for a utility company to shape its load at any time during the day so as to minimize the load peaks which typically result in the highest marginal prices to consumers. The hub allows consumers to either pass through these control signals, or in the alternative, only limit the control signals from reaching the appliance or power consuming device. At 3250, according to one aspect, the hub provides a pass through for the consumption data to reach the power grid through the metering device.

Figure 33:
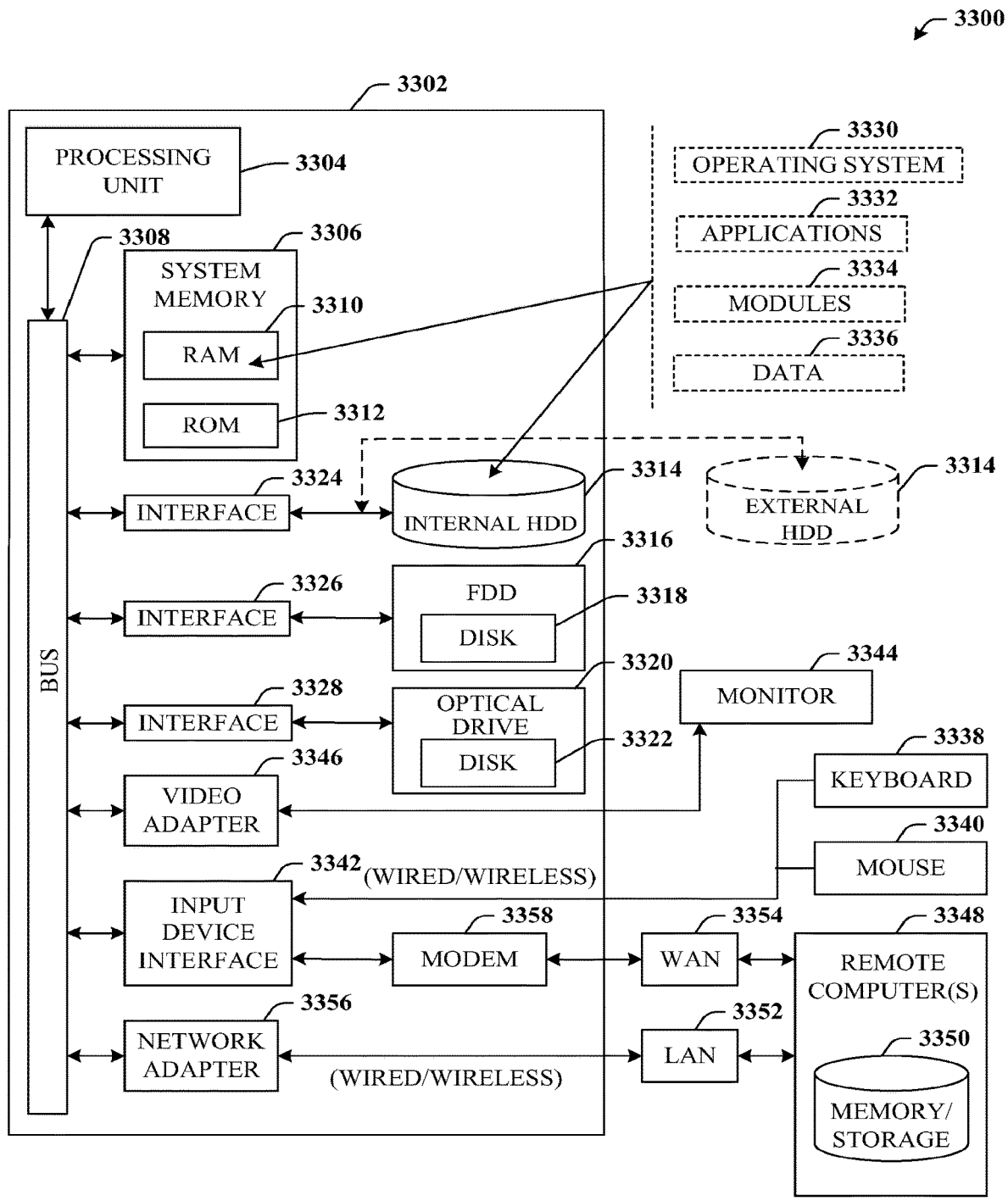
FIG. 33 illustrates a block diagram of a computer operable to execute a portion of the disclosed architecture.

Referring now to FIG. 33, there is illustrated a block diagram of an exemplary computer system operable to execute the disclosed architecture. In order to provide additional context for various aspects of the disclosed subject matter, FIG. 33 and the following discussion are intended to provide a brief, general description of a suitable computing environment 3300 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 33, the exemplary environment 3300 for implementing various aspects of the disclosed subject matter includes a computer 3302, the computer 3302 including a processing unit 3304, a system memory 3306 and a system bus 3308. The system bus 3308 couples to system components including, but not limited to, the system memory 3306 to the processing unit 3304. The processing unit 3304 can be any of various commercially available processors. Dual microprocessors and other multi-processor architectures may also be employed as the processing unit 3304.

The system bus 3308 can be any of several types of bus structure that may further interconnect to a memory bus (with or without a memory controller), a peripheral bus, and a local bus using any of a variety of commercially available bus architectures. The system memory 3306 includes read-only memory (ROM) 3310 and random access memory (RAM) 3312. A basic input/output system (BIOS) is stored in a non-volatile memory 3310 such as ROM, EPROM, EEPROM, which BIOS contains the basic routines that help to transfer information between elements within the computer 3302, such as during start-up. The RAM 3312 can also include a high-speed RAM such as static RAM for caching data.

The computer 3302 further includes an internal hard disk drive (HDD) 3314 (e.g., EIDE, SATA), which internal hard disk drive 3314 may also be configured for external use in a suitable chassis (not shown), a magnetic floppy disk drive (FDD) 3316, (e.g., to read from or write to a removable diskette 3318) and an optical disk drive 3320, (e.g., reading a CD-ROM disk 3322 or, to read from or write to other high capacity optical media such as the DVD). The hard disk drive 3314, magnetic disk drive 3316 and optical disk drive 3320 can be connected to the system bus 3308 by a hard disk drive interface 3324, a magnetic disk drive interface 3326 and an optical drive interface 3328, respectively. The interface 3324 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 3302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 3312, including an operating system 3330, one or more application programs 3332, other program modules 3334 and program data 3336. All or portions of the operating system, applications, modules, and/or data can also be cached in the RAM 3312. It is appreciated that the disclosed subject matter can be implemented with various commercially available operating systems or combinations of operating systems.

A user can enter commands and information into the computer 3302 through one or more wired/wireless input devices, e.g., a keyboard 3338 and a pointing device, such as a mouse 3340. Other input devices (not shown) may include a microphone, an IR remote control, a joystick, a game pad, a stylus pen, touch screen, or the like. These and other input devices are often connected to the processing unit 3304 through an input device interface 3342 that is coupled to the system bus 3308, but can be connected by other interfaces, such as a parallel port, an IEEE1394 serial port, a game port, a USB port, an IR interface, etc.

A monitor 3344 or other type of display device is also connected to the system bus 3308 via an interface, such as a video adapter 3346. In addition to the monitor 3344, a computer typically includes other peripheral output devices (not shown), such as speakers, printers, etc.

The computer 3302 may operate in a networked environment using logical connections via wired and/or wireless communications to one or more remote computers, such as a remote computer(s) 3348. The remote computer(s) 3348 can be a workstation, a server computer, a router, a personal computer, a mobile device, portable computer, microprocessor-based entertainment appliance, a peer device or other common network node, and typically includes many or all of the elements described relative to the computer 3302, although, for purposes of brevity, only a memory/storage device 3350 is illustrated. The logical connections depicted include wired/wireless connectivity to a local area network (LAN) 3352 and/or larger networks, e.g., a wide area network (WAN) 3354. Such LAN and WAN networking environments are commonplace in offices and companies, and facilitate enterprise-wide computer networks, such as intranets, all of which may connect to a global communications network, e.g., the Internet.

When used in a LAN networking environment, the computer 3302 is connected to the local network 3352 through a wired and/or wireless communication network interface or adapter 3356. The adapter 3356 may facilitate wired or wireless communication to the LAN 3352, which may also include a wireless access point disposed thereon for communicating with the wireless adapter 3356.

When used in a WAN networking environment, the computer 3302 can include a modem 3358, or is connected to a communications server on the WAN 3354, or has other means for establishing communications over the WAN 3354, such as by way of the Internet. The modem. 3358, which can be internal or external and a wired or wireless device, is connected to the system bus 3308 via the serial port interface 3342. In a networked environment, program modules depicted relative to the computer 3302, or portions thereof, can be stored in the remote memory/storage device 3350. It will be appreciated that the network connections shown are exemplary and other means of establishing a communications link between the computers can be used.

The computer 3302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WI-FI and Bluetooth wireless technologies. Thus, the communication can be a predefined structure as with a conventional network or simply an ad hoc communication between at least two devices.

WI-FI, or Wireless Fidelity, allows connection to the Internet from a couch at home, a bed in a hotel room, or a conference room at work, without wires. WI-FI is a wireless technology similar to that used in a cell phone that enables such devices, e.g., computers, to send and receive data indoors and out; anywhere within the range of a base station. WI-FI networks use radio technologies called IEEE802.11 (a, b, g, n, etc.) to provide secure, reliable, fast wireless connectivity. A WI-FI network can be used to connect computers to each other, to the Internet, and to wired networks (which use IEEE802.3 or Ethernet). WI-FI networks operate in the unlicensed 2.4 and 5 GHz radio bands, at an 12 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller, a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard disk drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A system that manages resource consumption, comprising:
   one or more computers comprising:
   a first communications component configured to communicatively couple to a command server device associated with a resource provider entity that provides a resource at a premises, the first communications component being configured to receive control data for a direct load control event from the resource provider entity; and a second communications component configured to communicatively couple to a set of consumption endpoints that are situated at the premises and consume the resource at the premises; and one or more storage devices on which are stored instructions that are operable, when executed by the one or more computers, to cause the one or more computers to perform operations comprising:

maintaining, from two or more operation modes, an operation mode for the premises;

in response to receipt, from the resource provider entity and using the first communications component, of the control data for the direct load control event that indicates a shortage of the resource to be consumed at the premises at a future time:

selecting, using the operation mode for the premises, a set of one or more policies i) to use in handling the direct load control event from the resource provider entity and ii) that define a resource priority and actions for at least one consumption endpoint in the set of consumption endpoints based on the shortage of the resource to be consumed at the premises identified in the direct load control event, wherein, for each of the two or more operation modes, a different set of policies is selected and the selected set of one or more policies is different from the operation mode for the premises; and predicting, using machine learning techniques related to historical analysis, feedback, and previous inferences, one or more inferences a) related to operation of the set of consumption endpoints at the future time of the direct load control event and b) that indicate a forecast of consumption of the resource by one or more of the set of consumption endpoints at the future time of the direct load control event;

based on the selected set of one or more policies to use in handling the direct load control event from the resource provider entity, the operation mode for the premises, and the one or more inferences related to operation of the set of consumption endpoints at the future time of the direct load control event, determining an adjustment for operation of the set of consumption endpoints to implement the direct load control event; and using the determined adjustment for operation of the set of consumption endpoints to implement the direct load control event, determining one or more commands to control operation, using the second communications component, of the set of consumption endpoints in accordance with the selected set of one or more policies to use in handling the direct load control event from the resource provider entity and the one or more inferences related to operation of the set of consumption endpoints at the future time of the direct load control event.

2. The system of claim 1, the operations comprising determining an occupancy state of a particular room at the premises, wherein selecting the set of one or more policies to use in handling the direct load control event from the resource provider entity comprises selecting the set of one or more policies to use in handling the direct load control event from the resource provider entity using the determined occupancy state of the premises.

3. The system of claim 1, the operations comprising determining an occupancy state of a particular room at the premises, wherein selecting the set of one or more policies to use in handling the direct load control event from the resource provider entity comprises selecting the set of one or more policies to use in handling the direct load control event from the resource provider entity using the determined occupancy state of the particular room of the premises.

4. The system of claim 1, the operations comprising determining a schedule related to control of the set of consumption endpoints, wherein selecting the set of one or more policies to use in handling the direct load control event from the resource provider entity comprises selecting the set of one or more policies to use in handling the direct load control event from the resource provider entity using the determined schedule related to control of the set of consumption endpoints.

5. The system of claim 1, the operations comprising determining a number of occupants of the premises, a type of occupancy of the premises, and a location of the occupancy within the premises, wherein selecting the set of one or more policies to use in handling the direct load control event from the resource provider entity comprises selecting the set of one or more policies to use in handling the direct load control event from the resource provider entity using the determined number of occupants of the premises, the determined type of occupancy of the premises, and the location of the occupancy within the premises.

6. The system of claim 1, wherein determining the adjustment for operation of the set of consumption endpoints to implement the direct load control event comprises determining to take no action for at least one of the consumption endpoints, determining to turn off completely at least one of the consumption endpoints, and determining to turn off some, but not all, elements of at least one of the consumption endpoints.

7. The system of claim 1, wherein determining the adjustment for operation of the set of consumption endpoints to implement the direct load control event comprises determining to take no action for a first group of consumption endpoints in the set of consumption endpoints, and determining to modify operation for a second group of consumption endpoints in the set of consumption endpoints.

8. The system of claim 1, wherein predicting the one or more inferences that indicate the forecast of consumption of the resource by one or more of the set of consumption endpoints at the future time of the direct load control event comprises predicting the one or more inferences that indicate the forecast of consumption of the resource using a setting or the operation mode of each of the one or more of the set of consumption endpoints.

9. The system of claim 1, wherein predicting the one or more inferences related to operation of the set of consumption endpoints at the future time of the direct load control event comprises inferring states of the system, environment, and user from a set of observations as captured via events and data.

10. The system of claim 1, wherein predicting the one or more inferences related to operation of the set of consumption endpoints at the future time of the direct load control event comprises generating a probability distribution over states of the set of consumption endpoints.

11. The system of claim 1, wherein the control data from the resource provider entity comprises an indication of a current rate of consumption of the resource.

12. The system of claim 1, wherein the control data from the resource provider entity comprises an indication of aggregate consumption of the resource over a predefined period of time.

13. The system of claim 1, wherein the control data from the resource provider entity comprises a current or forecasted unit price for the resource.

14. The system of claim 1, wherein the control data from the resource provider entity comprises a command or instruction intended for at least one consumption endpoint.

15. The system of claim 1, wherein the control data from the resource provider entity comprises a text message intended for display by an informational display associated with the premises.

16. The system of claim 1, further comprising:
a third communications component configured to communicatively couple to the resource provider entity over a communication network, wherein the third communications component is configured to facilitate remote control of the first communications component, the second communications component, the one or more computers, and the set of consumption endpoints; and
an intelligent component configured to forecast consumption of the resource by the set of consumption endpoints that are situated at the premises based on a setting, an operation mode of the set of consumption endpoints, and an external factor.

17. The system of claim 1, further comprising:
a user interface component configured to:
(i) receive input associated with management of the set of consumption endpoints, the management comprising defining at least one operation mode, a temperature setting associated with the premises, an amount of resource to consume, an amount of resource to consume as a function of price-per-unit of resource, and an occupancy state within the premises;
(ii) receive input that defines a schedule of operation of one or more of the set of consumption endpoints;
(iii) present conditions associated with the premises for display, wherein the conditions comprise real-time consumption of the resource, real-time cost associated with the consumption of resource, an aggregate history of the consumption of the resource, and a forecast of future consumption of the resource;
(iv) present one or more advertisements received from the resource provider entity for display;
(v) receive input that manages connections between (1) the first communications component and the command server device, and (2) the second communications component and the set of consumption endpoints;
(vi) receive input that defines settings of the premise, wherein the settings comprises language, location, time, date, and a preferred utility resource provider; and
receive input that enables access to customer support associated with the resource provider entity and third party entity.

18. A non-transitory computer storage medium encoded with instructions that, when executed by one or more computers, cause the one or more computers to perform operations comprising:
maintaining, from two or more operation modes for a premises, an operation mode for the premises that includes a set of consumption endpoints that consume a resource at the premises;
receiving, from a resource provider entity that provides the resource at the premises, control data for a direct load control event from the resource provider entity;
in response to receipt, from the resource provider entity, of the control data for the direct load control event that indicates a shortage of the resource to be consumed at the premises at a future time;
selecting, using the operation mode for the premises, a set of one or more policies i) to use in handling the direct load control event from the resource provider entity and ii) that define a resource priority and actions for at least one consumption endpoint in the set of consumption endpoints based on the shortage of the resource to be consumed at the premises identified in the direct load control event, wherein, for each of the two or more operation modes, a different set of policies is selected and the selected set of one or more policies is different from the operation mode for the premises, and
predicting, using machine learning techniques related to historical analysis, feedback, and previous inferences, one or more inferences a) related to operation of the set of consumption endpoints at the future time of the direct load control event and b) that indicate a forecast of consumption of the resource by one or more of the set of consumption endpoints at the future time of the direct load control event;
based on the selected set of one or more policies to use in handling the direct load control event from the resource provider entity, the operation mode for the premises, and the one or more inferences related to operation of the set of consumption endpoints at the future time of the direct load control event, determining an adjustment for operation of the set of consumption endpoints to implement the direct load control event; and
using the determined adjustment for operation of the set of consumption endpoints to implement the direct load control event, determining one or more commands to control operation of the set of consumption endpoints in accordance with the selected set of one or more policies to use in handling the direct load control event from the resource provider entity and the one or more inferences related to operation of the set of consumption endpoints at the future time of the direct load control event.

19. A method comprising:
maintaining, from two or more operation modes for a premises, an operation mode for the premises that includes a set of consumption endpoints that consume a resource at the premises;
receiving, from a resource provider entity that provides the resource at the premises, control data for a direct load control event from the resource provider entity;
in response to receipt, from the resource provider entity, of the control data for the direct load control event that indicates a shortage of the resource to be consumed at the premises at a future time;
selecting, using the operation mode for the premises, a set of one or more policies i) to use in handling the direct load control event from the resource provider entity and ii) that define a resource priority and actions for at least one consumption endpoint in the set of consumption endpoints based on the shortage of the resource to be consumed at the premises identified in the direct load control event, wherein, for each of the two or more operation modes, a different set of policies is selected and the selected set of one or more policies is different from the operation mode for the premises, and predicting, using machine learning techniques related to historical analysis, feedback, and previous inferences, one or more inferences a) related to operation of the set of consumption endpoints at the future time of the direct load control event and b) that indicate a forecast of consumption of the resource by one or more of the set of consumption endpoints at the future time of the direct load control event;

based on the selected set of one or more policies to use in handling the direct load control event from the resource provider entity, the operation mode for the premises, and the one or more inferences related to operation of the set of consumption endpoints at the future time of the direct load control event, determining an adjustment for operation of the set of consumption endpoints to implement the direct load control event; and using the determined adjustment for operation of the set of consumption endpoints to implement the direct load control event, determining one or more commands to control operation of the set of consumption endpoints in accordance with the selected set of one or more policies to use in handling the direct load control event from the resource provider entity and the one or more inferences related to operation of the set of consumption endpoints at the future time of the direct load control event.

* * * * *

UNITED STATES PATENT AND TRADEMARK OFFICE
CERTIFICATE OF CORRECTION

PATENT NO. : 11,391,600 B2  
APPLICATION NO. : 16/562071  
DATED : July 19, 2022  
INVENTOR(S) : Seth Frader-Thompson et al.

Page 1 of 1

It is certified that error appears in the above-identified patent and that said Letters Patent is hereby corrected as shown below:

On the Title Page

Column 1 (Assignee), delete "Energy Hub," and insert -- EnergyHub, --.

In the Claims

In Claim 18, Column 46, Line 11, delete "time;" and insert -- time: --.

In Claim 19, Column 46, Line 60, delete "time;" and insert -- time: --.

Signed and Sealed this  
Twenty-fourth Day of January, 2023

Katherine Kelly Vidal  
*Director of the United States Patent and Trademark Office*